(12) United States Patent
Kitamura et al.

(10) Patent No.: US 7,126,993 B2
(45) Date of Patent: *Oct. 24, 2006

(54) INFORMATION PROCESSING APPARATUS, INFORMATION PROCESSING METHOD AND RECORDING MEDIUM

(75) Inventors: Takuya Kitamura, Tokyo (JP); Mamoru Ueda, Kanagawa (JP); Katsumi Tahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 161 days.

This patent is subject to a terminal disclaimer.

(21) Appl. No.: 10/371,897

(22) Filed: Feb. 20, 2003

(65) Prior Publication Data

US 2003/0128292 A1 Jul. 10, 2003

Related U.S. Application Data

(63) Continuation of application No. 09/727,347, filed on Nov. 30, 2000, now Pat. No. 6,556,627.

(30) Foreign Application Priority Data

Dec. 3, 1999 (JP) ................... 11-344940

(51) Int. Cl.
*H04N 7/12* (2006.01)
*H04N 5/26* (2006.01)
*H04N 7/26* (2006.01)
*H04B 1/11* (2006.01)

(52) U.S. Cl. .................. 375/240.26; 375/240.12; 386/52; 386/95; 386/112

(58) Field of Classification Search ............ 348/423.1, 348/700; 375/240.26, 240.23, 240.12; 386/52, 386/95, 112; *H04N 7/12, 5/76, 7/26*
See application file for complete search history.

(56) References Cited

U.S. PATENT DOCUMENTS 5,289,190 A  2/1994 Shimoda et al.
5,473,380 A  12/1995 Tahara (Continued)

FOREIGN PATENT DOCUMENTS

EP      0 942 605      9/1999

(Continued)

OTHER PUBLICATIONS

N. Bjork, C., Christopoulos, Transcoder architectures for video coding, IEEE Trans. On Consumer Electronics, vol. 44, No. 1, pp. 88-98, Feb. 1998.

*Primary Examiner*—Nhon Diep
(74) *Attorney, Agent, or Firm*—Frommer Lawrence & Haug LLP; William S. Frommer

(57) ABSTRACT

Encoding parameters of picture and higher layers of importance to a number of applications, and encoding parameters of slice and lower layers of no importance to all applications are converted into auxiliary packets inserted respectively into a V-blanking area and an H-blanking area of a video-data signal output by a history-information-multiplexing apparatus employed in a video-decoding system. On the other hand, a video-encoding system extracts back the auxiliary packets superposed on the V-blanking area and the H-blanking area from an input base-band video signal. As a result, a technique of superposing information on data can be changed in accordance with the importance of the information and required information can be fetched with ease.

26 Claims, 44 Drawing Sheets

U.S. PATENT DOCUMENTS

| | | |
|---|---|---|
| 5,544,266 A | 8/1996 | Koppelmans et al. |
| 5,715,009 A | 2/1998 | Tahara et al. |
| 5,754,698 A | 5/1998 | Suzuki et al. |
| 5,940,130 A | 8/1999 | Nilsson et al. |
| 6,088,393 A | 7/2000 | Knee et al. |
| 6,100,940 A | 8/2000 | Dieterich |
| 6,369,722 B1 * | 4/2002 | Murgia et al. ............ 341/50 |
| 6,556,627 B1 * | 4/2003 | Kitamura et al. ...... 375/240.26 |
| 6,567,128 B1 * | 5/2003 | Webb et al. ............. 348/584 |
| 2003/0128766 A1 * | 7/2003 | Tahara et al. .......... 375/240.26 |

FOREIGN PATENT DOCUMENTS

| | | |
|---|---|---|
| GB | 2 333 656 | 7/1999 |
| WO | WO 95 35628 | 12/1995 |
| WO | WO 96 01023 | 1/1996 |
| WO | WO 98 03017 | 1/1998 |
| WO | WO 98 51077 | 11/1998 |
| WO | WO 99 38314 | 7/1999 |

* cited by examiner

FIG.6

| 0 | 1 | 2 | ............ | 13 | 14 | 15 |
|---|---|---|---|---|---|---|
| 16 | 17 | 18 | ............ | 29 | 30 | 31 |
| 32 | 33 | 34 | ............ | 45 | 46 | 47 |
| ⋮ | ⋮ | ⋮ | | ⋮ | ⋮ | ⋮ |
| 208 | 209 | 210 | ............ | 221 | 222 | 223 |
| 224 | 225 | 226 | ............ | 237 | 238 | 239 |
| 240 | 241 | 242 | ............ | 251 | 254 | 255 |

MACROBLOCK

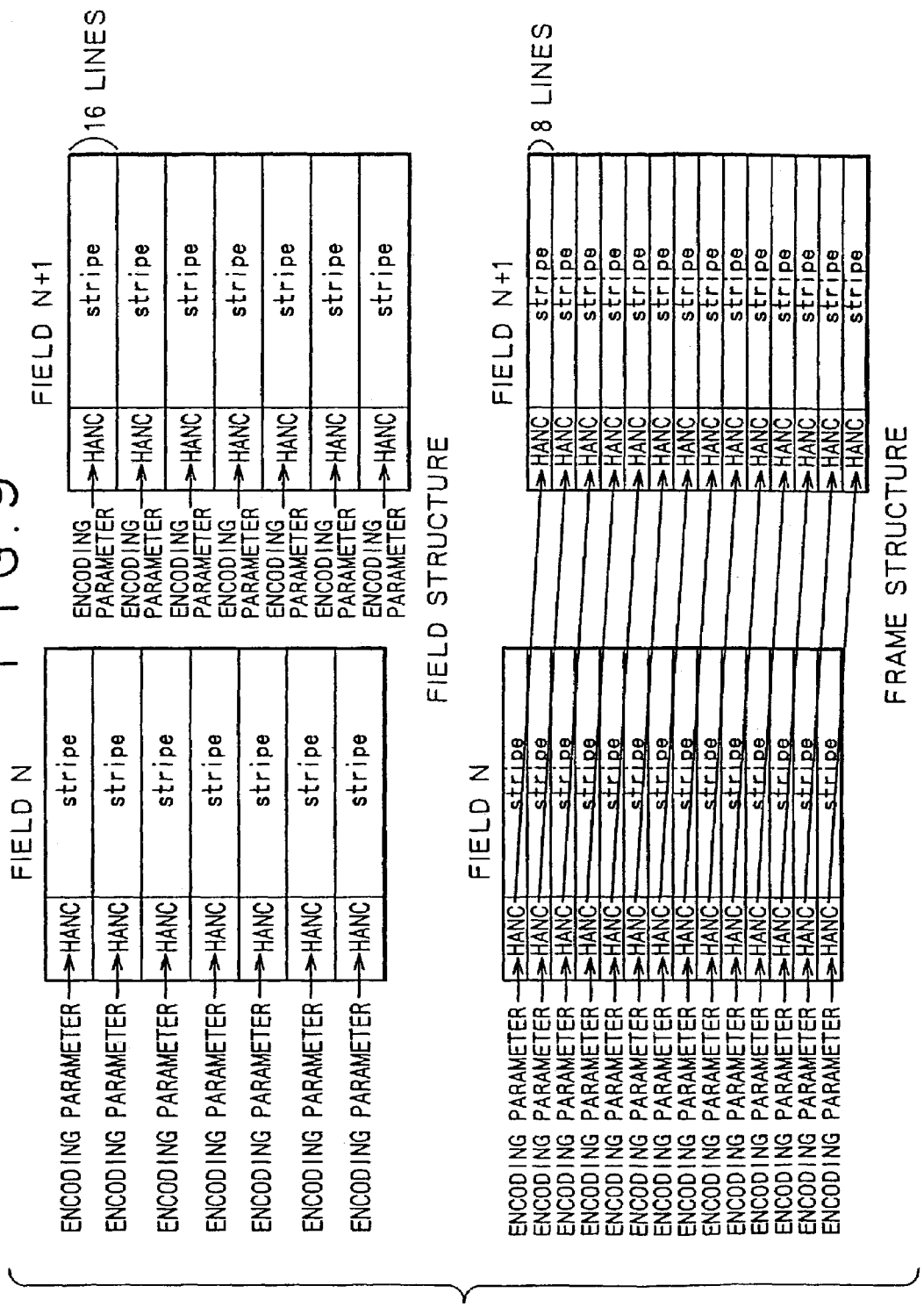

FIG. 11

| | | | | | | | | |
|---|---|---|---|---|---|---|---|---|
| D9 | Cb[0][9] | Y[0][9] | Cr[0][9] | Y[1][9] | Cb[1][9] | Y[2][9] | Cr[1][9] | Y[3][9] |
| D8 | Cb[0][8] | Y[0][8] | Cr[0][8] | Y[1][8] | Cb[1][8] | Y[2][8] | Cr[1][8] | Y[3][8] |
| D7 | Cb[0][7] | Y[0][7] | Cr[0][7] | Y[1][7] | Cb[1][7] | Y[2][7] | Cr[1][7] | Y[3][7] |
| D6 | Cb[0][6] | Y[0][6] | Cr[0][6] | Y[1][6] | Cb[1][6] | Y[2][6] | Cr[1][6] | Y[3][6] |
| D5 | Cb[0][5] | Y[0][5] | Cr[0][5] | Y[1][5] | Cb[1][5] | Y[2][5] | Cr[1][5] | Y[3][5] |
| D4 | Cb[0][4] | Y[0][4] | Cr[0][4] | Y[1][4] | Cb[1][4] | Y[2][4] | Cr[1][4] | Y[3][4] |
| D3 | Cb[0][3] | Y[0][3] | Cr[0][3] | Y[1][3] | Cb[1][3] | Y[2][3] | Cr[1][3] | Y[3][3] |
| D2 | Cb[0][2] | Y[0][2] | Cr[0][2] | Y[1][2] | Cb[1][2] | Y[2][2] | Cr[1][2] | Y[3][2] |
| D1 | FIRST GENERATION | | | SECOND GENERATION | | THIRD GENERATION | | |
| D0 | Cb[0][x] | Y[0][x] | Cr[0][x] | Y[1][x] | Cb[1][x] | Y[2][x] | Cr[1][x] | Y[3][x] |

PICTURE-DATA AREA

HISTORY-INFORMATION AREA

FIG.15 stream with history data

| video_sequence( ) { | No. of bits | Mnemonic |
|---|---|---|
| next_start_code( ) | | |
| sequence_header( ) | | |
| sequence_extension( ) | | |
| do { | | |
|   extension_and_user_data(0) | | |
|   do { | | |
|     if(nextbits( )==group_start_code) { | | |
|       group_of_pictures_header(1) | | |
|       extension_and_user_data(1) | | |
|     } | | |
|     picture_header( ) | | |
|     picture_coding_extension( ) | | |
|     while((nextbits( )==extension_start_code) \|\| | | |
|       (nextbits( )==user_data_start_code)) { | | |
|       if(nextbits( )==extension_start_code)) | | |
|         extension_data(2) | | |
|       if(nextbits( )==user_data_start_code) { | | |
|         user_data_start_code | 32 | bslbf |
|         if(nextbits( )==History_Data_ID) { | | |
|           History_Data_ID | 32 | bslbf |
|           converted_history_stream( ) | | |
|         } | | |
|         else { | | |
|           user_data( ) | | |
|         } | | |
|       } | | |
|     } | | |
|     picture_data( ) | | |
|   } while((nextbits( )==picture_start_code) \|\| | | |
|     (nextbits( )==group_start_code)) | | |
|   if(nextbits( )!=sequence_end_code) { | | |
|     sequence_header( ) | | |
|     sequence_extension( ) | | |
|   } | | |
| } while(nextbits( )!=sequence_end_code) | | |
| sequence_end_code | 32 | bslbf |
| } | | |

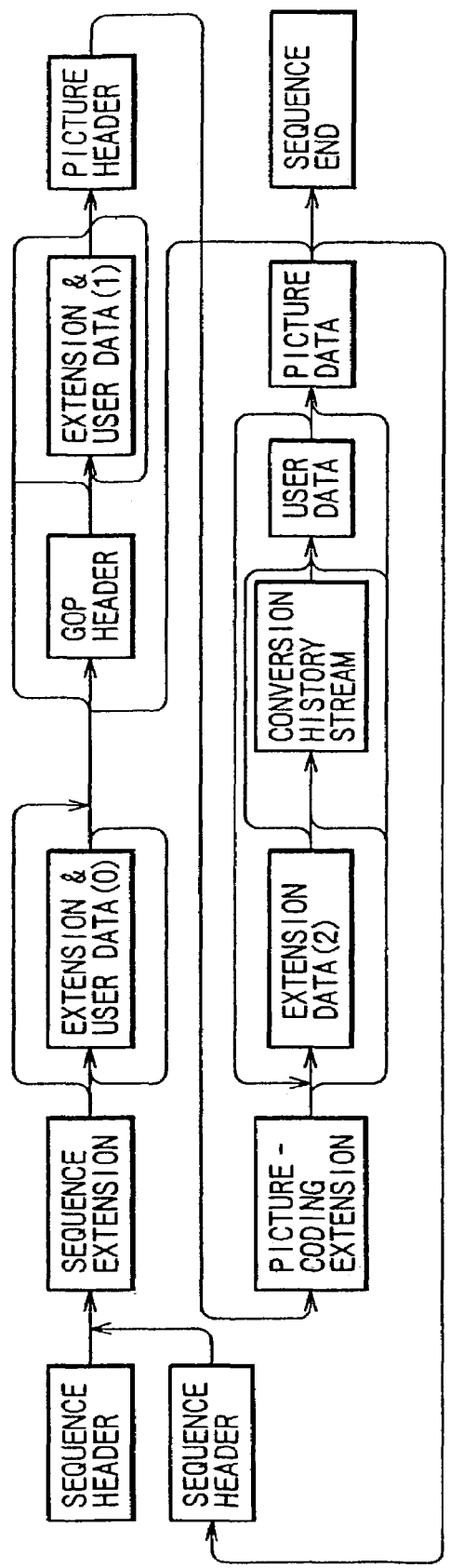
F I G. 16

FIG.17 history stream(17-1)

| history_stream( ){ | bits | value |
|---|---|---|
| sequence_header | | |
|     sequence_header_code | 32 | 000001B3 |
|     sequence_header_present_flag | 1 | |
|     horizontal_size_value | 12 | |
|     marker_bit | 1 | 1 |
|     vertical_size_value | 12 | |
|     aspect_ratio_information | 4 | |
|     frame_rate_code | 4 | |
|     maker_bit | 1 | 1 |
|     bit_rate_value | 18 | |
|     marker_bit | 1 | 1 |
|     vbv_buffer_size_value | 10 | |
|     constrained_parameter_flag | 1 | 0 |
|     load_intra_quantiser_matrix | 1 | |
|     load_non_intra_quantiser_matrix | 1 | |
|     maker_bits | 5 | 1F |
|     intra_quantiser_matrix[64] | 8*64 | |
|     non_intra_quantiser_matrix[64] | 8*64 | |
| | | |
| sequence_extension | | |
|     extension_start_code | 32 | 000001B5 |
|     extension_start_code_identifier | 4 | 1 |
|     sequence_extension_present_flag | 1 | |
|     profile_and_level_indication | 8 | |
|     progressive_sequence | 1 | |
|     chroma_format | 2 | |
|     horizontal_size_extension | 2 | |
|     vertical_size_extension | 2 | |
|     marker_bit | 1 | 1 |
|     bit_rate_extension | 12 | |
|     vbv_buffer_size_extension | 8 | |
|     low_delay | 1 | |
|     marker_bit | 1 | 1 |

FIG. 18 history stream(17-2)

| | bits | value |
|---|---|---|
| frame_rate_extension_n | 2 | |
| frame_rate_extension_d | 5 | |
| marker_bits | 6 | 3F |
| | | |
| sequence_display_extension | | |
| extension_start_code | 32 | 000001B5 |
| extension_start_code_identifier | 4 | 2 |
| sequence_display_extension_present_flag | 1 | |
| video_format | 3 | |
| colour_description | 1 | |
| colour_primaries | 8 | |
| transfer_characteristics | 8 | |
| marker_bit | 1 | 1 |
| matrix_coefficients | 8 | |
| display_horizontal_size | 14 | |
| marker_bit | 1 | 1 |
| display_vertical_size | 14 | |
| marker_bit | 1 | 1 |
| | | |
| macroblock_assignment_in_user_data | | |
| macroblock_assignment_present_flag | 1 | |
| marker_bit | 7 | 7F |
| v_phase | 8 | |
| h_phase | 8 | |
| | | |
| group_of_picture_header | | |
| group_start_code | 32 | 000001B8 |
| group_of_picture_header_present_flag | 1 | |
| time_code | 25 | |
| closed_gop | 1 | |
| broken_link | 1 | |
| marker_bits | 4 | F |
| | | |
| picture_header | | |
| picture_start_code | 32 | 00000100 |

FIG.19 history stream(17-3)

|  | bits | value |
|---|---|---|
| temporal_reference | 10 |  |
| picture_coding_type | 3 |  |
| marker_bit | 1 | 1 |
| vbv_delay | 16 |  |
| full_pel_forward_vector | 1 |  |
| forward_f_code | 3 |  |
| full_pel_backward_vector | 1 |  |
| marker_bit | 1 | 1 |
| backward_f_code | 3 |  |
| marker_bit | 1 | 1 |
|  |  |  |
| picture_coding_extension |  |  |
| extension_start_code | 32 | 000001B5 |
| extension_start_code_identifier | 4 | 8 |
| f_code[0][0] | 4 |  |
| f_code[0][1] | 4 |  |
| f_code[1][0] | 4 |  |
| f_code[1][1] | 4 |  |
| intra_dc_precision | 2 |  |
| picture_structure | 2 |  |
| top_field_first | 1 |  |
| frame_pred_frame_dct | 1 |  |
| concealment_motion_vectors | 1 |  |
| q_scale_type | 1 |  |
| marker_bit | 1 | 1 |
| intra_vlc_format | 1 |  |
| alternate_scan | 1 |  |
| repeat_first_field | 1 |  |
| chroma_420_type | 1 |  |
| progressive_frame | 1 |  |
| composite_display_flag | 1 |  |
| v_axis | 1 |  |
| field_sequence | 3 |  |
| sub_carrier | 1 |  |
| burst_amplitude | 7 |  |

FIG. 20 history stream(17-4)

|  | bits | value |
|---|---|---|
| marker_bits | 1 | 1 |
| sub_carrier_phase | 8 | |
| | | |
| quant_matrix_extension | | |
| extension_start_code | 32 | 000001B5 |
| extension_start_code_identifier | 4 | 3 |
| quant_matrix_extension_present_flag | 1 | |
| load_intra_quantiser_matrix | 1 | |
| marker_bits | 2 | 3 |
| intra_quantiser_matrix[64] | 8*64 | |
| load_non_intra_quantiser_matrix | 1 | |
| marker_bits | 7 | 7F |
| non_intra_quantiser_matrix[64] | 8*64 | |
| load_chroma_intra_quantiser_matrix | 1 | |
| marker_bits | 7 | 7F |
| chorma_intra_quantiser_matrix[64] | 8*64 | |
| load_chroma_non_intra_quantiser_matrix | 1 | |
| marker_bits | 7 | 7F |
| chroma_non_intra_quantiser_matrix[64] | 8*64 | |
| | | |
| copyright_extension | | |
| extension_start_code | 32 | 000001B5 |
| extension_start_code_identifier | 4 | 4 |
| copyright_extension_present_flag | 1 | |
| copyright_flag | 1 | |
| copyright_identifier | 8 | |
| original_or_copy | 1 | |
| marker_bit | 1 | |
| copyright_number_1 | 20 | |
| marker_bit | 1 | |
| copyright_number_2 | 22 | |
| marker_bit | 1 | |
| copyright_number_3 | 22 | 3F |
| marker_bits | 6 | |
| | | |

FIG. 21 history stream(17-5)

|  | bits | value |
|---|---|---|
| picture_display_extension |  |  |
|     extension_start_code | 32 | 00000185 |
|     extension_start_code_identifier | 4 | 7 |
|     picture_display_extension_present_flag | 1 |  |
|     frame_centre_horizontal_offset_1 | 16 |  |
|     marker_bit | 1 | 1 |
|     frame_centre_vertical_offset_1 | 16 |  |
|     marker_bit | 1 | 1 |
|     frame_centre_horizontal_offset_2 | 16 |  |
|     marker_bit | 1 | 1 |
|     frame_centre_vertical_offset_2 | 16 |  |
|     marker_bit | 1 | 1 |
|     frame_centre_horizontal_offset_3 | 16 |  |
|     marker_bit | 1 | 1 |
|     frame_centre_vertical_offset_3 | 16 |  |
|     marker_bit | 6 | 3F |
|  |  |  |
| re_coding_stream_information |  |  |
|     user_data_start_code | 32 | 000001B2 |
|     re_coding_stream_info_ID | 16 | 91EC |
|     red_bw_flag | 1 |  |
|     red_bw_indicator | 2 |  |
|     maker_bit | 5 | 1F |
|  |  |  |
| user_data |  |  |
|     user_data_start_code | 32 | 000001B2 |
|     user_data | 2048 |  |
|  |  |  |
| while(macroblock i=macroblock_count) { |  |  |
| macroblock |  |  |
|     macroblock_address_h | 8 |  |
|     macroblock_address_v | 8 |  |
|     slice_header_present_flag | 1 |  |
|     skipped_macroblock_flag | 1 |  |
|     marker_bit | 1 | 1 |
|  |  |  |
| macroblock_modes( ) |  |  |
|     macroblock_quant | 1 |  |
|     macroblock_motion_forward | 1 |  |
|     macroblock_motion_backward | 1 |  |
|     macroblock_pattern | 1 |  |
|     macroblock_intra | 1 |  |

FIG. 22 history stream(17-6)

| | bits | value |
|---|---|---|
| spatial_temporal_weight_code_flag | 1 | |
| frame_motion_type | 2 | |
| field_motion_type | 2 | |
| dct_type | 1 | |
| marker_bits | 2 | 3 |
| | | |
| quantiser_scale_code | 5 | |
| marker_bits | 3 | 7 |
| | | |
| PMV[0][0][0] | 14 | |
| marker_bits | 2 | 3 |
| PMV[0][0][1] | 14 | |
| motion_vertical_field_select[0][0] | 1 | |
| marker_bit | 1 | 1 |
| PMV[0][1][0] | 14 | |
| marker_bits | 2 | 3 |
| PMV[0][1][1] | 14 | |
| motion_vertical_field_select[0][1] | 1 | |
| marker_bit | 1 | 1 |
| PMV[1][0][0] | 14 | |
| marker_bits | 2 | 3 |
| PMV[1][0][1] | 14 | |
| motion_vertical_field_select[1][0] | 1 | |
| marker_bit | 1 | 1 |
| PMV[1][1][0] | 14 | |
| marker_bits | 2 | 3 |
| PMV[1][1][1] | 14 | |
| motion_vertical_field_select[1][1] | 1 | |
| marker_bit | 1 | 1 |
| | | |
| coded_block_pattern | 12 | |
| marker_bits | 4 | F |
| num_mv_bits | 8 | |
| num_coef_bits | 14 | |
| marker_bits | 2 | 3 |

FIG. 23 history stream(17-7)

|  | bits | value |
|---|---|---|
| num_other_bits | 7 |  |
| marker_bit | 1 | 1 |
| } |  |  |

FIG. 24

| history_stream( ) { | No. of bits | Mnemonic |
|---|---|---|
| next_start_code( ) |  |  |
| sequence_header( ) |  |  |
| sequence_extension( ) |  |  |
| extension_and_user_data(0) |  |  |
| if(nextbits( )== group_start_code) { |  |  |
| group_of_pictures_header( ) |  |  |
| extension_and_user_data(1) |  |  |
| } |  |  |
| picture_header( ) |  |  |
| picture_coding_extension( ) |  |  |
| re_coding_stream_info( ) |  |  |
| extensions_and_user_data(2) |  |  |
| picture_data( ) |  |  |
| sequence_end_code | 32 | bslbf |
| } |  |  |

FIG. 25

| sequence_header ( ) { | No. of bits | Mnemonic |
|---|---|---|
| sequence_header_code | 32 | bslbf |
| horizontal_size_value | 12 | uimsbf |
| vertical_size_value | 12 | uimsbf |
| aspect_ratio_information | 4 | uimsbf |
| frame_rate_code | 4 | uimsbf |
| bit_rate_value | 18 | uimsbf |
| marker_bit | 1 | bslbf |
| vbv_buffer_size_value | 10 | uimsbf |
| constrained_parameters_flag | 1 | bslbf |
| load_intra_quantiser_matrix | 1 | uimsbf |
| if(load_intra_quantiser_matrix) | | |
| intra_quantiser_matrix[64] | 8*64 | uimsbf |
| load_non_intra_quantiser_matrix | 1 | uimsbf |
| if(load_non_intra_quantiser_matrix) | | |
| non_intra_quantiser_matrix[64] | 8*64 | uimsbf |
| next_start_code ( ) | | |
| } | | |

FIG. 26

| sequence_extension() { | No. of bits | Mnemonic |
|---|---|---|
| extension_start_code | 32 | bslbf |
| extension_start_code_identifier | 4 | uimsbf |
| profile_and_level_indication | 8 | uimsbf |
| progressive_sequence | 1 | uimsbf |
| chroma_format | 2 | uimsbf |
| horizontal_size_extension | 2 | uimsbf |
| vertical_size_extension | 2 | uimsbf |
| bit_rate_extension | 12 | uimsbf |
| marker_bit | 1 | bslbf |
| vbv_buffer_size_extension | 8 | uimsbf |
| low_delay | 1 | uimsbf |
| frame_rate_extension_n | 2 | uimsbf |
| frame_rate_extension_d | 5 | uimsbf |
| next_start_code() | | |
| } | | |

FIG. 27

| extension_and_user_data(i) { | No. of bits | Mnemonic |
|---|---|---|
| while((nextbits()==extension_start_code) \|\| | | |
| (nextbits()==user_data_start_code)) { | | |
| if((i==2)&&(nextbits()==extension_start_code)) | | |
| extension_data(i) | | |
| if(nextbits()==user_data_start_code) | | |
| user_data() | | |
| } | | |
| } | | |

FIG. 28

| user_data ( ) { | No. of bits | Mnemonic |
|---|---|---|
| user_data_start_code | 32 | bslbf |
| while(nextbits( )!= '0000 0000 0000 0000 0000 0001' ){ | | |
| user_data ( ) | 8 | uimsbf |
| } | | |
| next_start_code ( ) | | |
| } | | |

FIG. 29

| group_of_pictures_header ( ){ | No. of bits | Mnemonic |
|---|---|---|
| group_start_code | 32 | bslbf |
| time_code | 25 | bslbf |
| closed_gop | 1 | uimsbf |
| broken_link | 1 | uimsbf |
| next_start_code ( ) | | |
| } | | |

FIG. 30

| picture_header ( ) { | No. of bits | Mnemonic |
|---|---|---|
| picture_start_code | 32 | bslbf |
| temporal_reference | 10 | uimsbf |
| picture_coding_type | 3 | uimsbf |
| vbv_delay | 16 | uimsbf |
| if(picture_coding_type==2 \|\| picture_coding_type==3) { | | |
| full_pel_forward_vector | 1 | bslbf |
| forward_f_code | 3 | bslbf |
| } | | |
| if(picture_coding_type==3) { | | |
| full_pel_forward_vector | 1 | bslbf |
| backward_f_code | 3 | bslbf |
| } | | |
| while(nextbits( )== '1'){ | | |
| extra_bit_picture/*with the value '1'*/ | 1 | uimsbf |
| extra_information_picture | 8 | uimsbf |
| } | | |
| extra_bit_picture/*with the value '0'*/ | 1 | uimsbf |
| next_start_code( ) | | |
| } | | |

FIG. 31

| picture_coding_extension( ) { | No. of bits | Mnemonic |
|---|---|---|
| extension_start_code | 32 | bslbf |
| extension_start_code_identifier | 4 | uimsbf |
| f_code [0] [0] /*forward horizontal*/ | 4 | uimsbf |
| f_code [0] [1] /*forward vertical*/ | 4 | uimsbf |
| f_code [1] [0] /*backward horizontal*/ | 4 | uimsbf |
| f_code [1] [1] /*backward vertical*/ | 4 | uimsbf |
| intra_dc_precision | 2 | uimsbf |
| picture_structure | 2 | uimsbf |
| top_field_first | 1 | uimsbf |
| frame_pred_frame_dct | 1 | uimsbf |
| concealment_motion_vectors | 1 | uimsbf |
| q_scale_type | 1 | uimsbf |
| intra_vlc_format | 1 | uimsbf |
| alternate_scan | 1 | uimsbf |
| repeat_first_field | 1 | uimsbf |
| chroma_420_type | 1 | uimsbf |
| progressive_frame | 1 | uimsbf |
| composite_display_flag | 1 | uimsbf |
| if (composite_display_flag) { | | |
|     v_axis | 1 | uimsbf |
|     field_sequence | 3 | uimsbf |
|     sub_carrier | 1 | uimsbf |
|     burst_amplitude | 7 | uimsbf |
|     sub_carrier_phase | 8 | uimsbf |
| } | | |
| next_start_code () | | |
| } | | |

FIG. 32

| extension_data( ) { | No. of bits | Mnemonic |
|---|---|---|
| while(nextbits( )==extension_start_code) { | | |
| extension_start_code | 32 | bslbf |
| if(i==0)/*follows sequence_extension( )*/ | | |
| sequence_display_extension( ) | | |
| /*NOTE-i never takes the value 1 because extension data( ) | | |
| never follows a group_of_pictures_header( )*/ | | |
| if(i==2)/*follows picture_coding_extension( )*/ | | |
| if(nextbits( )== "Quant Matrix Extension ID") | | |
| quant_matrix_extension( ) | | |
| else if(nextbits( )== "Copyright Extension ID") | | |
| copyright_extension( ) | | |
| else | | |
| picture_display_extension( ) | | |
| } | | |
| } | | |

FIG. 33

| quant_matrix_extension( ) { | No. of bits | Mnemonic |
|---|---|---|
| extension_start_code_identifier | 4 | uimsbf |
| load_intra_quantiser_matrix | 1 | uimsbf |
| if(load_intra_quantiser_matrix) | | |
| intra_quantiser_matrix [64] | 8*64 | uimsbf |
| load_non_intra_quantiser_matrix | 1 | uimsbf |
| if(load_non_intra_quantiser_matrix) | | |
| non_intra_quantiser_matrix [64] | 8*64 | uimsbf |
| load_chroma_intra_quantiser_matrix | 1 | uimsbf |
| if(load_chroma_intra_quantiser_matrix) | | |
| chroma_intra_quantiser_matrix [64] | 8*64 | uimsbf |
| load_chroma_non_intra_quantiser_matrix | 1 | uimsbf |
| if(load_chroma_non_intra_quantiser_matrix) | | |
| chroma_non_intra_quantiser_matrix [64] | 8*64 | uimsbf |
| next_start_code( ) | | |
| } | | |

F I G. 34

| copyright_extension( ) { | No. of bits | Mnemonic |
|---|---|---|
| extension_start_code_identifier | 4 | uimsbf |
| copyright_flag | 1 | bslbf |
| copyright_identifier | 8 | uimsbf |
| original_or_copy | 1 | bslbf |
| reserved | 7 | uimsbf |
| marker_bit | 1 | bslbf |
| copyright_number_1 | 20 | uimsbf |
| marker_bit | 1 | bslbf |
| copyright_number_2 | 22 | uimsbf |
| marker_bit | 1 | bslbf |
| copyright_number_3 | 22 | uimsbf |
| next_start_code( ) | | |
| } | | |

F I G. 35

| picture_display_extension( ) { | No. of bits | Mnemonic |
|---|---|---|
| extension_start_code_identifier | 4 | uimsbf |
| for(i=0; i;number_of_frame_centre_offsets; i++) { | | |
| frame_centre_horizontal_offset | 16 | simsbf |
| marker_bit | 1 | bslbf |
| frame_centre_vertical_offset | 16 | simsbf |
| marker_bit | 1 | bslbf |
| } | | |
| next_start_code( ) | | |
| } | | |

FIG. 36

| picture_data() { | No. of bits | Mnemonic |
|---|---|---|
| do{ | | |
| slice() | | |
| }while(nextbits()==slice_start_code) | | |
| next_start_code() | | |
| } | | |

FIG. 37

| slice() { | No. of bits | Mnemonic |
|---|---|---|
| slice_start_code | 32 | bslbf |
| slice_quantiser_scale_code | 5 | uimsbf |
| if(nextbit( )== '1') { | | |
| intra_slice_flag | 1 | bslbf |
| intra_slice | 1 | uimsbf |
| reserved_bits | 7 | uimsbf |
| while(nextbits( )== '1') { | | |
| extra_bit_slice/*with the value '1'*/ | 1 | uimsbf |
| extra_information_slice | 8 | uimsbf |
| } | | |
| } | | |
| extra_bit_slice/*with the value '0'*/ | 1 | uimsbf |
| do{ | | |
| macroblock( ) | | |
| }while(nextbit( )!= '000 0000 0000 0000 0000 0000') | | |
| next_start_code( ) | | |
| } | | |

FIG.38

| macroblock( ){ | No. of bits | Mnemonic |
|---|---|---|
| while(nextbits( )== '0000 0001 000') | | |
| macroblock_escape | 11 | bslbf |
| macroblock_address_increment | 1-11 | vlclbf |
| macroblock_modes( ) | | |
| if(macroblock_quant) | | |
| macroblock_quantiser_scale_code | 5 | uimsbf |
| if(!red_bw_flag ‖ | | |
| (red_bw_flag &&(red bw indicator$\leq$1))){ | | |
| if(macroblock_motion_forward ‖ | | |
| (macroblock_intra && concealment_motion_vectors)) | | |
| motion_vectors(0) | | |
| if(macroblock_motion_backward) | | |
| motion_vectors(1) | | |
| if(macroblock_intra && concealment_motion_vectors) | | |
| marker_bit | 1 | bslbf |
| } | | |
| if(macroblock_pattern && | | |
| (!red_bw_flag ‖ | | |
| (red_bw_flag &&(red_bw_indicator--0))) | | |
| coded_block_pattern( ) | | |
| } | | |

FIG. 39

| macroblock_modes( ) { | No. of bits | Mnemonic |
|---|---|---|
|   macroblock_type | 1-9 | vlclbf |
|   if(!red_bw_flag \|\| | | |
|     (red_bw_flag &&(red_bw_indicator≦1))){ | | |
|     if(macroblock_motion_forward \|\| | | |
|      macroblock_motion_backward){ | | |
|       if(picture_structure== 'frame'){ | | |
|        if(frame_pred_frame_dct==0) | | |
|         frame_motion_type | 2 | uimsbf |
|       }else{ | | |
|        field_motion_type | 2 | uimsbf |
|       } | | |
|      } | | |
|     } | | |
|   if((picture_structure== "Frame Picture")&& | | |
|     (frame_pred_frame_dct==0)&& | | |
|     (dct_type_flag==1)&& | | |
|     (!red_bw_flag \|\| | | |
|      (red_bw_flag &&(red_bw_indicator≦1)))){ | | |
|     dct_type | 1 | uimsbf |
|   } | | |
| } | | |

FIG. 40

| motion_vectors(s) { | No. of bits | Mnemonic |
|---|---|---|
|     if(motion_vector_count==1) { | | |
|         if((mv_format==field)&&(dmv!=1) | | |
|             motion_vertical_field_select[0][s] | 1 | uimsbf |
|         motion_vector(0, s) | | |
|     }else{ | | |
|         motion_vertical_field_select[0][s] | 1 | uimsbf |
|         motion_vector(0, s) | | |
|         motion_vertical_field_select[1][s] | 1 | uimsbf |
|         motion_vector(1, s) | | |
|     } | | |
| } | | |

FIG. 41

| motion_vectors(r, s) { | No. of bits | Mnemonic |
|---|---|---|
|     motion_code[r][s][0] | 1-11 | vlclbf |
|     if((f_code[s][0]!=1)&&(motion_code[r][s][0]!=0)) | | |
|         motion_residual[r][s][0] | 1-8 | uimsbf |
|     if(dmv==1) | | |
|         dmvector[0] | 1-2 | vlclbf |
|     motion_code[r][s][1] | 1-11 | vlclbf |
|     if(f_code[s][1]!=1)&&(motion_code[r][s][1]!=0)) | | |
|         motion_residual[r][s][1] | 1-8 | uimsbf |
|     if(dmv==1) | | |
|         dmvector[1] | 1-2 | vlclbf |
| } | | |

FIG. 42

| macroblock_type VLC code | macroblock_quant | dct_type_flag | macroblock_motion_forward | macroblock_motion_backward | Description |
|---|---|---|---|---|---|
| 1 | 0 | 1 | 0 | 0 | Intra |
| 01 | 1 | 1 | 0 | 0 | Intra, Quant |

FIG. 43

| macroblock_type VLC code | macroblock_quant | dct_type_flag | macroblock_motion_forward | macroblock_motion_backward | Description |
|---|---|---|---|---|---|
| 1 | 0 | 1 | 1 | 0 | MC, Coded |
| 01 | 0 | 1 | 0 | 0 | No MC, Coded |
| 001 | 0 | 0 | 0 | 0 | MC, Not Coded |
| 0001 1 | 0 | 1 | 0 | 0 | Intra |
| 0001 0 | 1 | 1 | 1 | 0 | MC, Coded, Quant |
| 0000 1 | 1 | 1 | 0 | 0 | No MC, Coded, Quant |
| 0000 01 | 1 | 1 | 0 | 0 | Intra, Quant |

FIG. 44

| macroblock_type VLC code | macroblock_quant | dct_type_flag | macroblock_motion_forward | macroblock_motion_backward | Description |
|---|---|---|---|---|---|
| 10 | 0 | 0 | 0 | 0 | Interp, Not Coded |
| 11 | 0 | 1 | 1 | 1 | Interp, Coded |
| 010 | 0 | 0 | 0 | 0 | Bwd, Not Coded |
| 011 | 0 | 1 | 0 | 1 | Bwd, Coded |
| 0010 | 0 | 0 | 0 | 0 | Fwd, Not Coded |
| 0011 | 0 | 1 | 1 | 0 | Fwd, Coded |
| 00011 | 0 | 1 | 0 | 0 | Intra |
| 00010 | 1 | 1 | 1 | 1 | Interp, Coded, Quant |
| 000011 | 1 | 1 | 1 | 0 | Fwd, Coded, Quant |
| 000010 | 1 | 1 | 0 | 1 | Bwd, Coded, Quant |
| 000001 | 1 | 1 | 0 | 0 | Intra, Quant |

FIG.46

| COMBINATIONS OF HISTORY-INFORMATION ITEMS | num_coef_bits, num_mv_bits, num_other_bits | q_scale_code, q_scale_type | motion_type, mv_vert_field_sel[][], mv[][][] | mb_mfwd, mb_mbwd | mb_pattern | coded_block_pattern | mb_intra | slice_start | dct_type | mb_quant | skipped_mb |
|---|---|---|---|---|---|---|---|---|---|---|---|
| COMBINATION 1 | 2 | 2 | 2 | 2 | 2 | 2 | 2 | 2 | 2 | 2 | 2 |
| COMBINATION 2 | 0 | 2 | 2 | 2 | 2 | 2 | 2 | 2 | 2 | 2 | 2 |
| COMBINATION 3 | 0 | 2 | 2 | 2 | 2 | 0 | 2 | 1 | 2 | 1 | 1 |
| COMBINATION 4 | 0 | 2 | 0 | 1 | 1 | 0 | 1 | 1 | 0 | 1 | 1 |
| COMBINATION 5 | 0 | 0 | 0 | 0 | 0 | 0 | 0 | 0 | 0 | 0 | 0 |

COMBINATIONS OF HISTORY-INFORMATION ITEMS

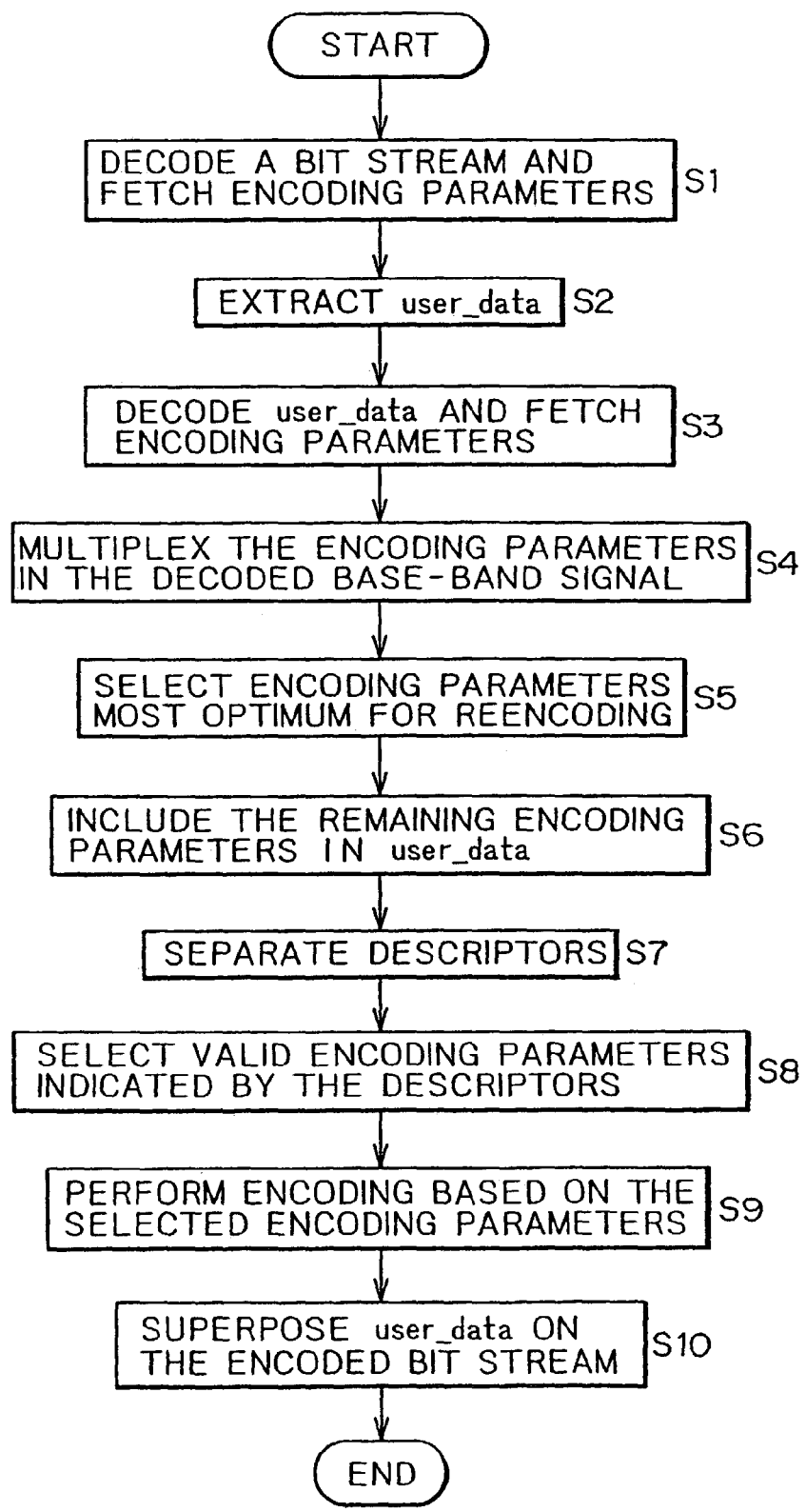

FIG. 48

| re_coding_stream_info( ) { | No. of bits | Mnemonic |
|---|---|---|
| user_data_start_code | 32 | bslbf |
| re_coding_stream_info_ID | 16 | bslbf |
| red_bw_flag | 1 | uimsbf |
| if(red_bw_flag) | | |
|     red_bw_indicator | 2 | uimsbf |
| if(!red_bw_flag) { | | |
|     for(i=0; i<number_of_macroblock;++) { | | |
|       marker_bit | 3 | bslbf |
|       num_other_bits | 7 | uimsbf |
|       num_mv_bits | 8 | uimsbf |
|       num_coef_bits | 14 | uimsbf |
|     } | | |
| } | | |
| next_start_code( ) | | |
| } | | |

FIG. 49

| COMBINATION OF HISTORY-INFORMATION ITEMS | red_bw_flag | red_bw_indicator |
|---|---|---|
| COMBINATION 1 | 0 | — |
| COMBINATION 2 | 1 | 0 |
| COMBINATION 3 | 1 | 1 |
| COMBINATION 4 | 1 | 2 |
| COMBINATION 5 | 1 | 3 |

FIG. 50

Frame Coding / Field Coding

| Line | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 / 0 | SRIB_sync_code=111112 | | | | | | | | | | | Reserved | | 0 | fr_fl_SRIB | SRIB_top_field_first | SRIB_repeat_field_first | SRIB_422_420_chroma | 0 |
| 1 / — | | | | | | | | | | | rolling_SRIB_mb_ref[15:0] | | | | | |
| — / 1 | picrate_element[picrate_element_index] [31:16] | | | | | | | | | | | | | | | |
| 2 / — | picrate_element[picrate_element_index] [15:0] | | | | | | | | | | | | | | | |
| — / 2 | mb_quant | mb_mfwd | mb_mbwd | | | | | | | mv[0][0][0] [12:0] | | | | mv[0][0][0] [8:0] | | |
| 3 / — | mb_pattern | slice_start_flag | mb_intra | my_vert_field_sel[r][s] [1][1][0][0][1][0][0] | | | | | | | | | | | | |
| — / 3 | DCT_type | motion_type | | | | | | | mv[0][1][0] [12:0] | | | | | mv[0][1][0] [8:0] | | |
| 4 / — | skip_mb | q_scale_type | q_scale_code[4:0] | | | | | | | | | | | | | |
| — / 4 | Reserved | | | | | | | | mv[1][0][0] [12:0] | | | | | mv[1][0][0] [8:0] | | |
| 5 / — | coded_block_pattern [7:0] | | | | | | | | Reserved | | | | | | | |
| — / 5 | Reserved | | | | | | | | mv[1][1][0] [12:0] | | | | | mv[1][1][0] [8:0] | | |
| 6 / — | coded_block_pattern [3:0] | | | | | | | | Reserved | | | | | | | |
| — / 6 | Reserved | | | | | | | | num_other_bits[6:0] | | | | | num_mv_bits[7:2] | | |
| 7 / — | num_mv_bits[1:0] | | | | | | | | num_coef_bits[13:0] | | | | | | | |
| — / 7 | SRIB_crc[31:16] | | | | | | | | | | | | | | | |
| | SRIB_crc[15:0] | | | | | | | | | | | | | | | |

FIG. 51 picture rate elements (51-1)

| parameter | number format | number of bits | bit offset from | bit offset to | data category | details |
|---|---|---|---|---|---|---|
| MPEG standard flag | 1bit flag | 1 | 0 | 0 | 3 | 1=>MPEG 1;0=>MPEG2 |
| red_bw_flag | 1bit flag | 1 | 1 | 1 | 3 | Default= "0" |
| red_bw_indicator | 2bit ui | 3 | 2 | 4 | 3 | Default= "000" |
| header present flags | 2bit flags | 2 | 5 | 6 | 3 | sequence header present flag.GOP header present flag |
| Extension start code flags | 16 flags | 16 | 7 | 22 | 3 | Indicates if a given extension start code exists. The 16 flags correspond to the 16 entries in table 6,2 of the ISO/IEC 13818-2: 1996 standard in the order they are listed. |
| Other start codes | 3 flags | 3 | 23 | 25 | 3 | user_data_start_code, sequence_error_code, sequence_end_code |
| sequence header | | | | | | |
| horizontal_size | 14bit uimsbf | 14 | 26 | 39 | 2 | includes extension |
| vertical_size | 14bit uimsbf | 14 | 40 | 53 | 2 | includes extension |
| aspect_ratio_information | 4bit uimsbf | 4 | 54 | 57 | 2 | |
| frame_rate_code | 4bit uimsbf | 4 | 58 | 61 | 2 | includes extension correct value should be calculated |
| bit_rate | 30bit uimsbf | 30 | 62 | 91 | 2 | includes extension |
| vbv_butter_size | 18bit uimsbf | 18 | 92 | 109 | 2 | |
| constrained_parameters_flag | 1bit flag | 1 | 110 | 110 | 2 | |
| sequence extension | | | | | | |
| profile_and_level_indication | 8bit uimsbf | 8 | 111 | 118 | 2 | |
| progressive_sequence | 1bit flag | 1 | 119 | 119 | 2 | |
| chroma_format | 2bit uimsbf | 2 | 120 | 121 | 2 | |
| low_delay | 1bit flag | 1 | 122 | 122 | 2 | |
| sequence display extension | | | | | | |
| veido_format | 3bit uimsbf | 3 | 123 | 125 | 2 | |
| colour_description | 1bit flag | 1 | 126 | 126 | 2 | |
| colour_primaries | 8bit uimsbf | 8 | 127 | 134 | 2 | |
| transfer_characteristics | 8bit uimsbf | 8 | 135 | 142 | 2 | |
| matrix_coefficients | 8bit uimsbf | 8 | 143 | 150 | 2 | |
| display_horizontal_size | 14bit uimsbf | 14 | 151 | 164 | 2 | |
| display_vertical_size | 14bit uimsbf | 14 | 165 | 178 | 2 | |
| group of pictures header | | | | | | |
| time_code | 25bit flag | 25 | 179 | 203 | 2 | |
| closed_gop | 1bit flag | 1 | 204 | 204 | 2 | |

FIG.52 picture rate elements (51-2)

| | | | | | | |
|---|---|---|---|---|---|---|
| broken_link | 1bit flag | 1 | 205 | 205 | 2 | |
| picture header | | | | | | |
| temporal_reference | 10bit uimsbf | 10 | 206 | 215 | 1 | |
| picture_coding_type | 3bit uimsbf | 3 | 216 | 218 | 1 | |
| vbv_delay | 16bit uimsbf | 16 | 219 | 234 | 1 | should be calculated if not present in bitstream |
| full_pel_forward_vector | 1bit flags | 1 | 235 | 235 | 1 | |
| forward_f_code | 3bit uimsbf | 3 | 236 | 238 | 1 | |
| full_pel_backward_vector | 1bit flags | 1 | 239 | 239 | 1 | |
| backward_f_code | 3bit uimsbf | 3 | 240 | 242 | 1 | |
| picture coding extension | | | | | | |
| forward_horizontal_f_code | 4bit uimsbf | 4 | 243 | 246 | 1 | |
| forward_vertical_f_code | 4bit uimsbf | 4 | 247 | 250 | 1 | |
| backward_horizontal_f_code | 4bit uimsbf | 4 | 251 | 254 | 1 | |
| backward_vertical_f_code | 4bit uimsbf | 4 | 255 | 258 | 1 | |
| intra_dc_precision | 2bit uimsbf | 2 | 259 | 260 | 1 | |
| picture_stucture | 2bit uimsbf | 2 | 261 | 262 | 1 | |
| top_field_first | 1bit flag | 1 | 263 | 263 | 1 | |
| frame_pred_frame_dct | 1bit flag | 1 | 264 | 264 | 1 | |
| concealment_motion_vectors | 1bit flag | 1 | 265 | 265 | 1 | |
| q_scale_type | 1bit flag | 1 | 266 | 266 | 1 | |
| intra_vlc_format | 1bit flag | 1 | 267 | 267 | 1 | |
| alternate_scan | 1bit flag | 1 | 268 | 268 | 1 | |
| repeat_first_field | 1bit flag | 1 | 269 | 269 | 1 | |
| chroma_420_type | 1bit flag | 1 | 270 | 270 | 1 | |
| progressive_frame | 1bit flag | 1 | 271 | 271 | 1 | |
| composite_display_flag | 1bit flag | 1 | 272 | 272 | 1 | |
|   v_axls | 1bit flag | 1 | 273 | 273 | 1 | |
|   field_sequence | 3bit uimsbf | 3 | 274 | 276 | 1 | |
|   sub_carrier | 1bit flag | 1 | 277 | 277 | 1 | |
|   burst_amplitude | 7bit uimsbf | 7 | 278 | 284 | 1 | |
|   sub_carrier_phase | 8bit uimsbf | 8 | 285 | 292 | 1 | |
| quant matrix extension | | | | | | |
| load_intra_quantiser_matrix | 1bit flag | 1 | 293 | 293 | 1 | (1) |
| load_non_intra_quantiser_matrix | 1bit flag | 1 | 294 | 294 | 1 | (1) |
| load_chroma_intra_quantiser_matrix | 1bit flag | 1 | 295 | 295 | 1 | (1) |
| load_chroma_non_intra_quantiser_matrix | 1bit flag | 1 | 296 | 296 | 1 | (1) |
| intra_quantiser_matrix[64] | 64*0...255 | 512 | 297 | 808 | 2 | (1) |
| non_intra_quantiser_matrix[64] | 64*0...255 | 512 | 809 | 1320 | 2 | (1) |
| chroma_intra_quantiser_matrix[64] | 64*0...255 | 512 | 1321 | 1832 | 2 | (1) |
| chroma_non_intra_quantiser_matrix[64] | 64*0...255 | 512 | 1833 | 2344 | 2 | (1) |
| picture_display_extension | | | | | | |
| frame_centre_horizontal_offset_1 | 16bit uimsbf | 16 | 2345 | 2360 | 2 | |
| frame_centre_vertical_offset_1 | 16bit uimsbf | 16 | 2361 | 2376 | 2 | |
| frame_centre_horizontal_offset_2 | 16bit uimsbf | 16 | 2377 | 2392 | 2 | |

FIG. 53 picture rate elements(51-3)

| | | | | | |
|---|---|---|---|---|---|
| frame_centre_vertical_offset_2 | 16bit uimsbf | 16 | 2393 | 2408 | 2 |
| frame_centre_horizontal_offset_3 | 16bit uimsbf | 16 | 2409 | 2424 | 2 |
| frame_centre_vertical_offset_3 | 16bit uimsbf | 16 | 2425 | 2440 | 2 |
| copyright extension | | | | | |
| copyright_flag | 1bit flag | 1 | 2441 | 2441 | 2 |
| copyright_identifier | 8bit code | 8 | 2442 | 2449 | 2 |
| original_or_copy | 1bit flag | 1 | 2450 | 2450 | 2 |
| copyright_number | 64bit uimsbf | 64 | 2451 | 2514 | 2 |
| PTS / DTS | | | | | |
| PTS_DTS_flag | 2bit flag | 2 | 2515 | 2516 | 1 |
| PTS_Value | 33bit uimsbt | 33 | 2517 | 2549 | 2 |
| DTS_Value | 33bit uimsbt | 33 | 2550 | 2582 | 2 |
| spare reserved bits | | | | | |
| spare | 41bit uimsbt | 41 | 2583 | 2623 | |
| user data area | | | | | |
| user_data | | | 1664 | 2624 | 4287 | 2 |
| picture rate information CRC | | | | | |
| 32-bit_protection_CRT | 32bit uimsbt | 32 | 4288 | 4319 | |

FIG. 54

| | | | | | | | | |
|---|---|---|---|---|---|---|---|---|
| D9 | Cb[0][9] | Y[0][9] | Cr[0][9] | Y[1][9] | Cb[1][9] | Y[2][9] | Cr[1][9] | Y[3][9] |
| D8 | Cb[0][8] | Y[0][8] | Cr[0][8] | Y[1][8] | Cb[1][8] | Y[2][8] | Cr[1][8] | Y[3][8] |
| D7 | Cb[0][7] | Y[0][7] | Cr[0][7] | Y[1][7] | Cb[1][7] | Y[2][7] | Cr[1][7] | Y[3][7] |
| D6 | Cb[0][6] | Y[0][6] | Cr[0][6] | Y[1][6] | Cb[1][6] | Y[2][6] | Cr[1][6] | Y[3][6] |
| D5 | Cb[0][5] | Y[0][5] | Cr[0][5] | Y[1][5] | Cb[1][5] | Y[2][5] | Cr[1][5] | Y[3][5] |
| D4 | Cb[0][4] | Y[0][4] | Cr[0][4] | Y[1][4] | Cb[1][4] | Y[2][4] | Cr[1][4] | Y[3][4] |
| D3 | Cb[0][3] | Y[0][3] | Cr[0][3] | Y[1][3] | Cb[1][3] | Y[2][3] | Cr[1][3] | Y[3][3] |
| D2 | Cb[0][2] | Y[0][2] | Cr[0][2] | Y[1][2] | Cb[1][2] | Y[2][2] | Cr[1][2] | Y[3][2] |
| D1 | Cb[0][1] | Y[0][1] | Cr[0][1] | Y[1][1] | Cb[1][1] | Y[2][1] | Cr[1][1] | Y[3][1] |
| D0 | Embedded Aligned MPEG-2 Re-Coding Information Bus | Y[0][0] | Embedded Aligned MPEG-2 Re-Coding Information Bus | Y[1][0] | Embedded Aligned MPEG-2 Re-Coding Information Bus | Y[2][0] | Embedded Aligned MPEG-2 Re-Coding Information Bus | Y[3][0] |

INFORMATION PROCESSING APPARATUS, INFORMATION PROCESSING METHOD AND RECORDING MEDIUM

This application is a continuation of Application Ser. No. 09/727,347, filed on Nov. 30, 2000 now U.S. Pat. No. 6,556,627, which application is hereby incorporated by reference.

BACKGROUND OF THE INVENTION

The present invention relates to an information-processing apparatus, an information-processing method and a recording medium. More particularly, the present invention relates to an information-processing apparatus, an information-processing method and a recording medium of a transcoding system that allow information to be transmitted in such a way that necessary information can be extracted from the transmitted information with ease in dependence on the degree of information importance, and allow information to be read out from the information-recording medium wherein the picture quality does not deteriorate even if decoding and encoding processes are carried out repeatedly to modify the structure of an encoded bit stream completing an encoding process based on an MPEG (Moving Picture Expert Group) standard.

In recent years, in a broadcasting station for producing and broadcasting television programs, an MPEG technology is generally adopted to carry out processing to compress and/or encode video data. In particular, the MPEG technology is becoming a de-facto standard for recording video data into a random-access recording medium material or a tape and transmitting video data through a cable or by way of a satellite.

The following description briefly explains typical processing carried out at a broadcasting station up to transmission of a video program produced at the broadcasting station to homes. First of all, an encoder employed in a cam-coder encodes source video data and records the encoded data onto a magnetic tape of a VTR (Video Tape Recorder) A cam-coder is an apparatus comprising a video camera and the VTR, which are integrated to form a single body. At that time, the encoder employed in the cam-coder encodes the source video data into codes with a recording format suitable for the magnetic tape of the VTR. For example, in a GOP (Group of Pictures) structure of an MPEG bit stream recorded onto the magnetic tape, 1 GOP consists of 2 picture frames. Thus, an MPEG bit stream is a sequence of picture frames such as I, B, I, B, I, B and so on where notations I and B represent picture frames with different types. An MPEG bit stream is recorded onto a magnetic tape at a bit rate of 18 Mbps.

Then, edit processing is carried out at a main broadcasting station to edit the video bit stream recorded on the magnetic tape. In order to carry out the edit processing, the GOP structure of the video bit stream recorded on the magnetic tape is converted into a GOP structure suitable for the edit processing. In a GOP structure suitable for the edit processing, 1 GOP comprises 1 frame and all pictures are I pictures. This is because, in order to carry out the edit processing in frame units, the I picture is most suitable since the I picture has no correlation with other pictures. In an actual edit operation, the video bit stream recorded on the magnetic tape is first decoded, being restored to base-band video data. Then, the base-band video signal is re-encoded so as to convert each picture into an I picture. By carrying out decoding and re-encoding processes in this way, it is possible to generate a bit stream having a GOP structure suitable for the edit processing.

Next, in order to transmit an edited video program obtained as a result of the editing described above from the main broadcasting station to a local broadcasting station, the GOP structure and the bit rate of the bit stream of the edited video program are converted into a GOP structure and a bit rate that are suitable for transmission processing. A GOP structure suitable for transmission between stations is a GOP structure in which 1 GOP consists of 15 picture frames such as I, B, B, P, B, B, P and so on where notation P represents a picture frame of a certain type different from the picture frames I and B. On the other hand, a desirable value of the bit rate suitable for transmission between stations is at least 50 Mbps. This is because a dedicated transmission line having a high transmission capacity is generally used for transmission between stations. To put it concretely, the bit stream of the video program obtained as a result of the edit processing is first decoded, being restored to base-band video data. Then, the base-band video data is re-encoded to convert the GOP structure and the bit rate of the base-band video data into a GOP structure and a bit rate that are suitable for the transmission processing.

At a local broadcasting station, edit processing is carried out to insert commercials unique to the geographical area of the local broadcasting station into the video program received from the main broadcasting station. That is to say, much like the edit processing described above, the video bit stream received from the main broadcasting station is first decoded, being restored to base-band video data. Then, the base-band video signal is re-encoded so as to convert each picture into an I picture. By carrying out decoding and encoding processes in this way, it is possible to generate a bit stream having a GOP structure suitable for the edit processing.

Next, in order to transmit an edited video program obtained as a result of the editing described above from the local broadcasting station to homes, the GOP structure and the bit rate of the bit stream of the edited video program are converted into a GOP structure and a bit rate that are suitable for transmission processing. A GOP structure suitable for transmission from a local broadcasting station to homes is a GOP structure in which 1 GOP consists of 15 picture frames such as I, B, B, P, B, B, P and so on. On the other hand, a desirable value of the bit rate suitable for transmission from a local broadcasting station to homes is about 5 Mbps. To put it concretely, the bit stream of the video program obtained as a result of the edit processing is first decoded, being restored to base-band video data. Then, the base-band video data is re-encoded to convert the GOP structure and the bit rate of the base-band video data into a GOP structure and a bit rate that are suitable for the transmission processing.

As is obvious from the above description, during transmission of a video program from the main broadcasting station to homes, decoding and encoding processes are carried out repeatedly a plurality of times. In actuality, processing carried out at a broadcasting station includes various kinds of necessary signal processing other than the signal processing described above and, for each signal processing, decoding and encoding processes must be performed.

Unfortunately, however, encoding and decoding processes based on the MPEG standard are not 100% reversible processes as is generally known. That is to say, video data obtained as a result of a decoding process is not 100% the same as base-band video data prior to an encoding process.

To be more specific, the picture quality deteriorates due to the encoding and decoding processes. To put it in detail, when the encoding and decoding processes are carried out repeatedly as described above, there is raised a problem that the picture quality inevitably deteriorates each time a process is performed. In other words, each time the decoding and/or encoding processes are repeated, the picture quality deteriorates cumulatively.

In order to solve this problem, there has been proposed a technique for preventing the picture quality from deteriorating by transmission of an encoding history of transmitted video data along with the video data and execution of encoding and decoding processes by using the encoding history.

In the execution of the decoding and encoding processes, however, a transcoding system may not require all parameters in some cases in dependence on the application to process pictures. Since an area in which required data is located is not known, nevertheless, it is necessary to design such hardware that all data is accessible to the transcoding system. For this reason, the hardware becomes unavoidably complicated and, as a result, the information-processing apparatus inevitably becomes large in scale. In addition, if a packet is lost due to an effect of a noise, restoration of data including and following the lost packet becomes difficult so that it is feared that much data is unavoidably lost.

SUMMARY OF THE INVENTION

It is thus an object of the present invention addressing the problems described above to provide an information-processing apparatus, an information-processing method and a recording medium that allow information to be transmitted in such a way that necessary information can be extracted from the transmitted information with ease by modifying a technique to superpose data in dependence on the degree of data importance and by recording the data at predetermined locations such as a vertical blanking area and a horizontal blanking area, and allow information to be read out from the information-recording medium in a transcoding system wherein the picture quality does not deteriorate even if decoding and encoding processes are carried out repeatedly to modify the GOP structure of an encoded bit stream completing an encoding process based on the MPEG standard.

To achieve the above object, according to a first aspect of the present invention, there is provided an information-processing apparatus for decoding an input encoded stream and generating an output signal, the information-processing apparatus including extraction means for extracting auxiliary data from the input encoded stream, separation means for splitting the auxiliary data extracted by the extraction means into first auxiliary data and second auxiliary data, conversion means for converting the first auxiliary data and the second auxiliary data, which were separated by the separation means, into data having a predetermined format, and insertion means for inserting the first auxiliary data and the second auxiliary data, which were converted by the conversion means, into a first position and a second position of the output signal respectively.

According to a second aspect of the present invention, there is provided an information-processing method adopted by an information-processing apparatus for decoding an input encoded stream and generating an output signal, the information-processing method including an extraction step of extracting auxiliary data from the input encoded stream, a separation step of splitting the auxiliary data extracted at the extraction step into first auxiliary data and second auxiliary data, a conversion step of converting the first auxiliary data and the second auxiliary data, which were separated at the separation step, into data having a predetermined format, and an insertion step of inserting the first auxiliary data and the second auxiliary data, which were converted at the conversion step, into a first position and a second position of the output signal respectively.

According to a third aspect of the present invention, there is provided a recording medium employed in an information-processing apparatus for decoding an input encoded stream and generating an output signal, the recording medium used for recording a program executable by a computer to implement a method including an extraction step of extracting auxiliary data from the input encoded stream, a separation step of splitting the auxiliary data extracted at the extraction step into first auxiliary data and second auxiliary data, a conversion step of converting the first auxiliary data and the second auxiliary data, which were separated at the separation step, into data having a predetermined format, and an insertion step of inserting the first auxiliary data and the second auxiliary data, which were converted at the conversion step, into a first position and a second position of the output signal respectively.

In the information-processing apparatus, the information-processing method and the recording medium, it is possible to generate and output data from which required information can be fetched with ease on a reception side.

According to a fourth aspect of the present invention, there is provided an information-processing apparatus for encoding an input signal and generating an output signal, the information-processing apparatus including extraction means for extracting first auxiliary data or second auxiliary data, which were inserted into a first position or a second position of the input signal respectively, selection means for selecting either the first auxiliary data or the second auxiliary data, which were extracted by the extraction means, and encoding means for encoding the input signal by utilizing the first auxiliary data or the second auxiliary data, which were selected by the selection means.

According to a fifth aspect of the present invention, there is provided an information-processing method adopted in an information-processing apparatus for encoding an input signal and generating an output signal, the information-processing method including an extraction step of extracting first auxiliary data or second auxiliary data, which were inserted into a first position or a second position of the input signal respectively, a selection step of selecting either the first auxiliary data or the second auxiliary data, which were extracted at the extraction step, and an encoding step of encoding the input signal by utilizing the first auxiliary data or the second auxiliary data, which were selected at the selection step.

According to a sixth aspect of the present invention, there is provided a recording medium employed in an information-processing apparatus for encoding an input signal and generating an output signal, the recording medium used for recording a program executable by a computer to implement a method including an extraction step of extracting first auxiliary data or second auxiliary data, which were inserted into a first position or a second position of the input signal respectively, a selection step of selecting either the first auxiliary data or the second auxiliary data, which were extracted at the extraction step, and an encoding step of encoding the input signal by utilizing the first auxiliary data or the second auxiliary data, which were selected at the selection step.

In the information-processing apparatus, the information-processing method and the recording medium, it is possible to fetch only necessary information with ease from the input signal and use the information in an encoding process.

According to a seventh aspect of the present invention, there is provided an information-processing apparatus for generating a second encoded stream from a first input encoded stream and outputting the second encoded stream, the information-processing apparatus including decoding means for decoding the first input encoded stream, and generation means for encoding the first encoded stream decoded by the decoding means to generate the second encoded stream, wherein the decoding means has first extraction means for extracting auxiliary data from the first input encoded stream, separation means for splitting the auxiliary data extracted by the first extraction means into first auxiliary data and second auxiliary data, conversion means for converting the first auxiliary data and the second auxiliary data, which were separated by the separation means, into data having a predetermined format, and insertion means for inserting the first auxiliary data and the second auxiliary data, which were converted by the conversion means, respectively into a first position and a second position of the first encoded stream decoded by the decoding means, the decoding means decodes the first encoded stream by using the auxiliary data extracted by the first extraction means, the generation means has second extraction means for extracting the first auxiliary data or the second auxiliary data respectively from the first position or the second position of the first encoded stream decoded by the decoding means, and selection means for selecting either the first auxiliary data or the second auxiliary data, which were extracted by the second extraction means, and the generation means encodes the first encoded stream decoded and supplied thereto by the decoding means by using the first auxiliary data or the second auxiliary data, which was selected by the selection means, to generate the second encoded stream.

According to an eighth aspect of the present invention, there is provided an information-processing method adopted by an information-processing apparatus for generating a second encoded stream from a first input encoded stream and outputting the second encoded stream, the information-processing method including a decoding step of decoding the first input encoded stream, and a generation step of encoding the first encoded stream decoded at the decoding step to generate the second encoded stream, wherein the decoding step has a first extraction sub-step of extracting auxiliary data from the first input encoded stream, a separation sub-step of splitting the auxiliary data extracted at the first extraction sub-step into first auxiliary data and second auxiliary data, a conversion sub-step of converting the first auxiliary data and the second auxiliary data, which were separated at the separation sub-step, into data having a predetermined format, and an insertion sub-step of inserting the first auxiliary data and the second auxiliary data, which were converted at the conversion sub-step, respectively into a first position and a second position of the first encoded stream decoded at the decoding step, the decoding step is executed to decode the first encoded stream by using the auxiliary data extracted at the first extraction sub-step, the generation step has a second extraction sub-step of extracting the first auxiliary data or the second auxiliary data respectively from the first position or the second position of the first encoded stream decoded at the decoding step, and a selection sub-step of selecting either the first auxiliary data or the second auxiliary data, which was extracted at the second extraction sub-step, and the generation step is executed to encode the first encoded stream decoded and supplied thereto at the decoding step by using the first auxiliary data or the second auxiliary data, which was selected at the selection sub-step, to generate the second encoded stream.

According to a ninth aspect of the present invention, there is provided a recording medium employed in an information-processing apparatus for generating a second encoded stream from a first input encoded stream and outputting the second encoded stream, the recording medium used for recording a program executable by a computer to implement a method including a decoding step of decoding the first input encoded stream, and a generation step of encoding the first encoded stream decoded at the decoding step to generate the second encoded stream, wherein the decoding step has a first extraction sub-step of extracting auxiliary data from the first input encoded stream, a separation sub-step of splitting the auxiliary data extracted at the first extraction sub-step into first auxiliary data and second auxiliary data, a conversion sub-step of converting the first auxiliary data and the second auxiliary data, which were separated at the separation sub-step, into data having a predetermined format, and an insertion sub-step of inserting the first auxiliary data and the second auxiliary data, which were converted at the conversion sub-step, respectively into a first position and a second position of the first encoded stream decoded at the decoding step, the decoding step is executed to decode, the first encoded stream by using the auxiliary data extracted at the first extraction sub-step, the generation step has a second extraction sub-step of extracting the first auxiliary data or the second auxiliary data respectively from the first position or the second position of the first encoded stream decoded at the decoding step, and a selection sub-step of selecting either the first auxiliary data or the second auxiliary data, which was extracted at the second extraction sub-step, and the generation step is executed to encode the first encoded stream decoded and supplied thereto at the decoding step by using the first auxiliary data or the second auxiliary data, which was selected at the selection sub-step, to generate the second encoded stream.

In the information-processing apparatus, the information-processing method and the recording medium, it is possible to fetch only necessary information with ease from the input signal and use the information in an encoding process.

According to a tenth aspect of the present invention, there is provided a decoding apparatus for decoding an encoded source stream, the decoding apparatus including decoding means for decoding the encoded source stream in order to generate a base-band video signal by using encoding parameters included in the encoded source stream, vertical insertion means for inserting much required ones among the encoding parameters into a vertical-blanking period of the base-band video signal, and horizontal insertion means for inserting little required ones among the encoding parameters into a horizontal-blanking period of the base-band video signal.

According to an eleventh aspect of the present invention, there is provided a decoding method adopted by a decoding apparatus for decoding an encoded source stream, the decoding method including the steps of decoding the encoded source stream in order to generate a base-band video signal by using encoding parameters included in the encoded source stream, inserting much required ones among the encoding parameters into a vertical-blanking period of the base-band video signal, and inserting little required ones among the encoding parameters into a horizontal-blanking period of the base-band video signal.

According to a twelfth aspect of the present invention, there is provided a decoding apparatus for decoding an encoded source stream, the decoding apparatus including decoding means for decoding the encoded source stream in order to generate a base-band video signal by using encoding parameters included in the encoded source stream, vertical insertion means for inserting those of picture and higher layers among the encoding parameters into a vertical-blanking period of the base-band video signal, and horizontal insertion means for inserting those of slice and lower layers among the encoding parameters into a horizontal-blanking period of the base-band video signal.

According to a thirteenth aspect of the present invention, there is provided a decoding method adopted by a decoding apparatus for decoding an encoded source stream, the decoding method including the steps of decoding the encoded source stream in order to generate a base-band video signal by using encoding parameters included in the encoded source stream, inserting those of picture and higher layers among the encoding parameters into a vertical-blanking period of the base-band video signal, and inserting those of slice and lower layers among the encoding parameters into a horizontal-blanking period of the base-band video signal.

According to a fourteenth aspect of the present invention, there is a decoding apparatus for decoding an encoded source stream, the decoding apparatus including decoding means for decoding the encoded source stream in order to generate a base-band video signal by using encoding parameters included in the encoded source stream, vertical insertion means for inserting general ones among the encoding parameters into a vertical-blanking period of the base-band video signal, and horizontal insertion means for inserting detailed ones among the encoding parameters into a horizontal-blanking period of the base-band video signal.

According to a fifteenth aspect of the present invention, there is provided a decoding method adopted by a decoding apparatus for decoding an encoded source stream, the decoding method including the steps of decoding the encoded source stream in order to generate a base-band video signal by using encoding parameters included in the encoded source stream, inserting general ones among the encoding parameters into a vertical-blanking period of the base-band video signal, and inserting detailed ones among the encoding parameters into a horizontal-blanking period of the base-band video signal.

According to a sixteenth aspect of the present invention, there is provided an encoding apparatus for encoding a base-band video signal, the encoding apparatus including extraction means for extracting much required encoding parameters from a vertical blanking period of the base-band video signal and little required encoding parameters from a horizontal blanking period of the base-band video signal, and re-encoding means for re-encoding the base-band video signal by referring to the much required encoding parameters and the little required encoding parameters.

According to a seventeenth aspect of the present invention, there is provided an encoding method adopted in an encoding apparatus for encoding a base-band video signal, the encoding method including the steps of extracting much required encoding parameters from a vertical blanking period of the base-band video signal and little required encoding parameters from a horizontal blanking period of the base-band video signal, and re-encoding the base-band video signal by referring to the much required encoding parameters and the little required encoding parameters.

According to an eighteenth aspect of the present invention, there is provided an encoding apparatus for encoding a base-band video signal, the encoding apparatus including extraction means for extracting encoding parameters of picture and higher layers from a vertical blanking period of the base-band video signal and encoding parameters of slice and lower layers from a horizontal blanking period of the base-band video signal, and re-encoding means for re-encoding the base-band video signal by referring to the encoding parameters of picture and higher layers and the encoding parameters of slice and lower layers.

According to a nineteenth aspect of the present invention, there is provided an encoding method adopted in an encoding apparatus for encoding a base-band video signal, the encoding method including the steps of extracting encoding parameters of picture and higher layers from a vertical blanking period of the base-band video signal and encoding parameters of slice and lower layers from a horizontal blanking period of the base-band video signal, and re-encoding the base-band video signal by referring to the encoding parameters of picture and higher layers and the encoding parameters of slice and lower layers.

According to a twentieth aspect of the present invention, there is provided an encoding apparatus for encoding a base-band video signal, the encoding apparatus including extraction means for extracting general encoding parameters from a vertical blanking period of the base-band video signal and detailed encoding parameters from a horizontal blanking period of the base-band video signal, and re-encoding means for re-encoding the base-band video signal by referring to the general encoding parameters and the detailed encoding parameters.

According to a twenty-first aspect of the present invention, there is provided an encoding method adopted in an encoding apparatus for encoding a base-band video signal, the encoding method including the steps of extracting general encoding parameters from a vertical blanking period of the base-band video signal and detailed encoding parameters from a horizontal blanking period of the base-band video signal, and re-encoding the base-band video signal by referring to the general encoding parameters and the detailed encoding parameters.

The above and other objects, features and advantages of the present invention will become apparent from the following description and the appended claims, take in conjunction with the accompanying drawings in which like parts or elements denoted by like reference symbols.

BRIEF DESCRIPTION OF THE DRAWINGS

FIG. 6 is an explanatory diagram showing pixels of a macroblock;

FIG. 9 is an explanatory diagram used for describing a field structure and a frame structure;

FIG. 11 is an explanatory diagram used for describing an area in which encoding parameters are stored;

FIG. 15 is an explanatory diagram used for describing the syntax of the stream of a video sequence;

FIG. 16 is an explanatory diagram used for describing the configuration of the syntax shown in FIG. 15;

FIG. 17 is an explanatory diagram used for describing the syntax of history_stream ( ) for recording history information with a fixed length;

FIG. 18 is an explanatory diagram used for describing the syntax of history_stream ( ) for recording history information with a fixed length;

FIG. 19 is an explanatory diagram used for describing the syntax of history_stream ( ) for recording history information with a fixed length;

FIG. 20 is an explanatory diagram used for describing the syntax of history_stream ( ) for recording history information with a fixed length;

FIG. 21 is an explanatory diagram used for describing the syntax of history_stream ( ) for recording history information with a fixed length;

FIG. 22 is an explanatory diagram used for describing the syntax of history_stream ( ) for recording history information with a fixed length;

FIG. 23 is an explanatory diagram used for describing the syntax of history_stream ( ) for recording history information with a fixed length;

FIG. 24 is an explanatory diagram used for describing the syntax of history_stream ( ) for recording history information with a variable length;

FIG. 25 is an explanatory diagram used for describing the syntax of sequence_header ( );

FIG. 26 is an explanatory diagram used for describing the syntax of sequence_extension ( );

FIG. 27 is an explanatory diagram used for describing the syntax of extension_and_user_data ( );

FIG. 28 is an explanatory diagram used for describing the syntax of user_data ( );

FIG. 29 is an explanatory diagram used for describing the syntax of group_of_picture_header ( );

FIG. 30 is an explanatory diagram used for describing the syntax of picture_header ( );

FIG. 31 is an explanatory diagram used for describing the syntax of picture_coding_extension ( );

FIG. 32 is an explanatory diagram used for describing the syntax of extension_data ( );

FIG. 33 is an explanatory diagram used for describing the syntax of quant_matrix_extension ( );

FIG. 34 is an explanatory diagram used for describing the syntax of copyright_extension ( );

FIG. 35 is an explanatory diagram used for describing the syntax of picture_display_extension ( );

FIG. 36 is an explanatory diagram used for describing the syntax of picture_data ( );

FIG. 37 is an explanatory diagram used for describing the syntax of slice ( );

FIG. 38 is an explanatory diagram used for describing the syntax of macroblock ( );

FIG. 39 is an explanatory diagram used for describing the syntax of macroblock_modes ( );

FIG. 40 is an explanatory diagram used for describing the syntax of motion_vectors (s);

FIG. 41 is an explanatory diagram used for describing the syntax of motion_vector (r, s);

FIG. 42 is an explanatory diagram used for describing a variable-length code of macroblock_type for an I-picture;

FIG. 43 is an explanatory diagram used for describing a variable-length code of macroblock_type for a P-picture;

FIG. 44 is an explanatory diagram used for describing a variable-length code of macroblock_type for a B-picture;

FIG. 46 is an explanatory diagram used for describing each combination of history-information items;

FIG. 47 shows a flowchart representing the operation of the transcoding system shown in FIG. 45;

FIG. 48 is an explanatory diagram used for describing the syntax of re_coding_stream_info ( );

FIG. 49 is an explanatory diagram used for describing red_bw_flag and red_bw_indicator;

FIG. 50 is an explanatory diagram used for describing a Re_Coding Information Bus macroblock formation;

FIG. 51 is an explanatory diagram used for describing picture rate elements;

FIG. 52 is an explanatory diagram used for describing other picture rate elements;

FIG. 53 is an explanatory diagram used for describing further picture rate elements; and FIG. 54 is an explanatory diagram used for describing an area in which a Re_Coding Information Bus is recorded.

DETAILED DESCRIPTION OF THE PREFERRED EMBODIMENTS

Preferred embodiments of the present invention are described by referring to diagrams as follows.

Figure 1:
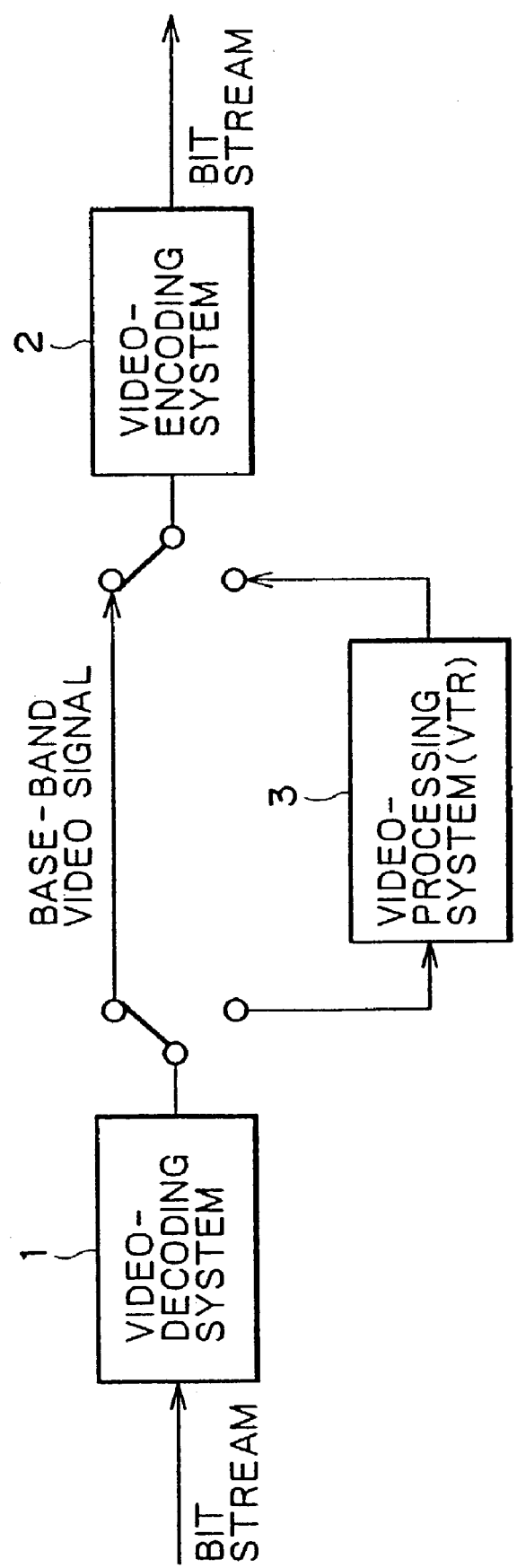
FIG. 1 is a block diagram showing a configuration of a transcoding system provided by the present invention.

FIG. 1 is a block diagram showing a transcoding system provided by the present invention. A video-decoding system 1 receives a bit stream as an input and decodes the input signal by adoption of a technique explained later by referring to FIG. 5. Then, the video-decoding system 1 writes information, if required, into a V blanking area and an H blanking area, which will be described later by referring to FIG. 7. Finally, the video-decoding system 1 converts the decoded signal into an output base-band video signal. A video-encoding system 2 receives the base-band video signal as an input and fetches information, if required, from the V blanking area and the H blanking area. The video-encoding system 2 then encodes the input signal by adoption of a technique explained later by referring to FIG. 12 and finally converts the encoded signal into an output bit stream.

A VTR 3 serving as a video-processing system is used for editing the base-band video signal.

Figure 2:
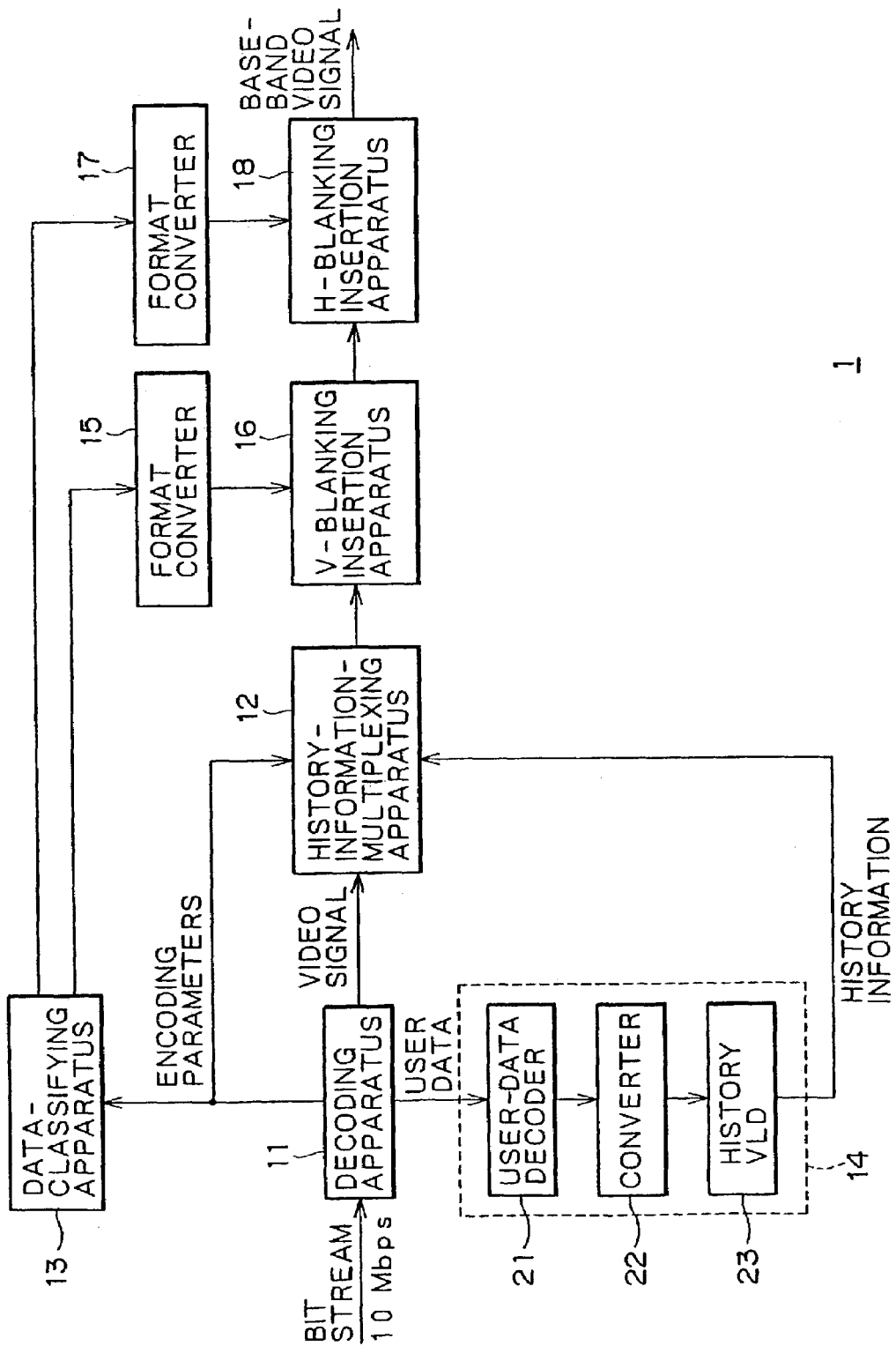
FIG. 2 is a block diagram showing a detailed configuration of a video-decoding system employed in the transcoding system shown in FIG. 1.

FIG. 2 is a block diagram showing a detailed configuration of the video-decoding system 1.

A decoding apparatus 11 fetches a video signal from an input bit stream and outputs the video signal to a history-information-multiplexing apparatus 12. The decoding apparatus 11 also fetches encoding parameters of the immediately preceding generation and supplies the parameters to the history-information-multiplexing apparatus 12 and a data-classifying apparatus 13. If this transcoding system is a fourth generation, for example, encoding parameters of a third generation are obtained. In addition, the decoding apparatus 11 outputs user data representing a conversion history of previous data supplied to the video-decoding system 1 to a history-decoding apparatus 14. The user data is thus encoding parameters of generations preceding the immediately preceding generation.

The encoding parameters supplied to the data-classifying apparatus 13 are classified into encoding parameters of picture and higher layers of importance to a number of applications, and encoding parameters of slice and lower layers of no importance to all applications. The former encoding parameters are supplied to a format encoder 15 whereas the latter encoding parameters are output to a format encoder 17. The format encoders 15 and 17 convert the formats of the encoding parameters into the format of an auxiliary packet and output results of the conversion to a V-blanking insertion apparatus 16 and an H blanking insertion apparatus 18 respectively.

The history-decoding apparatus 14 comprises a user-data decoder 21 for decoding the user data received from the decoding apparatus 11, a converter 22 for converting the output of the user-data decoder 21 and a history VLD (Variable-Length Decoder) 23 for reproducing history information from the output of the converter 22.

The user-data decoder 21 decodes user data supplied by the decoding apparatus 11, supplying a result of the decoding to the converter 22. Details of the user data will be described later by referring to FIG. 28. At any rate, the user data denoted by user_data ( ) comprises user_data_start_code and user_data. According to MPEG specifications, appearance of 23 consecutive bits of "0" in user_data is prohibited in order to prevent the data from being detected incorrectly as user_data_start_code. By the way, history information referred to as history_stream ( ) may include 23 or more consecutive bits of 0 in its user data area, which is a kind of user_data conforming to the MPEG specifications. It is thus necessary to process the history information by insertion of a bit "1" into the user data area with a predetermined timing so that no 23 or more consecutive bits of 0 appear in user_data, converting the history information into a stream referred to as converted_history_stream ( ) to be described later by referring to FIG. 15. The component that carries out this conversion from history_stream ( ) into converted_history_stream ( ) is a converter 42 employed in a history-encoding apparatus 38 of the video-encoding system 2 of a previous generation shown in FIG. 3. On the other hand, the converter 22 employed in the history-decoding apparatus 14 carries out a conversion process to delete the bit "1". This conversion process is opposite to the conversion, which was performed by the converter 42 employed in the history-encoding apparatus 38 to insert the bit "1" so as to prevent 23 or more consecutive bits of 0 from appearing in the user data referred to as user_data.

The history VLD 23 generates history information from the output of the converter 22 and supplies the information to the history-information multiplexing apparatus 12. In this case, the history information is encoding parameters of the first and second generations.

To put it in detail, the history-decoding apparatus 14 analyzes the syntax of the received user data to find a unique ID referred to as History_Data_Id described in the user data. The History_Data_Id ID is used for extracting a stream referred to as converted_history_stream ( ). The history-decoding apparatus 14 is capable of further obtaining a stream referred to as history_stream ( ) by removing single marker bits inserted at predetermined intervals into converted_history_stream ( ). Then, the history-decoding apparatus 14 analyzes the syntax of history_system ( ) to obtain the encoding parameters of the first and second generations.

Assume that the current processing is a fourth-generation change. In this case, data change histories received by the video-decoding system 1 is encoding parameters of the first, second and third generations, and the history-information-multiplexing apparatus 12 multiplexes the encoding parameters of the first, second and third generations with the base-band video data produced as a result of decoding by the decoding apparatus 11. The mixed data is to be supplied to the video-encoding system 2, which will carry out a fourth-generation encoding process.

A signal output by the history-information-multiplexing apparatus 12 is supplied to the V-blanking insertion apparatus 16 for inserting encoding parameters of picture and higher layers received from the format converter 15 into a V-blanking area to be described later by referring to FIG. 7. The output of the V-blanking insertion apparatus 16 is supplied to the H-blanking insertion apparatus 18 for inserting encoding parameters of slice and lower layers received from the format converter 17 into an H-blanking area to be described later by referring to FIG. 7. The output of the H-blanking insertion apparatus 16 is a base-band video signal supplied to the video-encoding system 2.

Figure 3:
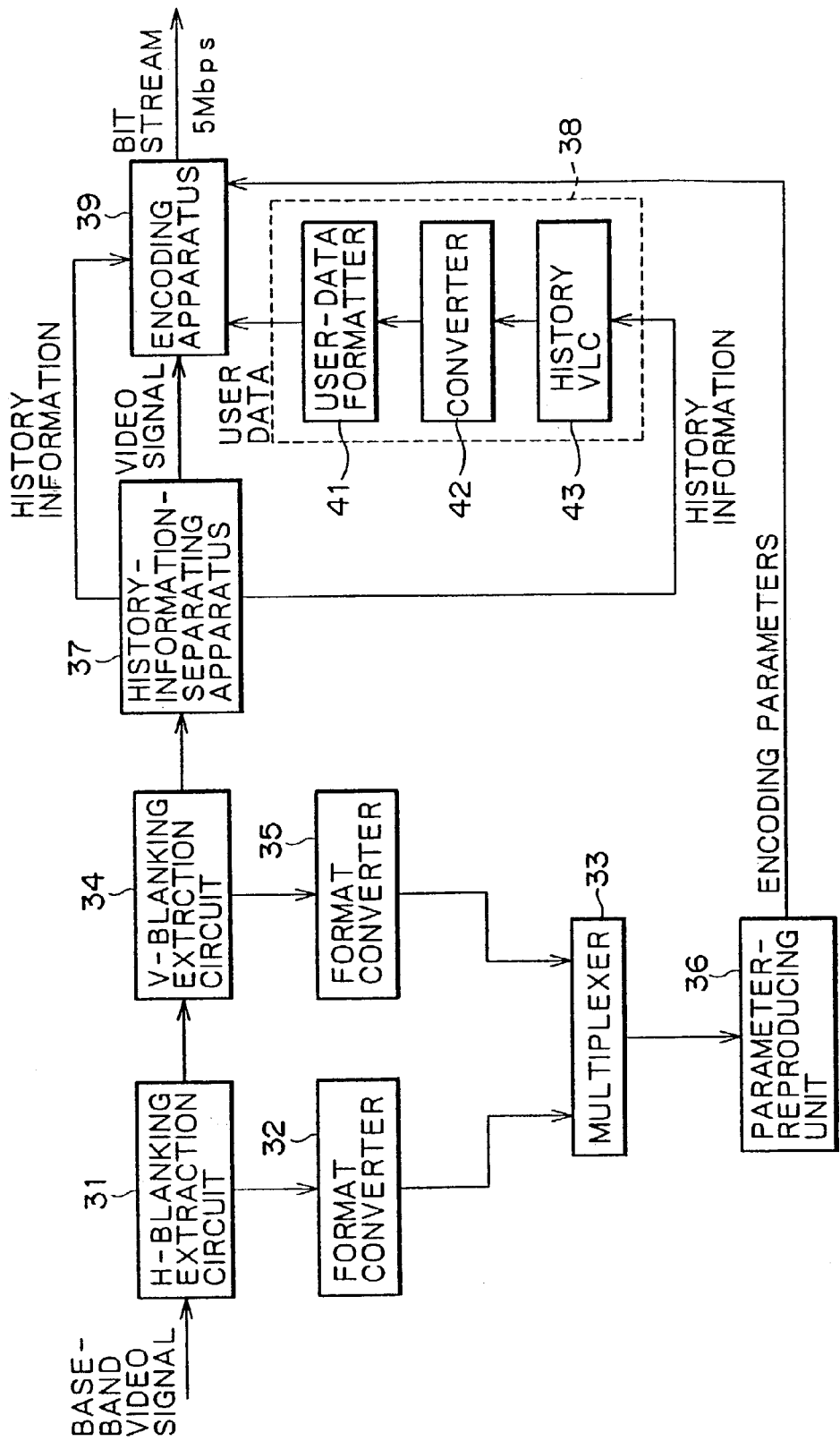
FIG. 3 is a block diagram showing a detailed configuration of a video-encoding system employed in the transcoding system shown in FIG. 1.

FIG. 3 is a block diagram showing a detailed configuration of the video-encoding system 2.

An H-blanking extraction apparatus 31 extracts an auxiliary packet superposed on an H-blanking area from the input base-band video signal and outputs the packet to a format converter 32. The format converter 32 converts the input format and outputs a packet with a converted format to a multiplexer 33. By the same token, a V-blanking extraction apparatus 34 extracts an auxiliary packet superposed on a V-blanking area from the input base-band video signal and outputs the packet to a format converter 35. The format converter 35 converts the input format and outputs a packet with a converted format to the multiplexer 33. The multiplexer 33 multiplexes the input signals and outputs a signal obtained as a result of multiplexing to a parameter-generating unit 36.

If a packet is missing, the parameter-generating unit 36 recovers the lost data by adoption of a technique to be described later by referring to FIG. 8, and outputs the corrected data to an encoding apparatus 39.

After the auxiliary packets have been extracted in the H-blanking extraction apparatus 31 and the V-blanking extraction apparatus 34, the data is supplied to a history-information-separating apparatus 37, which extracts base-band video data from the transmitted data. The video data is supplied to the encoding apparatus 39. The history-information-separating apparatus 37 also extracts history information of the first to third generations from the transmitted data and supplies the information to the encoding apparatus 39 and a history-encoding apparatus 38.

A history VLC (Variable Length Coder) 43 employed in the history-encoding apparatus 38 converts the format of the encoding parameters of the 3 generations, namely, the first, second and third generations, received from the history-information-separating apparatus 37 into a format of history information, which can have a fixed length shown in FIGS. 17 to 23 to be described later or a variable length shown in FIG. 24 to be described later. Details of the fixed-length and variable-length formats will be explained later.

A converter 42 converts the history information with a format obtained as a result of conversion by the history VLC 43 into a stream referred to as converted_history_stream ( ). The conversion in the converter 42 is carried out in order to prevent data referred to as start_code of user_data ( ) from being detected incorrectly as described earlier. To put it in detail, while 23 or more consecutive bits of 0 may appear in the history information, appearance of 23 or more consecutive bits of 0 in user_data is prohibited. Thus, the converter 42 must converts the history information by insertion of "1" with predetermined timings to comply with the prohibition.

A user-data formatter 41 adds the History_Data_Id ID to converted_history_stream ( ) received from the converter 42 in accordance with a format shown in FIG. 15 to be described later. The user-data formatter 41 also adds user_data_stream_code to converted_history_stream ( ). As a result, user_data conforming to the MPEG standard is generated. This user_data, which can be inserted into a video stream, is then supplied to the encoding apparatus 39.

The encoding apparatus 39 encodes the base-band video data received from the history-information separating apparatus 37, converting the data into a bit stream having a GOP structure and a bit rate, which are specified by an operator or a host computer. It should be noted that the structure of a GOP is modified typically by changing the number of pictures included in the GOP, the number of P pictures existing between 2 consecutive I pictures and the number of B pictures existing between an I picture and a subsequent P or I picture.

In this case, since the base-band video data received from the history-information separating apparatus 37 includes history information of the first to third generations superposed thereon, the encoding apparatus 39 carries out a re-encoding process of a fourth generation by selectively reutilizing these pieces of history information so as to reduce the amount of deterioration of the picture quality caused by the re-encoding process.

If only data of picture and higher layers is handled, all the hardware explained earlier by referring to FIGS. 2 and 3 is not required. That is to say, the format converter 17 and the H-blanking insertion apparatus 18 can be eliminated from the video-decoding system 1 shown in FIG. 2 whereas the format converter 32 and the H-blanking insertion apparatus 31 can be eliminated from the video-encoding system 2 shown in FIG. 3.

Figure 4:
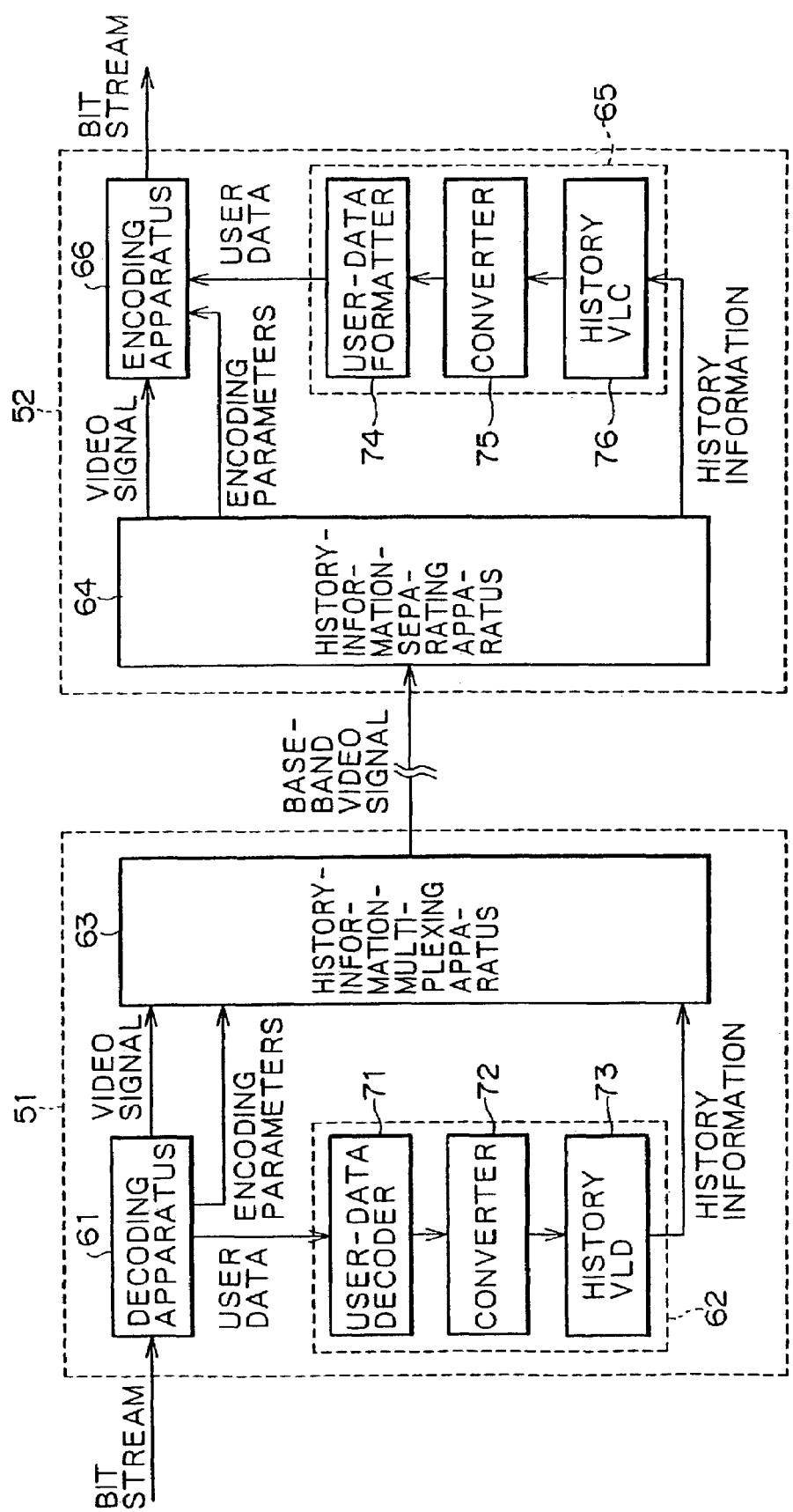
FIG. 4 is a block diagram showing another configuration of the transcoding system.

Assume that data of slice and lower layers is handled as frequently as data of picture and higher layers is. In this case, a video-decoding system 51 and a video-encoding system 52, which are shown in FIG. 4, may be used. As shown in the figure, the video-decoding system 51 comprises a decoding apparatus 61, a history-decoding apparatus 62 and a history-information-multiplexing apparatus 63 whereas the video-encoding system 52 comprises a history-information separating apparatus 64, a history-encoding apparatus 65 and an encoding apparatus 66.

The decoding apparatus 61 fetches a video signal and encoding parameters from an input bit stream, supplying the signal and the parameters to the history-information multiplexing apparatus 63. The decoding apparatus 61 also fetches user data from the input bit stream, and supplies the data to the history-decoding apparatus 62, which decodes the data in the same way as the history-decoding apparatus 14. The history-decoding apparatus 62 supplies a result of decoding to the history-information multiplexing apparatus 63. As will be described later by referring to FIG. 7, the history-information multiplexing apparatus 63 writes the encoding parameters into a specified area and supplies an output to the history-information-separating apparatus 64.

The history-information-separating apparatus 64 extracts base-band video data from data received from the history-information multiplexing apparatus 63 and supplies the video data to the encoding apparatus 66. The history-information-separating apparatus 64 also extracts history information of the first, second and third generations from predetermined locations in the data received from the history-information multiplexing apparatus 63 and supplies the information to the encoding apparatus 66 and the history-encoding apparatus 65. The history-encoding apparatus 65 carries out the same processing as the history-encoding apparatus 38 to encode the received history information. A result of the encoding process is supplied to the encoding apparatus 66. The encoding apparatus 66 encodes the received data, converting the data into a bit stream having a predetermined GOP structure and a predetermined bit rate.

Figure 5:
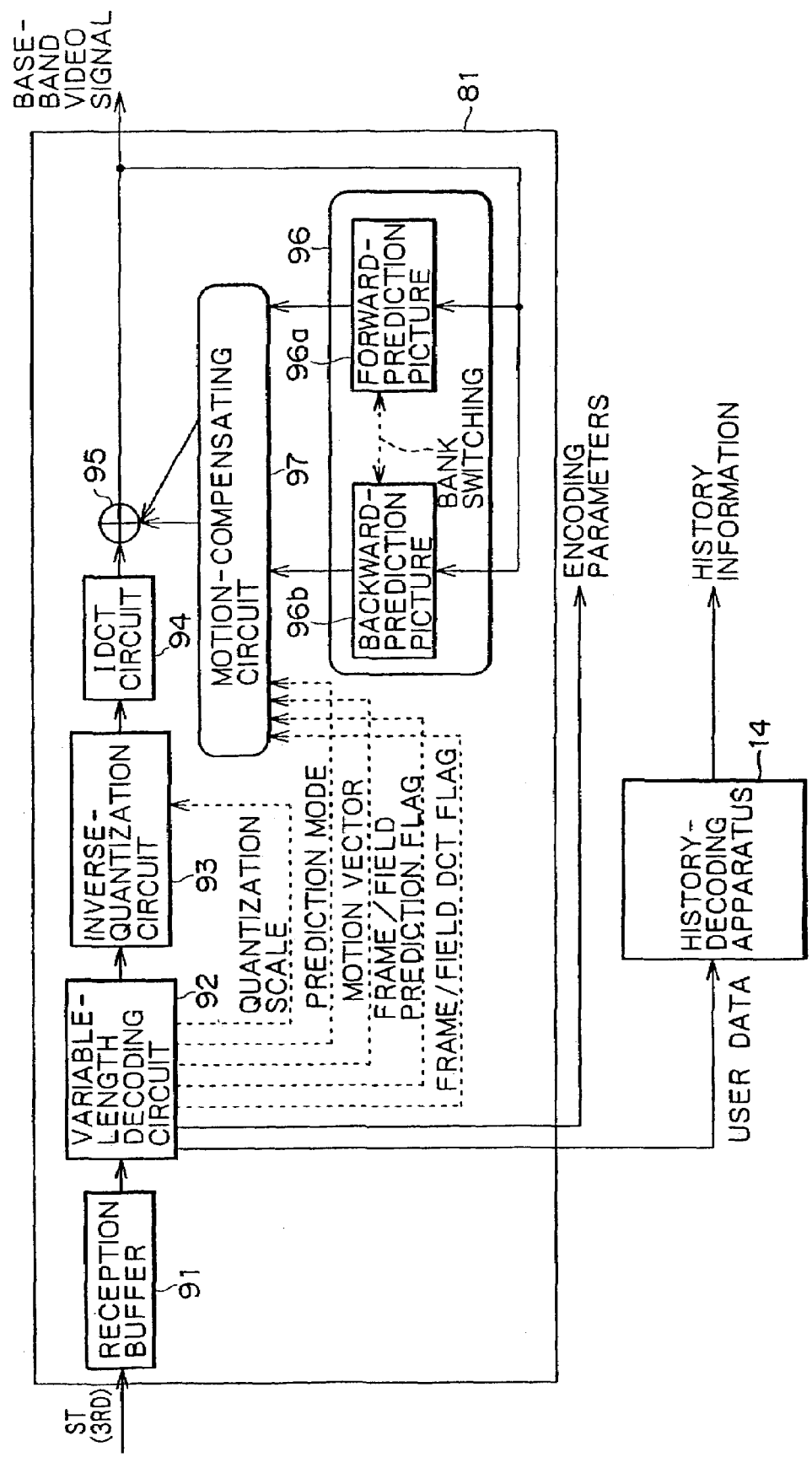
FIG. 5 is a block diagram showing a detailed configuration of a decoder embedded in a decoding apparatus employed in the video-decoding system shown in FIG. 2.

FIG. 5 is a block diagram showing a detailed configuration of a decoder 81 employed in the decoding apparatus 11 explained earlier by referring to FIG. 2 or the decoding apparatus 61 explained earlier by referring to FIG. 4.

As shown in FIG. 5, the decoder 81 comprises a reception buffer 91 for buffering a bit stream supplied to the decoder 81, a variable-length decoding circuit 92 for carrying out a variable-length decoding process on the encoded bit stream, an inverse-quantization circuit 93 for carrying out an inverse-quantization process on data obtained as a result of the variable-length decoding process in accordance with a quantization scale received from the variable-length decoding circuit 92, an IDCT (Inverse Discrete Cosine Transformation) circuit 94 for carrying out an IDCT process on DCT (Discrete Cosine Transformation) coefficients completing the inverse-quantization process, a processor 95 for carrying out a motion compensation process, a frame memory 96 and a motion-compensating circuit 97.

In order to decode the encoded bit stream of the immediately preceding generation, which is the third generation in this case, the variable-length decoding circuit 92 extracts encoding parameters described in the picture layer, the slice layer and the macroblock layer of the encoded bit stream. As described earlier by referring to FIG. 2, the encoding parameters are supplied also to the data-classifying apparatus 13 for classifying the encoding parameters into encoding parameters of picture and higher layers, and encoding parameters of slice and lower layers.

For example, encoding parameters of the third generation extracted by the variable-length decoding circuit 92 include picture_coding_type showing a picture type, quantiser_scale_code showing a quantization scale step size, macroblock_type showing a prediction mode, motion_vector showing a motion vector, frame/field_motion_type showing a frame prediction mode or a field prediction mode and dct_type showing a frame DCT mode or a field DCT mode. The quantiser_scale_code parameter is supplied to the inverse-quantization circuit 93 whereas the picture_coding_type, quantiser_scale_code, macroblock_type, motion_vector, frame/field_motion_type, dct_type and other parameters are supplied to the motion-compensating circuit 97.

The variable-length decoding circuit 92 extracts not only the above encoding parameters required for decoding the encoded bit stream of the third generation, but also encoding parameters to be transferred to a transcoding system of the fifth generation at a later stage as history information of the third generation from a sequence layer, a GOP layer, a picture layer, a slice layer and a macroblock layer of the encoded bit stream of the third generation. Of course, the encoding parameters of the third generation including the picture_coding_type, quantiser_scale_code, macroblock_type, motion_vector, frame/field_motion_type and dct_type parameters used in the decoding process of the third generation are included in the history information of the third generation. The operator or the host computer sets information indicating which encoding parameters are to be extracted as history information in accordance with factors such as a transmission capacity in advance.

In addition, the variable-length decoding circuit 92 extracts user data described in a user-data area on a picture layer of the encoded bit stream of the third generation, and supplies the user data to the history-decoding system 14.

As described above, the history-decoding apparatus 14 is a circuit for extracting encoding parameters of the first generation and encoding parameters of the second generation, which are described as history information, from user data described on a picture layer of the encoded bit stream of the third generation. The encoding parameters of the first generation and the encoding parameters of the second generation are encoding parameters of a generation preceding the immediately preceding generation, which is the third generation in this case.

Moreover, the variable-length decoding circuit 92 carries out a variable-length decoding process on data received from the reception buffer 91, and supplies a motion vector, a prediction mode, a prediction flag and a DCT flag to the motion-compensating circuit 97, a quantization scale to the inverse-quantization circuit 93 and decoded picture data to the inverse-quantization circuit 93.

The inverse-quantization circuit 93 carries out an inverse-quantization process on picture data received from the variable-length decoding circuit 92 in accordance with a quantization scale also received from the variable-length decoding circuit 92, and supplies data obtained as a result of the inverse-quantization process to the IDCT circuit 94. The IDCT circuit 94 carries out an inverse discrete cosine transformation process on the data, that is, DCT parameters, received from the inverse-quantization circuit 93, and supplies picture data obtained as a result of the inverse discrete cosine transformation process to the processor 95.

If the picture data supplied by the IDCT circuit 94 to the processor 95 is data of an I picture, the processor 95 outputs the data to a forward-prediction picture unit 96a of the frame memory 96 to be stored therein. The stored data will be used in generation of predicted-picture data of picture data supplied later to the processor 95. The picture data supplied later to the processor 95 is data of a P or B picture.

If the picture data supplied by the IDCT circuit 94 to the processor 95 is data of a P picture having picture data preceding by 1 frame as predicted-picture data as well as data of a forward-prediction mode, picture data, that is, data of an I picture preceding by 1 frame is read out from the forward-prediction picture unit 96a of the frame memory 96 and supplied to the motion-compensating circuit 97 for carrying out a motion compensation process corresponding to a motion vector received from the variable-length decoding circuit 92. The processor 95 adds picture data, that is, differential data received from the IDCT circuit 94, to the output of the motion-compensating circuit 97. The result of the addition, that is, data of a decoded P picture, is stored in a backward-prediction picture unit 96b of the frame memory 96. The stored data will be used in generation of predicted-picture data of picture data supplied later to the processor 95. The picture data supplied later to the processor 95 is data of a B or P picture.

As described above, even in the case of data of a P picture, data of an intra-picture prediction mode is not subjected to processing carried out by the processor 95 but stored in the backward-prediction picture unit 96b as it is as is the case with data of an I picture.

If the picture data supplied by the IDCT circuit 94 to the processor 95 is data of a B picture, a prediction mode received from the variable-length decoding circuit 92 is examined. If the prediction mode is a forward-prediction mode, picture data of an I picture is read out from the forward-prediction picture unit 96a of the frame memory 96. If the prediction mode is a backward-prediction mode, picture data of a P picture is read out from the backward-prediction picture unit 96b of the frame memory 96. If the prediction mode is a forward & backward-prediction mode, picture data of an I picture is read out from the forward-prediction picture unit 96a of the frame memory 96 and picture data of a P picture is read out from the backward-prediction picture unit 96b of the frame memory 96. The motion-compensating circuit 97 then carries out a motion compensation process for a motion vector output by the variable-length decoding circuit 92 to generate a predicted picture. In case motion compensation is not required or in the case of an intra-picture prediction mode, however, no predicted picture is generated.

The processor 95 adds the data completing the motion compensation process in the motion-compensating circuit 97 as described above to the output of the IDCT circuit 94, and outputs a result of the addition. If the result of the addition is data of a B picture, however, the result of the addition is not stored in the frame memory 96 since a B picture is not used in generation of a predicted picture for another picture. In addition, the motion-compensating circuit 97 also carries out processing to restore a structure, wherein signals of lines of odd fields are separated from signals of lines of even fields, back to the original structure.

After the image of the B picture has been output, data of a P picture stored in the backward-prediction picture unit 96b is read out and then supplied to the processor 95 by way of the motion-compensating circuit 97. It should be noted, however, that no motion compensation process is carried out at that time.

Then, outputs from the decoder 81 are supplied to the history-information-multiplexing apparatus 12. To put it concretely, base-band video data output by the processor 95 employed in the decoder 81, encoding parameters of the third generation output by the variable-length decoding circuit 92 employed in the decoder 81 and encoding parameters of the first and second generations output by the history-decoding apparatus 14 are supplied to the history-information-multiplexing apparatus 12, which then multiplexes the encoding parameters of the first, second and third generations with the base-band video data. As will be explained later by referring to FIG. 7, the history-information-multiplexing apparatus 12 records the encoding parameters into the H-blanking and V-blanking areas, generating output data.

The following description explains a technique to multiplex the encoding parameters of the first, second and third generations with the base-band video data by referring to FIGS. 6 to 11.

FIG. 6 is a diagram showing a macroblock consisting of 16 pixels×16 pixels as defined in the MPEG specifications. In respect of a luminance signal, the macroblock consisting of 16 pixels×16 pixels is composed of 4 sub-blocks Y[0], Y[1], Y[2] and Y[3], which each consist of 8 pixels×8 pixels.

By the same token, in respect of a chrominance signal, the macroblock consisting of 16 pixels×16 pixels is composed of 4 sub-blocks Cr[0], Cr[1], Cb[0] and Cb[1], which each consist of 8 pixels×8 pixels.

Figure 7:
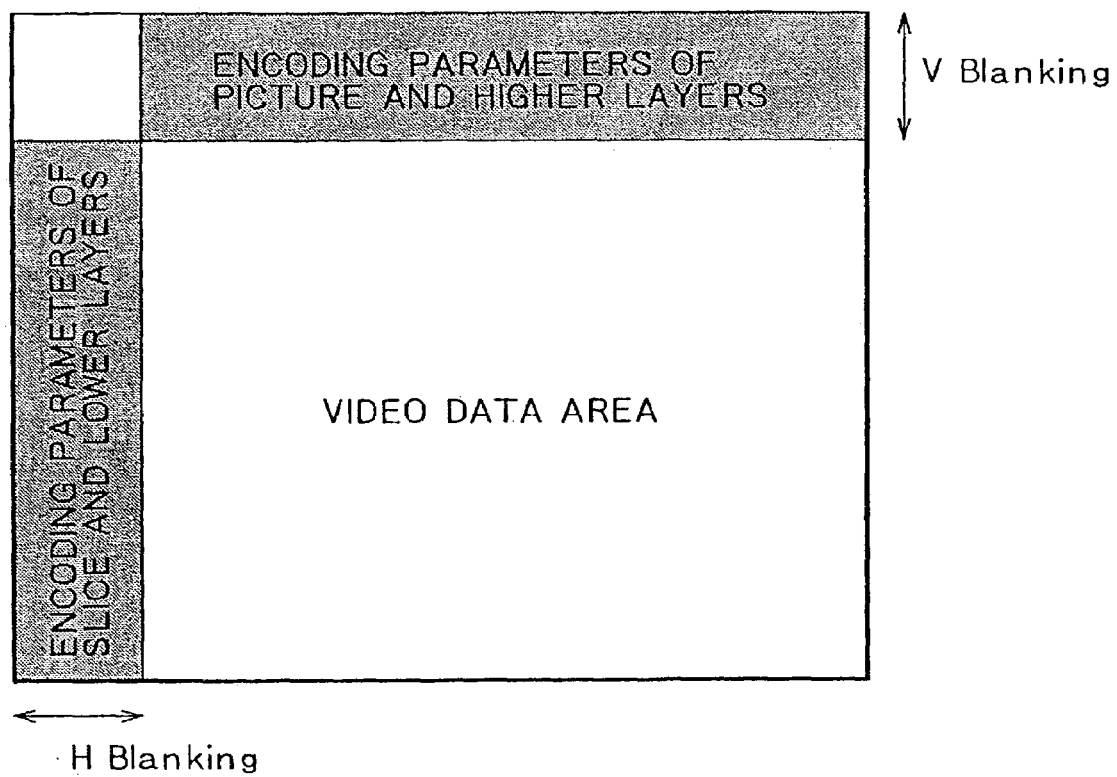
FIG. 7 is an explanatory diagram used for describing V blanking and H blanking.

As shown in FIG. 7, the V-blanking insertion apparatus 16 inserts encoding parameters of picture and higher layers of importance to a number of applications typically into a V blanking area. On the other hand, the H-blanking insertion apparatus 18 inserts encoding parameters of slice and lower layers of no importance to all applications typically into a V blanking area.

Figure 8A:
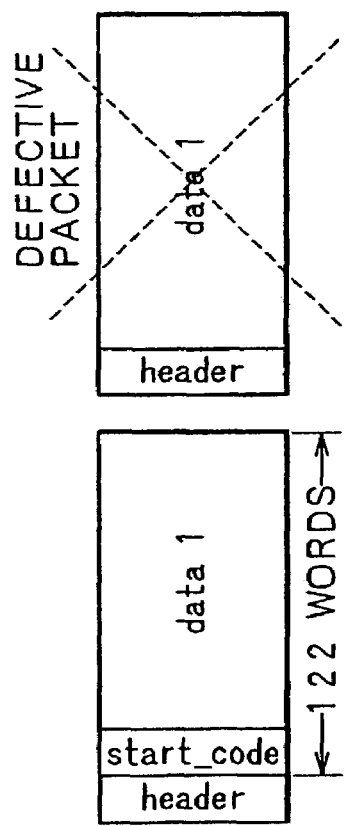
FIGS. 8A and 8B are explanatory diagrams used for describing the position of start_code.
Figure 8B:
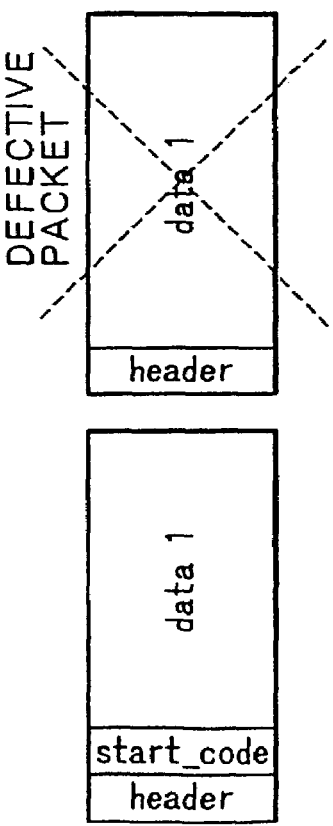

With respect to correction of a defective packet in the parameter-reproducing unit 36 described earlier, there is a technique whereby previous data is stored in advance, and data corresponding to a position in the defective packet is replenished. In this case, if start_code is written into the head of each piece of data without regard to delimiters of packets as shown in FIG. 8A, all pieces of data must be fetched and searched for start_code of the data including the defective packet. In order to solve this problem, in the case of information of picture and higher layers included in a V blanking area, information of 1 macroblock has each start_code always written at the head of a packet so as to terminate each piece of data on the delimiter of an auxiliary packet of 1 stripe as shown in FIG. 8B. With this scheme, a defective packet can be repaired with ease.

In a macroblock explained earlier by referring to FIG. 6, information of a band unit used as a resolution in the vertical direction is referred to as a stripe. When a picture of an interlace format is processed in an MPEG2 system, the processing is properly switched from a field structure to a frame structure, which are shown in FIG. 9, or vice versa. With the field structure, a picture is processed in field units. With the frame structure, on the other hand, a picture is processed in frame units, which each consist of 2 fields. For this reason, in the field structure, every 16 lines form a stripe. In the frame field, on the other hand, every 8 lines form a stripe.

Figure 10:
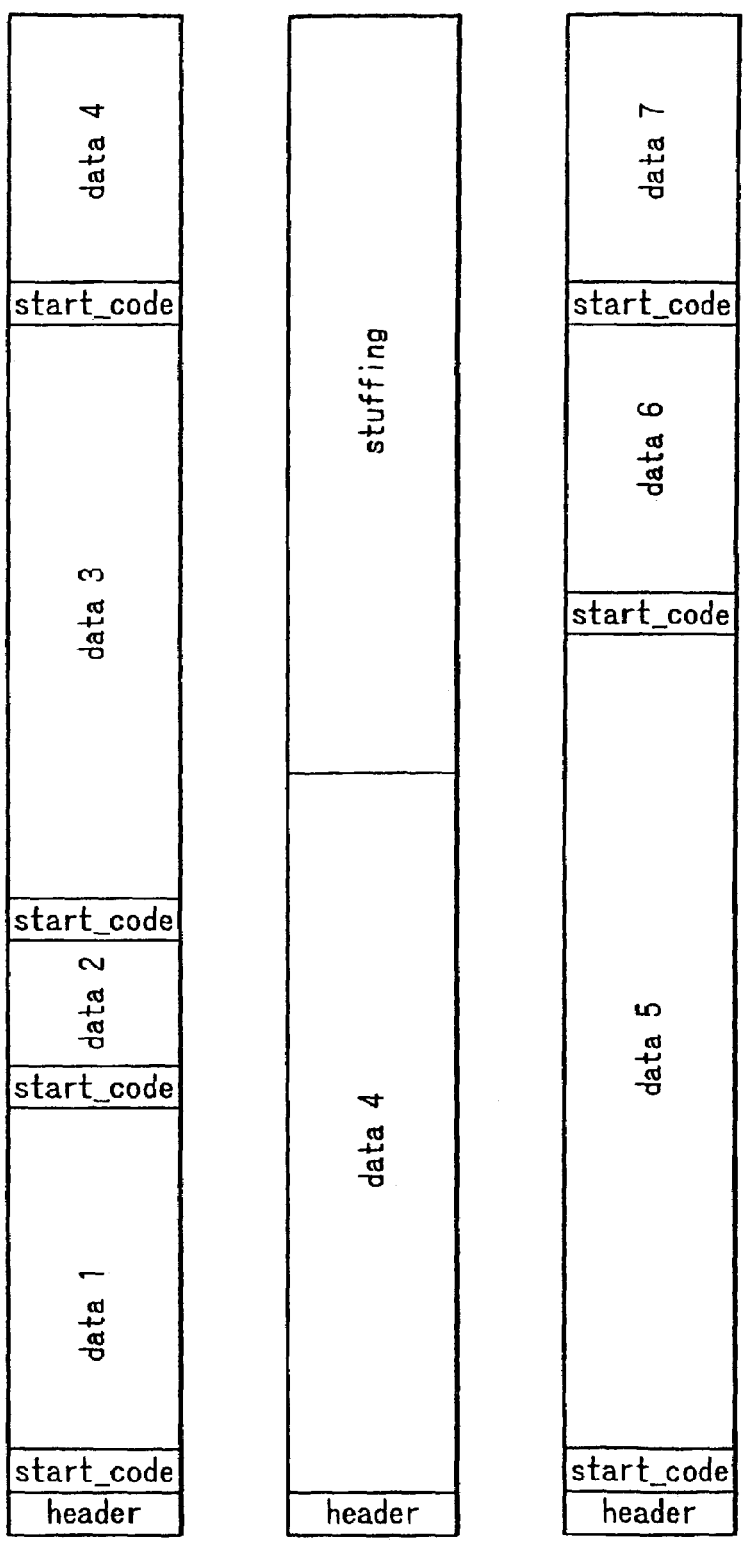
FIG. 10 is an explanatory diagram used for describing the position of start_code.

Encoding parameters of slice and lower layers forming the corresponding stripe are transmitted by using the parameters to fill up the H blanking area of the stripe. In this way, when the video data of a stripe is received, the encoding parameters are obtained at the same time. It is thus no longer necessary to provide a mechanism such as a buffer for adjustment of timings. If start_code exists in a payload of a packet, it is always described at the head of the packet as shown in FIG. 10 in order to make a packet defect easy to repair.

FIG. 11 is a diagram showing a data block used for transmitting 1 pixel of the sub-blocks Y[0], Y[1], Y[2], Y[3], Cr[0], Cr[1], Cb[0] and Cb[1], which each consist of 64 pixels. Thus, in order to transmit data of 1 macroblock, 64 data blocks each shown in FIG. 11 are required. The 2 low-order bits D1 and D0 are used for transmission of history information. Thus, for video data of each macroblock, 1,024 (64 data blocks×16 bits/data block) bits of history information can be transmitted. 256 bits of history information are generated for each generation. Accordingly, history information of 4 (=1,024/256) preceding generations can be superposed on video data of 1 macroblock. In the data block shown in FIG. 11, history information of the first, second and third generations is superposed.

Figure 12:
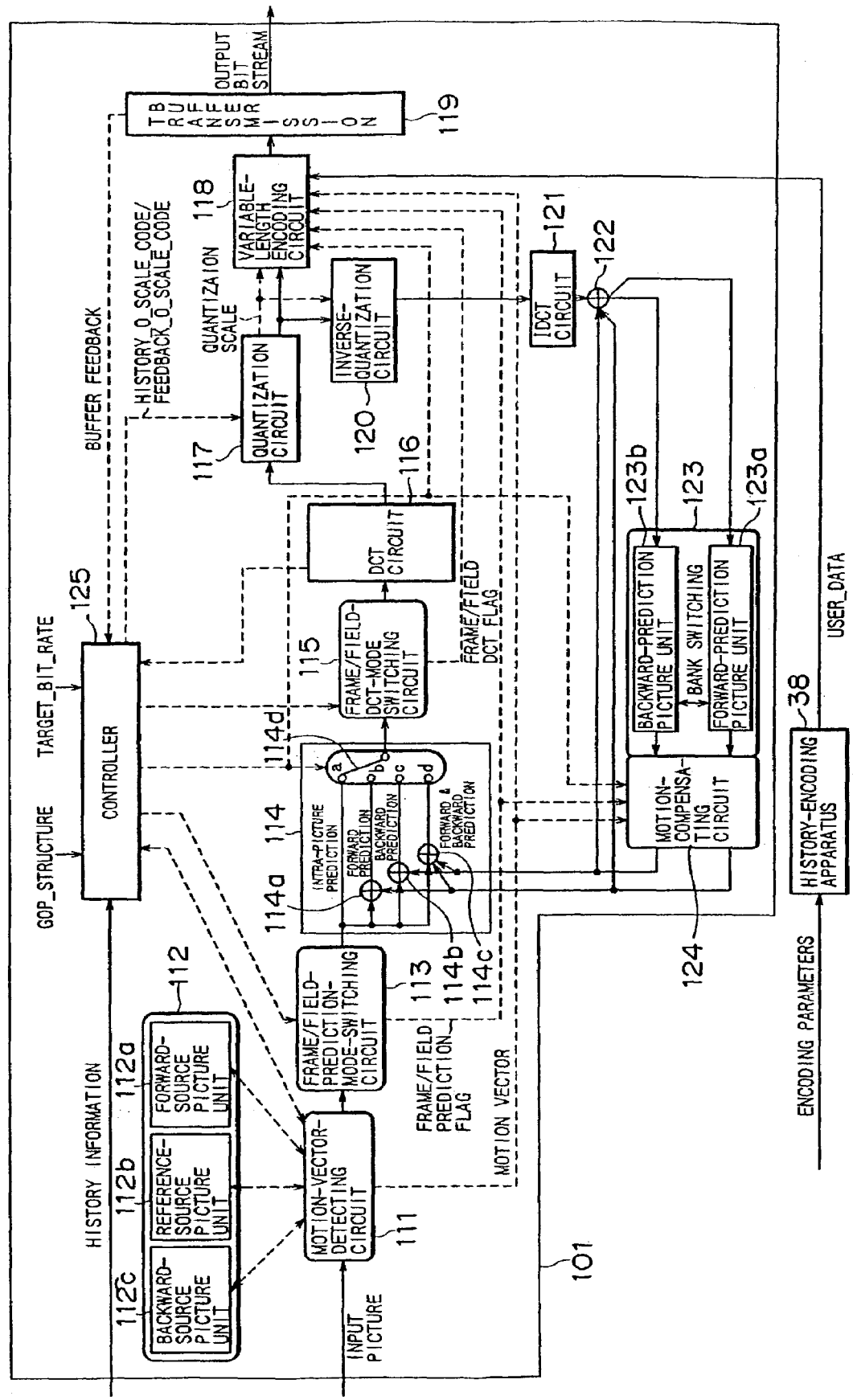
FIG. 12 is a block diagram showing a detailed configuration of an encoder embedded in an encoding apparatus employed in the video-encoding system shown in FIG. 3.

FIG. 12 is a diagram showing the configuration of an encoder 101, which is employed in the encoding apparatus 39 explained earlier by referring to FIG. 3 or the encoding apparatus 66 explained earlier by referring to FIG. 4, in concrete terms. As shown in FIG. 12, the encoder 101 comprises a controller 125, a motion-vector-detecting circuit 111, a frame memory 112, a frame/field-prediction-mode-switching circuit 113, a processor 114, a frame/field-DCT-mode-switching circuit 115, a DCT circuit 116, a quantization circuit 117, a variable-length encoding circuit 118, a transmission buffer 119, an inverse-quantization circuit 120, an inverse-DCT (IDCT) circuit 121, a processor 122, a frame memory 123 and a motion-compensating circuit 124.

The encoder 101 also includes a controller 125 for controlling operations and functions of the circuits enumerated above. The controller 125 receives an instruction with regard to a GOP structure from the operator or the host computer, determining the type of each picture so as to comply with the GOP structure. The controller 125 also receives information on a target bit rate from the-operator or the host computer, controlling the quantization circuit 117 so that the encoder 101 outputs data at a bit rate matching the target bit rate specified by the operator or the host computer.

In addition, the controller 125 also receives history information of a plurality of generations from the history-information-separating apparatus 37. These pieces of history information are used for carrying out a process to encode a reference picture. Details are described as follows.

First of all, the controller 125 forms a judgment as to whether or not the type of a reference picture determined from the GOP structure specified by the operator or the host computer matches a picture type included in the history information. That is to say, the controller 125 forms a judgment as to whether or not this reference picture was encoded in the past with the same picture type as the picture type specified by the operator or the host computer. To put it in detail, the controller 125 forms a judgment as to whether or not a picture type assigned to this reference picture in the encoding process of the fourth generation matches the picture type of this reference picture in the encoding process of the first generation, the picture type of this reference picture in the encoding process of the second generation or the picture type of this reference picture in the encoding process of the third generation.

If the picture type assigned to this reference picture in the encoding process of the fourth generation does not match the picture type of this reference picture in the encoding process of the first generation, the picture type of this reference picture in the encoding process of the second generation and the picture type of this reference picture in the encoding process of the third generation, the controller 125 carries out the normal encoding process. This is because this reference picture was not encoded in the encoding process of the first, second or third generation with the same picture type as the picture type specified by the operator or the host computer for encoding process of the fourth generation.

If the picture type assigned to this reference picture in the encoding process of the fourth generation matches the picture type of this reference picture in the encoding process of the first generation, the picture type of this reference picture in the encoding process of the second generation or the picture type of this reference picture in the encoding process of the third generation, on the other hand, the controller 125 carries out an encoding process reutilizing parameters. This is because this reference picture was encoded in the encoding process of the first, second or third generation with the same picture type as the picture type specified by the operator or the host computer for encoding process of the fourth generation.

First of all, the normal encoding process carried out by the controller 125 is explained.

Encoded picture data is supplied to the motion-vector-detecting circuit 111 in macroblock units. The motion-vector-detecting circuit 111 processes picture data of each frame as an I, P or B picture in accordance with a predetermined sequence set in advance. That is to say, frame pictures sequentially supplied to the motion-vector-detecting circuit 111 are to be processed one after another as I, P and B pictures indicated by the predetermined sequence set in advance.

Picture data of a frame processed as an I picture is transferred from the motion-vector-detecting circuit 111 to a forward-source picture unit 112a of the frame memory 112 to be stored therein. In the same way, picture data of a frame processed as a B picture is transferred from the motion-vector-detecting circuit 111 to a reference-source picture unit 112b of the frame memory 112 to be stored therein. By the same token, picture data of a frame processed as a P picture is transferred from the motion-vector-detecting circuit 111 to a backward-source picture unit 112c of the frame memory 112 to be stored therein.

At the next timing point a frame to be processed as a B or P picture is received, the data of the first P picture stored so far in the backward-source picture unit 112c is transferred to the forward-source picture unit 112a. At that time, the data of the next B picture is stored into the reference-raw picture unit 112b over the existing data, or the data of the next P picture is stored into the backward-source picture unit 112c over the existing data. These operations are carried out repeatedly.

The signal of each picture stored in the frame memory 112 is read out back, and the frame/field-prediction-mode-switching circuit 113 carries out processing in a frame-prediction mode processing or a field-prediction mode in accordance with an instruction received from the controller 125.

That is to say, the motion-vector-detecting circuit 111 detects a prediction error in the frame-prediction mode and a prediction error in the field-prediction mode, supplying values of the prediction errors to the controller 125 to be used in formation of a judgment as to whether to select the frame-prediction mode or the field-prediction mode. The controller 125 then controls the frame/field-prediction-mode-switching circuit 113 so as to operate in either the frame-prediction mode or the field-prediction mode.

In addition, the motion-vector-detecting circuit 111 also detects prediction errors in the intra-picture prediction mode, the forward prediction mode, the backward prediction mode and the forward & backward prediction mode, supplying the prediction errors to the controller 125 to be used in selection of one of the prediction modes. The controller 125 selects the smallest one among the prediction errors of the forward prediction mode, the backward prediction mode and the forward & backward prediction mode as a prediction error of an inter-picture prediction mode. The prediction error of an inter-picture prediction mode is then compared with the prediction error of the intra-picture prediction mode. The controller 125 selects the mode for the smaller prediction error between the prediction error of an inter—picture prediction mode and the prediction error of the intra-picture prediction mode as a prediction mode. That is to say, if the prediction error of the intra-picture prediction mode is smaller, the intra-picture prediction mode is selected. If the prediction error of the inter-picture prediction mode is smaller, on the other hand, the controller 125 sets the forward prediction mode, the backward prediction mode or the forward & backward prediction mode, which corresponds to the smallest one among the prediction errors of the forward prediction mode, the backward prediction mode and the forward & backward prediction mode, as a prediction mode.

The controller 125 then controls the processor 114 and the motion-compensating circuit 124 so as to operate in the selected prediction mode. As a result, data of an I picture is supplied to the frame/field-DCT-mode-switching circuit 115.

To put it in detail, the motion-vector-detecting circuit 111 finds a prediction error for the intra-picture prediction by computing the absolute value of a difference between $|\Sigma Aij|$ and $\Sigma|Aij|$ where notation $|\Sigma Aij|$ is the absolute value of a sum of signals Aij, notation $\Sigma|Aij|$ is a sum of the absolute values of signals Aij and notation Aij represents a signal of a macroblock of the reference picture. In addition, the motion-vector-detecting circuit 111 finds a prediction error for the forward prediction by computing $\Sigma|Aij-Bij|$ where notation $\Sigma|Aij-Bij|$ is a sum of the absolute values of differences Aij–Bij and notation Bij represents a signal of a macroblock of a predicted picture. The motion-vector-detecting circuit 111 also finds prediction errors for the backward prediction and the forward & backward prediction in the same way as the forward prediction except that a predicted picture different from the predicted picture of the forward direction is used.

The four prediction errors are supplied to the controller 125 to be compared with each other. The controller 125 determines the smallest one among the four prediction errors, and sets a mode corresponding to the smallest prediction error as a prediction mode. To be more specific, if the prediction error of the intra-picture prediction is found to be the smallest one among them, the intra-picture prediction mode is set. Otherwise, the controller 125 determines the smallest one among the remaining three prediction errors for the forward prediction, the backward prediction and the forward & backward prediction, and sets a prediction mode corresponding to the smallest prediction error.

The frame/field-prediction-mode-switching circuit 113 carries out signal processing corresponding to a prediction mode selected by the controller 125, and outputs a result of the processing to the processor 114. To put it concretely, if a frame prediction mode is selected, the frame/field-prediction-mode-switching circuit 113 carries out signal processing to supply a luminance signal to the processor 114 in the same state as the signal was input. As for a chrominance signal, the frame/field-prediction-mode-switching circuit 113 carries out signal processing so as to allow odd-field lines coexist with even-field lines. If a field frame prediction mode is selected, on the other hand, the frame/field-prediction-mode-switching circuit 113 carries out signal processing to compose 2 of the 4 luminance blocks of dots of lines of typically odd fields and the remaining 2 luminance blocks of dots of lines of even fields, supplying a result of the processing to the processor 114. As for a chrominance signal, the frame/field-prediction-mode-switching circuit 113 carries out signal processing to compose the 4 upper lines of even-field lines and the 4 lower lines of even-field lines.

In order to select a frame DCT mode or a field DCT mode, the frame/field-DCT-mode-switching circuit 115 converts the format of data of the 4 luminance blocks into a signal format of the frame DCT mode and a signal format of the field DCT mode. In the signal format of the frame DCT mode, odd-field lines coexist with even-field lines. In the signal format of the field DCT mode, on the other hand, odd-field lines are separated from even-field lines. The signals of both the formats are supplied to the DCT circuit 116, which computes an encoding efficiency for DCT processing with odd-field lines coexisting with even-field lines and an encoding efficiency for DCT processing with odd-field lines separated from even-field lines. The DCT circuit 116 supplies the computed encoding efficiencies to the controller 125, which compares the encoding efficiencies with each other to select a DCT mode of the better encoding efficiency. The controller 125 then controls the frame/field-DCT-mode-switching circuit 115 to operate in a DCT mode selected by the controller 125.

Then, the frame/field-DCT-mode-switching circuit 115 outputs data with a configuration conforming to the selected DCT mode to the DCT circuit 116. The frame/field-DCT-mode-switching circuit 115 also outputs a DCT flag indicating the selected DCT mode to the variable-length encoding circuit 118 and the motion-compensating circuit 124.

As is obvious from the above descriptions, the data structure of the luminance blocks in the field prediction mode or the frame prediction mode adopted by the frame/field-prediction-mode-switching circuit 113 is virtually the same as the data structure of the luminance blocks of in the field DCT mode or the frame DCT mode respectively adopted by the frame/field-DCT-mode-switching circuit 115.

When the frame prediction mode with odd-field lines coexisting with even-field lines is selected in the frame/field-prediction-mode-switching circuit 113, it is quite within the bounds of possibility that the frame/field-DCT-mode-switching circuit 115 also selects the frame DCT mode with odd-field lines coexisting with even-field lines. When the field prediction mode with odd-field lines separated from even-field lines is selected in the frame/field-prediction-mode-switching circuit 113, on the other hand, it is quite within the bounds of possibility that the frame/field-DCT-mode-switching circuit 115 also selects the field DCT mode with odd-field lines separated from even-field lines.

However, the frame prediction mode or the field prediction mode selected by the frame/field-prediction-mode-switching circuit 113 does not always coincide respectively with the frame DCT mode or the field DCT mode selected by the frame/field-DCT-mode-switching circuit 115 as described above. This is because the frame prediction mode or the field prediction mode is selected in the frame/field-prediction-mode-switching circuit 113 to provide a smallest absolute value of a prediction error, while the frame DCT mode or the field DCT mode is selected in the frame/field-DCT-mode-switching circuit 115 to give a better encoding efficiency.

Data of an I picture produced by the frame/field-DCT-mode-switching circuit 115 is output to the DCT circuit 116, which carries out a DCT process on the data to covert the data into DCT coefficients. The DCT coefficients are supplied to the quantization circuit 117, which quantizes the coefficients at a quantization scale corresponding to a buffer accumulation quantity representing the amount of data stored in the transmission buffer 119. The quantized coefficients are then supplied to the variable-length encoding circuit 118.

The quantization scale is determined as follows. The controller 125 receives a target bit rate representing a desired bit rate from the operator or the host computer and a signal representing the number of bits stored in the transmission buffer 119. The signal representing the number of bits stored in the transmission buffer 119 is a signal representing the amount of data left in the transmission buffer 119. The controller 125 generates a feedback_q_scale_code signal based on the target bit rate and the signal representing the number of bits stored in the transmission buffer 119. The feedback_q_scale_code signal is a control signal used for controlling the size of the quantization step adopted by the quantization circuit 117 in accordance with the amount of data left in the transmission buffer 119 so that neither overflow nor underflow occurs in the transmission buffer 119 and, in addition, a bit stream is output from the transmission buffer 119 at a bit rate equal to the target bit rate.

To put it concretely, assume for example that the number of bits stored in the transmission buffer 119 becomes too small. In this case, the size of the quantization step is reduced to increase the number of bits to be generated in a picture encoded next. If the number of bits stored in the transmission buffer 119 becomes too large, on the other hand, the size of the quantization step is increased to reduce the number of bits to be generated in a picture encoded next. It should be noted that, since the feedback_q_scale_code signal is proportional to the size of the quantization step, an increase in feedback_q_scale_code results in an increase in quantization step size while a decrease in feedback_q_scale_code results in a decrease in quantization step size.

The following description explains a parameter reutilization encoding process, which is offered as a characteristic of the encoder 101, by focusing on a difference from the normal encoding process described earlier. In order to make the parameter reutilization encoding process easy to understand, a reference picture is assumed to have been encoded as a P picture in the encoding process of the first generation, as an I picture in the encoding process-of the second generation and as a B picture in the encoding process of the third generation. In the encoding process of the fourth generation carried out this time, the reference picture must be encoded as a P picture.

In this case, the reference picture must be encoded in the encoding process of the fourth generation as an assigned P picture, which is the same as the picture type of the encoding process of the first generation. Thus, the controller 125 does not newly creates encoding parameters from video data supplied thereto. Instead, the controller 125 carries out an encoding process by utilizing the encoding parameters of the first generation. Representative encoding parameters reutilized in the encoding process of the fourth generation include quantiser_scale_code showing a quantization scale step size, macroblock_type showing a prediction mode, motion_vector showing a motion vector, frame/field_motion_type showing a frame prediction mode or a field prediction mode and dct_type showing a frame DCT mode or a field DCT mode.

In addition, the controller 125 does not reutilize all the encoding parameters transmitted as history information. Instead, the controller 125 reutilizes only encoding parameters, the reutilization of which is assumed to be desirable. That is to say, encoding parameters, the reutilization of which is assumed to be undesirable, are not used. Thus, it is necessary to create new values of the encoding parameters, the reutilization of which is assumed to be undesirable.

In the normal encoding process described earlier, the motion-vector-detecting circuit 111 detects the motion vector of the reference picture. In the encoding process reutilizing parameters, on the other hand, the processing to detect a motion vector (motion_vector) is not carried out. Instead, a motion vector (motion_vector) received as history information of the first generation is reutilized for a reason explained as follows.

The base-band video data obtained as a result of a process to decode an encoded stream of the third generation has experienced at least 3 decoding processes and at least 3 encoding processes. Thus, such base-band video data obviously has a deteriorated picture quality in comparison with the original video data. An accurate motion vector cannot be detected from video data having a deteriorated picture quality even if an attempt to detect a motion vector is made. That is to say, a motion vector received as history information of the first generation obviously has better precision than a motion vector detected in the encoding process of the fourth generation. In other words, by reutilization of the motion vector received as history information of the first generation, the encoding process of the fourth generation carried out by the controller 125 will not result in a deteriorated picture quality. The motion vector (motion_vector) received as history information of the first generation is supplied to the motion-vector compensating circuit 124 and the variable-length encoding circuit 118 as information on a motion vector of the reference picture encoded in the encoding process of the fourth generation.

In addition, in the normal encoding process, the motion-vector-detecting circuit 111 detects a prediction error in the frame-prediction mode and a prediction error in the field-prediction mode, supplying values of the prediction errors to the controller 125 to be used in formation of a judgment as to whether to select the frame-prediction mode or the field-prediction mode. In the encoding process by reutilizing parameters, on the other hand, the motion-vector-detecting circuit 111 does not detect a prediction error in the frame-prediction mode and a prediction error in the field-prediction mode. Instead, the frame/field_motion_type parameter supplied as history information of the first generation to indicate the frame-prediction mode or the field-prediction mode is reutilized. This is because a prediction error of the frame-prediction mode and a prediction error of the field-prediction mode detected in the processing of the first generation respectively have higher precision than a prediction error of the frame-prediction mode and a prediction error of the field-prediction mode detected in the processing of the fourth generation. A prediction mode selected on the basis of prediction errors having higher precision will result in a more optimum encoding process.

To put it concretely, the controller 125 supplies a control signal corresponding to the frame/field_motion_type parameter received as history information of the first generation to the frame/field-prediction-mode-switching circuit 113, which then carries out signal processing corresponding to the reutilized frame/field_motion_type parameter.

Furthermore, in the normal encoding process, the motion-vector-detecting circuit 111 also detects prediction errors in the intra-picture prediction mode, the forward prediction mode, the backward prediction mode and the forward & backward prediction mode, supplying the prediction errors to the controller 125 to be used in selection of one of the intra-picture prediction mode, the forward prediction mode, the backward prediction mode and the forward & backward prediction mode as a prediction mode, which is also referred to hereafter as a prediction direction mode. In the encoding process by reutilizing parameters, on the other hand, the motion-vector-detecting circuit 111 does not compute prediction errors for each of the prediction direction mode. Instead, a prediction direction mode is determined on the basis of a macroblock_type parameter received as history information of the first generation. This is because prediction errors of the prediction direction modes detected in the processing of the first generation respectively have higher precision than prediction errors of the prediction detection modes detected in the processing of the fourth generation. A direction prediction mode selected on the basis of prediction errors having higher precision will result in a more efficient encoding process. To put it concretely, the controller 125 selects a prediction direction mode indicated by the macroblock_type parameter included in the history information of the first generation, and controls the processor 114 and the motion-compensating circuit 124 to operate in the selected prediction direction mode.

In the normal encoding process, in order to select a frame DCT mode or a field DCT mode, the frame/field-DCT-mode-switching circuit 115 converts the format of data of the 4 luminance blocks into a signal format of the frame DCT mode and a signal format of the field DCT mode. The signals of both the formats are supplied to the DCT circuit 116, which computes encoding efficiencies of the frame DCT mode and the field DCT mode, and compares the computed encoding efficiencies with each other. In the encoding process reutilizing parameters, on the other hand, the frame/field-DCT-mode-switching circuit 115 does not carry out the processing to convert the format of data of the 4 luminance blocks into both a signal format of the frame DCT mode and a signal format of the field DCT mode. Instead, the frame/field-DCT-mode-switching circuit 115 carries out only processing for a DCT mode indicated by the dct_type parameter included in the history information of the first generation. To put it concretely, the controller 125 reutilizes the dct_type parameter included in the history information of the first generation and controls the frame/field-DCT-modeswitching circuit 115 to carry out only processing for a DCT mode indicated by the dct_type parameter included in the history information of the first generation.

In the normal encoding process, the controller 125 controls the quantization step size of the quantization circuit 117 on the basis of a target bit rate specified by the operator or the host computer and the amount of information left in the transmission buffer 119. In the encoding process reutilizing parameters, on the other hand, the quantization step size of the quantization circuit 117 is controlled on the basis of the target bit rate, the amount of information left in the transmission buffer 119 and a previous quantization scale included in history information. It should be noted that, in the following description, the previous quantization scale included in history information is called the history_q_scale_code parameter. In a history stream to be described later, the quantization scale is referred to as quantiser_scale_code.

First of all, the controller 125 generates a current quantization scale referred to as feedback_q_scale_code based on the target bit rate and the signal representing the number of bits stored in the transmission buffer 119. The current quantization scale referred to as feedback_q_scale_code is a value for controlling the quantization step size of the quantization circuit 117 in accordance with the amount of data left in the transmission buffer 119 so that neither overflow nor underflow occurs in the transmission buffer 119. Then, the controller 125 compares the value of the current quantization scale referred to as feedback_q_scale_code with the value of a previous quantization scale referred to as history_q_scale_code included in the history stream of the first generation to form a judgment as to whether the former or the larger is greater. It should be noted that a large quantization scale means a large quantization step. If the value of the current quantization scale referred to as feedback_q_scale_code is found greater than the value of the previous quantization scale referred to as history_q_scale_code, the controller 125 supplies the current quantization scale referred to as feedback_q_scale_code to the quantization circuit 117. If the value of the current quantization scale referred to as feedback_q_scale_code is found smaller than the value of the previous quantization scale referred to as history_q_scale_code, on the other hand, the controller 125 supplies the previous quantization scale referred to as history_q_scale_code to the quantization circuit 117.

That is to say, the controller 125 selects the largest quantization scale code among a plurality of previous quantization scales included in the history-information and the current quantization scale computed from the amount of information left in the transmission buffer 119. In other words, the controller 125 controls the quantization circuit 117 to carry out quantization by using the largest quantization step among the quantization steps used in previous encoding processes, that is, the encoding processes of the first, second and third generations, and the quantization step used in the current encoding process, that is, the encoding process of the fourth generation for a reason described as follows.

Assume that the bit rate of a stream generated in the encoding process of the third generation is 4 Mbps and a target bit rate specified for the encoder 101 carrying out an encoding process of the fourth generation is 15 Mbps. In this case, the quantization step is actually not reduced simply because the target bit rate is higher than the bit rate of a stream generated in the immediately preceding encoding process. Even if a picture encoded at a large quantization step in a preceding encoding process is encoded in the current encoding process at a reduced quantization step, the quality of this picture is not improved. That is to say, an encoding process to encode a picture at a quantization step smaller than a quantization step used in a preceding encoding process merely increases the number of bits but does not improve the quality of the picture. Thus, by using the largest quantization step among the quantization steps used in previous encoding processes, that is, the encoding processes of the first, second and third generations, and the quantization step used in the current encoding process, that is, the encoding process of the fourth generation, it is possible to carry out an encoding process with a highest degree of efficiency.

Receiving picture data completing a normal encoding process or an encoding process reutilizing parameters as described above from the quantization circuit 117, the variable-length encoding circuit 118 converts the picture data, which is data of an I picture in this case, into a variable-length code such as the Huffman code in accordance with a quantization scale also received from the quantization circuit 117, and supplies the variable-length code to the transmission buffer 119.

In addition, the variable-length encoding circuit 118 also encodes the quantization scale received from the quantization circuit 117, a prediction mode received from the controller 125, a motion vector received from the motion-vector-detecting circuit 111, a prediction flag received from the frame/field-prediction-mode-switching circuit 113 and a DCT flag received from the frame/field-DCT-mode-switching circuit 115 in a variable-length encoding process. As described earlier, the prediction mode is a mode showing whether the intra-picture prediction, the forward prediction, the backward prediction or the forward & backward prediction has been set. The prediction flag is a flag indicating whether the frame prediction mode or the field prediction mode has been set, and the DCT flag is a flag indicating whether the frame DCT mode or the field DCT mode has been set.

The transmission buffer 119 is used for temporarily storing data supplied thereto and outputs a buffer feedback signal to the controller 125, which supplies a quantization control signal representing the amount of data stored in the buffer 119 to the quantization circuit 117. When the amount of data left in the transmission buffer 119 exceeds an allowable upper limit, the quantization circuit 117 increases the quantization scale in accordance with the quantization control signal received from the controller 125 in order to decrease the amount of quantized data. When the amount of data left in the transmission buffer 119 reversely goes below an allowable lower limit, on the other hand, the quantization circuit 117 decreases the quantization scale in accordance with the quantization control signal received from the controller 125 in order to increase the amount of quantized data. As a result, an overflow and an underflow are prevented from occurring in the transmission buffer 119.

The data stored in the transmission buffer 119 is read out with a predetermined timing as an output.

On the other hand, the data of the I picture output by the quantization circuit 117 is supplied also to the inverse-quantization circuit 120, which then carries out an inverse-quantization process at a quantization scale received from the quantization circuit 117. The output of the inverse-quantization circuit 120 is supplied to an IDCT (Inverse Discrete Cosine Transformation) circuit 121, which then carries out an IDCT process thereon. The result of the inverse discrete cosine transformation process is supplied to the frame memory 123 by way of the processor 122 to be stored in a forward-prediction picture unit 123a of the frame memory 123.

Assume that the motion-vector-detecting circuit 111 processes picture data of frames sequentially supplied thereto as pictures having the types of I, B, P, B, P, B and so on. In this case, after the picture data of the first received frame has been processed as an I picture and before the data of the next received frame is processed as a B picture, the data of the frame immediately following the next frame is processed as a P picture. This is because, since a B picture necessitates backward prediction entailing the following picture, a decoding process cannot be carried out unless the immediately succeeding P picture to serve as a backward-prediction picture is prepared in advance.

Thus, after the picture data of the first received frame has been processed as an I picture, the motion-vector-detecting circuit 111 starts processing of the data of the P picture stored in the backward-source picture unit 112c. Then, in the same way as the one described before, the motion-vector-detecting circuit 111 supplies a sum of the absolute values of prediction errors or a sum of the absolute values of differences between frames for macroblocks to the controller 125 for each mode. The frame/field-prediction-mode-switching circuit 113 operates in the frame prediction mode or the field prediction mode in accordance with an instruction received from the controller 125. In addition, the processor 114 and the motion-compensating circuit 124 operate in the intra-picture prediction mode, the forward prediction mode, the backward prediction mode or the forward & backward prediction mode in accordance with an instruction issued by the controller 125 as a result of comparison of the sums for the modes received from the motion-vector-detecting circuit 111.

If the intra-picture prediction mode is selected, the processor 114 sets a switch 114d at a contact point a. In this case, the data processed by the frame/field-prediction-mode-switching circuit 113 is output to a transmission line by way of the frame/field-DCT-mode-switching circuit 115, the DCT circuit 116, the quantization circuit 117, the variable-length encoding circuit 118 and the transmission buffer 119 as is the case with an I picture. The data is also supplied to the frame memory 123 by way of the inverse-quantization circuit 120, the inverse-DCT (IDCT) circuit 121 and the processor 122 to be stored in the backward-prediction picture unit 123b of the frame memory 123.

If the forward prediction mode is selected, the processor 114 sets the switch 114d at a contact point b, and the motion-compensating circuit 124 reads out data stored in the forward-prediction picture unit 123a of the frame memory 123. The data stored in the forward-prediction picture unit 123a is data of an I picture in this case. The motion-compensating circuit 124 compensates a motion in accordance with a motion vector output by the motion-vector-detecting circuit 111. That is to say, requested by the controller 125 to set the forward prediction mode, the motion-compensating circuit 124 reads out data from the forward-prediction picture unit 123a by shifting the read address from a position corresponding to a location of a macroblock currently being output by the motion-vector-detecting circuit 111 by a shift distance corresponding to the motion vector also output by the motion-vector-detecting circuit 111 to generate prediction picture data.

The prediction picture data generated by the motion-compensating circuit 124 is supplied to a processor 114a, which then subtracts the prediction picture data received from the motion-compensating circuit 124 for a macroblock of a reference picture received from the frame/field-prediction-mode-switching circuit 113 from the data of the macroblock, and outputs the difference as a prediction error. This prediction error or this differential data is output to a transmission line by way of the frame/field-DCT-mode-switching circuit 115, the DCT circuit 116, the quantization circuit 117, the variable-length encoding circuit 118 and the transmission buffer 119. The differential data is also locally decoded by the inverse-quantization circuit 120 and the inverse-DCT (IDCT) circuit 121 before being supplied to the processor 122.

The processor 122 also receives the prediction picture data supplied to the processor 114a. The processor 122 adds differential data output by the IDCT circuit 121 to the prediction picture data generated by the motion-compensating circuit 124. As a result, data of the original (decoded) P picture is obtained. The data of the original (decoded) P picture is supplied to the backward-prediction picture unit 123b of the frame memory 123.

After the data of the I and P pictures has been stored in the forward-prediction and backward-prediction picture units 123a and 123b respectively as described above, the motion-vector-detecting circuit 111 carries out processing on the B picture. To put it in detail, the motion-vector-detecting circuit 111 supplies a sum of the absolute values of prediction errors or a sum of the absolute values of differences between frames for macroblocks to the controller 125 for each mode. The frame/field-prediction-mode-switching circuit 113 operates in the frame prediction mode or the field prediction mode in accordance with an instruction received from the controller 125. In addition, the processor 114 and the motion-compensating circuit 124 operate in the intra-picture prediction mode, the forward prediction mode, the backward prediction mode or the forward & backward prediction mode in accordance with an instruction issued by the controller 125 as a result of comparison of the sums for the modes received from the motion-vector-detecting circuit 111.

As described above, if the intra-picture prediction mode is selected, the processor 114 sets the switch 114d at the contact point a. If the forward prediction mode is selected, however, the processor 114 sets the switch 114d at the contact point b. At that time, the data is transmitted after being processed in the same way as a P picture.

If the backward or forward & backward prediction mode is selected, on the other hand, the processor 114 sets the switch 114d at the contact point c or d respectively.

In the backward prediction mode with the switch 114d set at the contact point c, data of a picture stored in the backward-prediction picture unit 123b is read out by the motion-compensating circuit 124 and subjected to a motion compensation process according to a motion vector output by the motion-vector-detecting circuit 111 in the motion-compensating circuit 124. In this case, the picture stored in the backward-prediction picture unit 123b is a P picture. That is to say, requested by the controller 125 to set the backward prediction mode, the motion-compensating circuit 124 reads out data from the backward-prediction picture unit 123b by shifting the read address from a position corresponding to a location of a macroblock currently being output by the motion-vector-detecting circuit 111 by a shift distance corresponding to the motion vector also output by the motion-vector-detecting circuit ill to generate prediction picture data.

The prediction picture data generated by the motion-compensating circuit 124 is supplied to a processor 114b, which then subtracts the prediction picture data received from the motion-compensating circuit 124 from the data of a macroblock of a reference picture received from the frame/field-prediction-mode-switching circuit 113, and outputs the difference as differential data. This differential data is output to the transmission line by way of the frame/field-DCT-mode-switching circuit 115, the DCT circuit 116, the quantization circuit 117, the variable-length encoding circuit 118 and the transmission buffer 119.

In the forward & backward prediction mode with the switch 114d set at the contact point d, data of a picture stored in the forward-prediction picture unit 123a and the data of a picture stored in the backward-prediction picture unit 123b are read out by the motion-compensating circuit 124 and subjected to a motion compensation process according to a motion vector output by the motion-vector-detecting circuit 111 in the motion-compensating circuit 124. In this case, the picture stored in the forward-prediction picture unit 123a is an I picture and the picture stored in the backward-prediction picture unit 123b is a P picture.

That is to say, requested by the controller 125 to set the forward & backward prediction mode, the motion-compensating circuit 124 reads out data from the forward-prediction picture unit 123a by shifting the read address from a position corresponding to a location of a macroblock currently being output by the motion-vector-detecting circuit 111 by a shift distance corresponding to-a motion vector also output by the motion-vector-detecting circuit 111 for the forward prediction picture to generate prediction picture data as well as data from the backward-prediction picture unit 123b by shifting the read address from the position corresponding to the location of the macroblock currently being output by the motion-vector-detecting circuit 111 by a shift distance corresponding to another motion vector also output by the motion-vector-detecting circuit 111 for the backward prediction picture to generate other prediction picture data.

The pieces of prediction picture data generated by the motion-compensating circuit 124 are supplied to a processor 114c, which then subtracts an average of the pieces of prediction picture data received from the motion-compensating circuit 124 from the data of a macroblock of a reference picture received from the motion-vector-detecting circuit 111, and outputs the difference as differential data.

This differential data is output to the transmission line by way of the frame/field-DCT-mode-switching circuit 115, the DCT circuit 116, the quantization circuit 117, the variable-length encoding circuit 118 and the transmission buffer 119.

Never used as a prediction picture of another picture, a B picture is not stored in the frame memory 123.

It should be noted that the forward-prediction picture unit 123*a* and the backward-prediction picture unit 123*b* of the frame memory 123 can be implemented as 2 memory banks. The frame memory 123 can be switched from one memory bank to another when necessary to select a forward-prediction picture or a backward-prediction picture stored in one of the banks for a desired reference picture.

While the above description is focused on a luminance block, a chrominance block can be processed and transmitted in the same way with the macroblock of FIG. 6 used as a unit. It should be noted that, as motion vectors in the processing of a chrominance block, a vertical-direction component and a horizontal-direction component each having a magnitude equal to ½ the motion vector of the corresponding luminance block are used.

Figure 13:
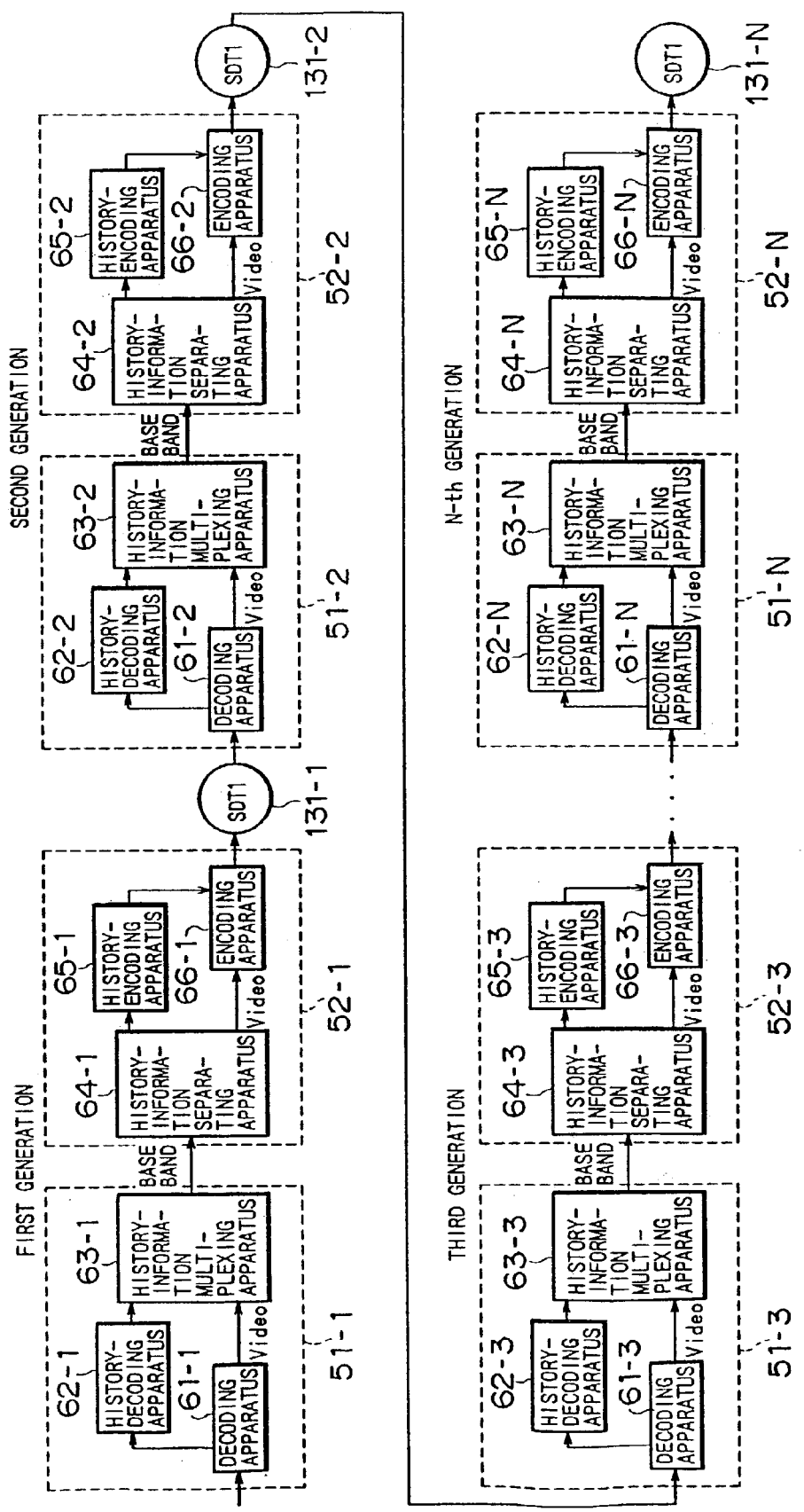
FIG. 13 is a diagram showing a grand system employing a plurality of transcoding systems each shown in FIG. 4.

FIG. 13 is a diagram showing a grand system of typically an image-editing studio comprising a plurality of transcoding systems connected to each other in series. In a history-information multiplexing apparatus 63-*i* employed in the video-decoding system 51-*i* where i=1 to N, most recent encoding parameters used by the history-information multiplexing apparatus 63-*i* are recorded into a region for storing least recent encoding parameters in an area for storing encoding parameters, overwriting the least recent parameters. Thus, as explained earlier by referring to FIG. 11, base-band picture data includes encoding parameters or generation history information of the 4 most recent generations for the same macroblock.

In the grand system shown in FIG. 13, the video-decoding system 51 and the video-encoding system 52 of the transcoding system, which were explained by referring to FIG. 4, are employed. It is needless to say, however, that in place of the video-decoding system 51 and the video-encoding system 52, the video-decoding system 1 shown in FIG. 2 and the video-encoding system 2 shown in FIG. 3 can also be employed respectively.

Figure 14:
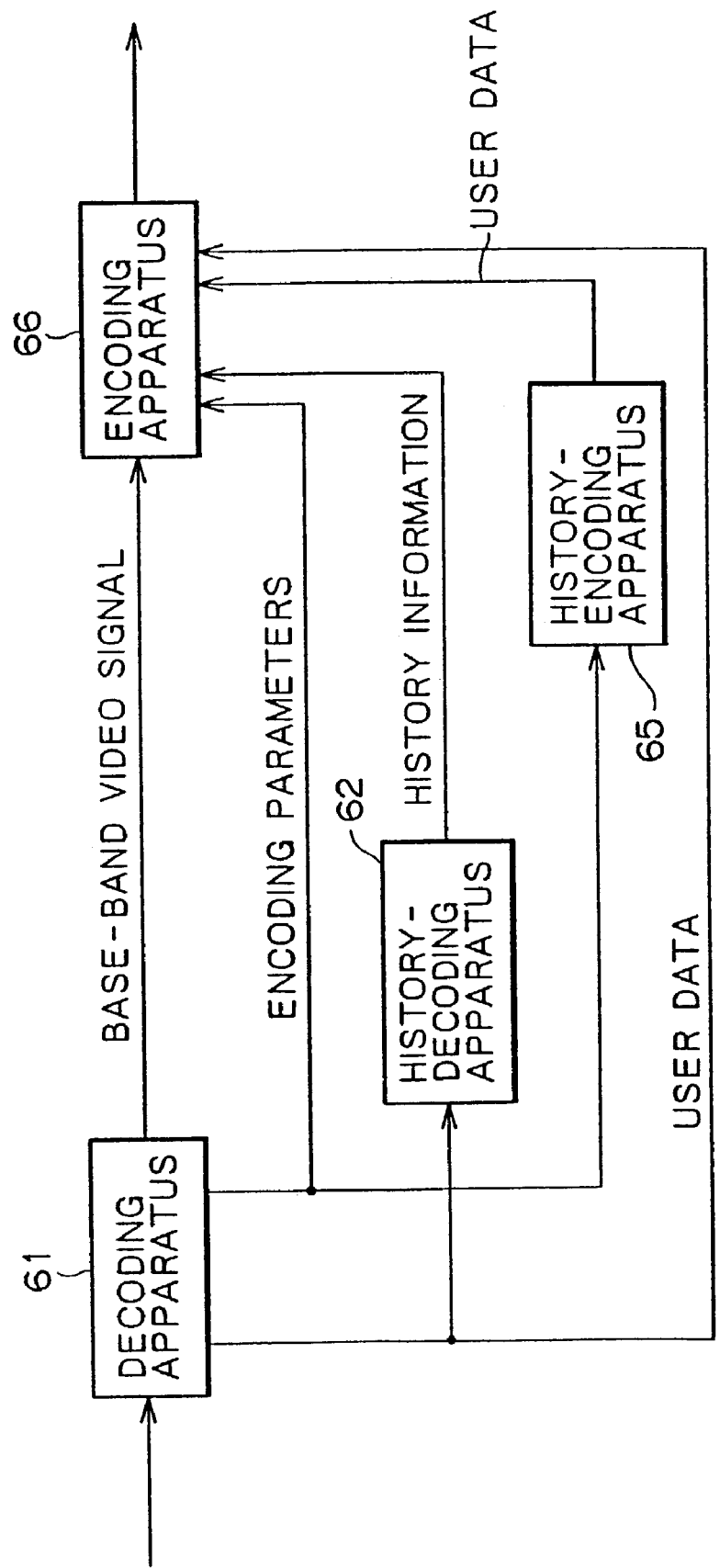
FIG. 14 is a block diagram showing the configuration of a tightly coupled transcoding system.

As described above, in the transcoding system implemented by the embodiment, the video-decoding system 1 or 51 on the decoding side is loosely coupled with the video-encoding system 2 or 52 on the encoding side, and encoding parameters are multiplexed with picture data prior to transmission. It should be noted, however, that a decoding apparatus can also be directly connected to an encoding apparatus by tight coupling as shown in FIG. 14.

To put it in detail, a variable-length decoding circuit 92 employed in a decoding apparatus 61 extracts encoding parameters of the third generation from a sequence layer, a GOP layer, a picture layer, a slice layer and a macroblock layer of an encoded stream of the third generation, supplying the parameters to a history-encoding apparatus 65. At the same time, the variable-length decoding circuit 92 supplies a base-band video signal with the encoding parameters of the picture and higher layers inserted into a V-blanking area and the encoding parameters of the slice and lower layers inserted into an H-blanking area to a controller 125 employed in an encoding apparatus 66. The history-encoding apparatus 65 converts the encoding parameters of the third generation received from the variable-length decoding circuit 92 into a stream referred to as converted_history_stream ( ), which can be described in the user data area of the picture layer. This stream referred to as converted_history_stream ( ) is then supplied to a variable-length encoding circuit 118 employed in the encoding apparatus 66 as user data.

The variable-length decoding circuit 92 also extracts user data referred to as user_data including encoding parameters of the first generation and encoding parameters of the second generation from the user data area of the picture layer of the encoded stream pertaining to the third generation, supplying the user data to the history-decoding apparatus 62. The history-decoding apparatus 62 then extracts the encoding parameters of the first generation and the encoding parameters of the second generation from a history stream described in the user data area as converted_history_stream ( ) supplying the parameters to the controller 125 employed in the encoding apparatus 66.

The controller 125 employed in the encoding apparatus 66 controls an encoding process carried out by the encoding apparatus 66 in accordance with the encoding parameters of the first generation and the encoding parameters of the second generation, which were received from the history-decoding apparatus 62, as well as encoding parameters, which are recorded in the V-blanking and H-blanking areas and were received from the decoding apparatus 61.

The variable-length encoding circuit 118 employed in the encoding apparatus 66 receives encoding parameters included in input data from the decoding apparatus 61 and user data including the encoding parameters of the third generation from the history-encoding apparatus 65. The variable-length encoding circuit 118 records these pieces of user data as history information in the user data area of the picture layer of the encoded stream pertaining to the fourth generation before outputting them.

FIG. 15 is a diagram showing a syntax used for decoding an MPEG video stream. A decoder decodes an MPEG bit stream in accordance with this syntax in order to extract a plurality of meaningful data items or meaningful data elements from the bit stream. In the syntax to be explained below, a function and a conditional statement are each represented by a string of normal characters whereas a data element is represented by a string of bold characters. A data item is described by the Mnemonic representing the name of the data item. In some cases, the Mnemonic also indicates the bit length composing the data item and the type and the transmission order of the data item.

First of all, functions used in the syntax shown in FIG. 15 are explained.

A function referred to as next_start_code ( ) is a function used for searching a bit stream for a start code described in the bit stream. In the syntax shown in FIG. 15, the next_start_code ( ) function is followed by a sequence_header ( ) function and a sequence_extension ( ) function which are laid out sequentially to indicate that the bit stream includes data elements defined by the sequence_header ( ) and sequence_extension ( ) functions. Thus, a start code, a kind of data element described at the beginning of the sequence_header ( ) and sequence_extension ( ) functions, is found by the next_start_code ( ) function from the bit stream in an operation to decode the bit stream. The start code is then used as a reference to further find the sequence_header ( ) and sequence_extension ( ) functions and decode data elements defined by the sequence_header ( ) and sequence_extension ( ) functions.

It should be noted that the sequence_header ( ) function is a function used for defining header data of a sequence layer in the MPEG bit stream whereas the sequence_extension ( ) function is a function used for defining extension data of a sequence layer in the MPEG bit stream.

A do { } while statement is described after the sequence_extension ( ) function. The do { } while statement comprises a { } block following a do statement and a while statement following the { } block. Data elements described by functions in the { } block following the do statement are extracted from the data stream as long as a condition defined by the while statement is true. That is to say, the do { } while statement defines a decoding process to extract data elements described by functions in the { } block following the do statement from the bit stream as long as the condition defined by the while statement is true.

A function referred to as nextbits ( ) used in the while statement is a function used to compare a bit or a string of bits appearing in the bit stream with a data element to be decoded next. In the example of the syntax shown in FIG. 15, the nextbits ( ) function compares a string of bits appearing in the bit stream with sequence_end_code used for indicating the end of a video sequence. The condition defined by the while statement is to be true if the string of bits appearing in the bit stream does not match sequence_end_code. Thus, the do { } while statement described after the sequence_extension ( ) function indicates that data elements defined by functions in the { } block following the do statement are described in the bit stream as long as sequence_end_code used for indicating the end of a video sequence does not appear in the bit stream.

After the data elements defined by the sequence_extension ( ) function in the bit stream, data elements defined by an extension_and_user_data(0) function are described. The extension_and_user_data(0) function is a function used for defining extension data and user data of the sequence layer of the MPEG bit stream.

A do { } while statement following the extension_and_user_data(0) function is a function to extract data elements described by functions in the { } block following the do statement from the bit stream as long as a condition defined by the while statement is true. The nextbits ( ) functions used in the while statement are functions used to form a judgment as to whether or not a bit or a string of bits appearing in the bit stream matches picture_start_code or group_start_code start codes respectively by comparing the string with the start code specified in the function. If the string of bits appearing in the bit stream matches picture_start_code or group_start_code, a condition defined by the while statement is said to be true. Thus, if picture_start_code or group_start_code appears in the bit stream, the codes of data elements defined by functions in the { } block following the do statement are described after this start code. Accordingly, by finding a start code represented by picture_start_code or group_start_code, it is possible to extract data elements defined by functions in the { } block of the do statement from the bit stream.

An if-statement described at the beginning of the { } block of the do statement states a condition "if group_start_code appears in the bit stream." A true (satisfied) condition stated by the if-statement indicates that data elements defined by a group_of_picture_header(1) function and an extension_and_user_data(1) function are described sequentially after group_start_code.

The group_of_picture_header(1) function is a function used for defining header data of a GOP layer of the MPEG bit stream and the extension_and_user_data(1) function is a function used for defining extension data named extension_data and/or user data named user_data of the GOP layer of the MPEG bit stream.

Furthermore, in this bit stream, data elements defined by a picture_header ( ) function and a picture_coding_extension ( ) function are described after the data elements defined by the group_of_picture_header(1) function and the extension_and_user_data(1) function. Of course, if the condition defined by the if-statement is not true, the data elements defined by the group_of_picture_header(1) function and the extension_and_user_data(1) function are not described. In this case, the data elements defined by the picture_header ( ) function and the picture_coding_extension ( ) function are described after the data elements defined by an extension_and_user_data(0) function.

The picture_header ( ) function is a function used for defining header data to a picture layer of the MPEG bit stream and the picture_coding_extension ( ) function is a function used for defining first extension data of the picture layer of the MPEG bit stream.

The next while statement is a function used for defining a condition. A condition defined by each if-statement described in a { } block following the condition defined by the while statement is judged to be true or false as long as the condition defined by the while statement is true. nextbits ( ) functions used in the while statement are functions for forming a judgment as to whether a string of bits appearing in the bit stream matches extension_start_code and user_data_start_code respectively. If the string of bits appearing in the bit stream matches extension_start_code or user_data_start_code, a condition defined by the while statement is said to be true.

A first if-statement in the { } block following the while statement is a function for forming a judgment as to whether or not a string of bits appearing in the bit stream matches extension_start_code. A string of bits appearing in the bit stream that matches 32-bit extension_start_code indicates that data elements defined by an extension_data(2) function are described after extension_start_code in the bit stream.

A second if-statement is a function for forming a judgment as to whether or not a string of bits appearing in the bit stream matches user_data_start_code. If a string of bits appearing in the bit stream matches 32-bit user_data_start_code, a condition defined by a third if-statement is judged to be true or false. The user_data_start_code is a start code used for indicating the beginning of a user-data area of the picture layer of the MPEG bit stream.

The third if-statement in the { } block following the while statement is a function for forming a judgment as to whether or not a string of bits appearing in the bit stream matches History_Data_ID. A string of bits appearing in the bit stream that matches 32-bit History_Data_ID indicates that data elements defined by a converted_history_stream ( ) function are described after a code indicated by 32-bit History_Data_ID in the user-data area of the picture layer of the MPEG bit stream.

A converted_history_stream ( ) function is a function used for describing history information and history data for transmitting all encoding parameters used in the MPEG encoding process. Details of data elements defined by this converted_history_stream function will be described later as history_stream ( ) by referring to FIGS. 17 to 24. History_Data_ID is a start code used for indicating the beginning of a description of the history information and the history data in the user-data area of the picture layer of the MPEG bit stream.

An else statement is syntax indicating a case for a false condition defined by the third if-statement. Thus, if data elements defined by a converted_history_stream ( ) function are not described in the user-data area of the picture layer of the MPEG bit stream, data elements defined by a user_data ( ) function are described.

According to the syntax shown in FIG. 15, history information is described in converted_history_stream but not in user_data ( ). The stream referred to as converted_history_stream ( ) is described as a kind of user_data ( ) conforming to the MPEG standard. For this reasons, in some cases, this specification explains that history information is described in user_data. In such cases, the explanation means that the history information is described as a kind of user_data conforming to the MPEG standard.

A picture_data ( ) function is a function used for describing data elements related to a slice layer and a macroblock layer after user data of the picture layer of the MPEG bit stream. Normally, data elements defined by this picture_data ( ) function are described after data elements defined by a user_data ( ) function or data elements defined by a converted_history_stream ( ) function described in the user-data area of the picture layer of the bit stream. If neither extension_start_code nor user_data_start_code exists in a bit stream showing data elements of the picture layer, however, data elements defined by this picture_data ( ) function are described after data elements defined by a picture_coding_extension ( ) function.

Following the data elements defined by this picture_data ( ) function, data elements defined by a sequence_header ( ) function and a sequence_extension function are described sequentially. The data elements described by the sequence_header ( ) function and the sequence_extension ( ) function are exactly the same data elements as defined by a sequence_header ( ) function and a sequence_extension ( ) function described at the beginning of a sequence of the video stream. The reason why the same pieces of data are defined in the stream is to prevent data of the sequence layer from being no longer receivable, thus, preventing a stream from being no longer decodable when reception of a bit stream is started by a bit stream receiving apparatus in the middle of a data stream, such as part of bit stream corresponding to a picture layer.

Following the data elements defined by the sequence_header ( ) function and the sequence_extension ( ) function, that is, at the end of the data stream, 32-bit sequence_end_code used for indicating the end of the sequence is described.

FIG. 16 is a schematic diagram showing an outline of the basic configuration of the syntax described so far.

Next, a history stream defined by a converted_history_stream ( ) function is explained.

The converted_history_stream ( ) function is a function used for inserting a history stream showing history information into the user-data area of the MPEG picture layer. It should be noted that the word 'converted' means that the stream has completed a conversion process to insert one marker bit for at least every 22 bits of the history stream composed of history data to be inserted into the user area in order to avoid start emulation.

The converted_history_stream ( ) function is described in either one of a format of a fixed-length history stream shown in FIGS. 17 to 23 or a variable-length history stream shown in FIG. 24 to be described later. If the fixed-length history stream is selected on the encoder side, there is a merit that a circuit and software employed in the decoder for decoding data elements from the history stream become simple. If the variable-length history stream is selected on the encoder side, on the other hand, the encoder is capable of selecting arbitrarily history information or data elements described in the user area of the picture layer when necessary. Thus, the amount of data of the history stream can be reduced. As a result, the data rate of the bit stream encoded as a whole can also be lowered as well.

The history stream, the history information, the history data and the history parameter cited in the explanation of the present invention are encoding parameters or data elements used in the related art encoding processes and are not encoding-parameter data used in the current encoding process or the encoding process carried out at the last stage. Consider a case in which a picture is encoded and transmitted as an I picture in an encoding process of a first generation, as a P picture in an encoding process of a second generation and as a B picture in an encoding process of a third generation.

Encoding parameters used in the encoding process of the third generation are described at predetermined locations of the sequence, GOP, slice and macroblock layers of an encoded bit stream generated as a result of the encoding process of the third generation. On the other hand, encoding parameters used in the encoding process of the first and second generations are not recorded in the sequence or GOP layer for recording the encoding parameters used in the encoding process of the third generation, but recorded in the user-data area of the picture layer as history information of the encoding parameters in accordance with the syntax described above.

First of all, the syntax of the fixed-length history stream is explained by referring to FIGS. 17 to 23.

In the first place, encoding parameters related to the sequence header of the sequence layer used in the previous encoding processes, that is, the encoding processes of typically the first and second generations, are inserted as a history stream into the user-data area of the picture layer of the bit stream generated in the encoding process carried out at the last stage, that is, the encoding process of typically the third generation. It should be noted that history information related to the sequence header of the sequence layer of the bit stream generated in the previous encoding processes is never inserted into the sequence header of the sequence layer of the bit stream generated in the encoding process carried out at the last stage-.

Data elements related to the sequence header (sequence_header) used in the previous encoding processes include sequence_header_code, sequence_header_present_flag, horizontal_size_value, marker_bit, vertical_size_value, aspect_ratio_information, frame_rate_code, bit_rate_value, vbv_buffer_size_value, constrained_parameter_flag, load_intra_quantizer_matrix, intra_quantizer_matrix, load_non_intra_quantizer_matrix and non_intra_quantizer_matrix as shown in FIG. 17.

The data elements listed above are described as follows. The sequence_header_code data element is a start synchronization code of the sequence layer. The sequence_header_present_flag data element is a flag used for indicating whether data in the sequence header is valid or invalid. The horizontal_size_value data element is data comprising the low-order 12 bits of the number of pixels of the picture in the horizontal direction. The marker_bit data element is bit data inserted for preventing start-code emulation. The vertical_size_value data element is data comprising low-order 12 bits of the number of pixels of the picture in the vertical direction. The aspect_ratio_information data element is an aspect ratio, that is, a ratio of the height to the width of the picture, or the aspect ratio of the display screen. The frame_rate_code data element is data representing the picture display period.

The bit_rate_value data element is data comprising the low-order 18 bits of a bit rate for limiting the number of generated bits. The data is rounded up in 400-bsp units. The vbv_buffer_size_value data element is data comprising the low-order 10 bits of a value for determining the size of a virtual buffer (video buffer verifier) used in control of the amount of generated code. The constrained_parameter_flag data element is a flag used for indicating whether or not parameters are under constraint. The load_intra_quantizer_matrix data element is a flag used for indicating whether or not data of an intra-MB quantization matrix exists. The intra_quantizer_matrix data element is the value of the intra-MB quantization matrix. The load_non_intra_quantizer_matrix data element is a flag used for indicating whether or not data of a non-intra-MB quantization matrix exists. The non_intra_quantizer_matrix data element is the value of the non-intra-MB quantization matrix.

Subsequently, data elements representing a sequence extension used in the previous encoding processes are described as a history stream in the user-data area of the picture layer of the bit stream generated in the encoding process carried out at the last stage.

Data elements representing the sequence extension (sequence_extention) used in the previous encoding include extension_start_code, extension_start_code_identifier, sequence_extension_present_flag, profile_and_level_indication, progressive_sequence, chroma_format, horizontal_size_extension, vertical_size_extension, bit_rate_extension, vbv_buffer_size_extension, low_delay, frame_rate_extension_n and frame_rate_extension_d as shown in FIGS. 17 and 18.

The data elements listed above are described as follows. The extension_start_code data element is a start synchronization code of extension data. The extension_start_code_identifier data element is data used for indicating which extension data is transmitted. The sequence_extension_present_flag data element is a flag used for indicating whether data in the sequence extension is valid or invalid. The profile_and_level_indication data element is data specifying a profile and a level of the video data. The progressive_sequence data element is data showing that the video data has been obtained from sequential scanning. The chroma_format data element is data specifying the color-difference format of the video data.

The horizontal_size_extension data element is the two high-order bits data to be added to horizontal_size_value of the sequence header. The vertical_size_extension data element is the two high-order bits data to be added to vertical_size_value of the sequence header. The bit_rate_extension data element is the twelve high-order bits data to be added to bit_rate_value of the sequence header. The vbv_buffer_size_extension data element is the eight high-order bits data to be added to vbv_buffer_size_value of the sequence header. The low_delay data element is data used for indicating that a B picture is not included. The frame_rate_extension_n data element is data used for obtaining a frame rate in conjunction with frame_rate_code of the sequence header. The frame_rate_extension_d data element is data used for obtaining a frame rate in conjunction with frame_rate_code of the sequence header.

Subsequently, data elements representing a sequence-display extension of the sequence layer used in the previous encoding processes are described as a history stream in the user area of the picture layer of the bit stream.

Data elements described as a sequence-display extension (sequence_display_extension) are extension_start_code, extension_start_code_identifier, sequence_display_extension_present_flag, video_format, colour_decription, colour_primaries, transfer_characteristics, matrix_coefficients, display_horizontal_size and display_vertical_size as shown in FIG. 18.

The data elements listed above are described as follows. The extension_start_code data element is a start synchronization code of extension data. The extension_start_code_identifier data element is data used for indicating which extension data is transmitted. The sequence_display_extension_present_flag data element is a flag used for indicating whether data elements in the sequence display extension are valid or invalid. The video_format data element is data representing the video format of the source signal. The colour_description data element is data used for indicating that detailed data of a color space exists. The colour_primaries data element is data showing details of a color characteristic of the source signal. The transfer_characteristics data element is data showing details of how opto-electrical conversion has been carried out. The matrix_coefficients data element is data showing details of how a source signal has been converted from the three primary colors of light. The display_horizontal_size data element is data representing the activation area or the horizontal size of an intended display. The display_vertical_size data element is data representing the activation area or the vertical size of the intended display.

Subsequently, macroblock assignment data (named macroblock_assignment_in_user_data) showing phase information of a macroblock generated in the previous encoding processes is described as a history stream in the user area of the picture layer of a bit stream generated in the encoding process carried out at the last stage.

The macroblock_assignment_in_user_data showing phase information of a macroblock comprises data elements such as macroblock_assignment_present_flag, v_phase and h_phase as shown in FIG. 18.

The data elements listed above are described as follows. The macroblock_assignment_present_flag data element is a flag used for indicating whether data elements of macroblock_assignment_in_user_data are valid or invalid. The v_phase data element is data showing phase information in the vertical direction which is obtained when the macroblock is detached from picture data. The h_phase data element is data showing phase information in the horizontal direction which is obtained when the macroblock is detached from picture data.

Subsequently, data elements representing a GOP header of the GOP layer used in the previous encoding processes are described as a history stream in the user area of the picture layer of a bit stream generated in the encoding process carried out at the last stage.

The data elements representing the GOP header (group_of_picture_header) are group_start_code, group_of_picture_header_present_flag, time_code, closed_gop and broken_link as shown in FIG. 18.

The data elements listed above are described as follows. The group_start_code data element is the start synchronization code of the GOP layer. The group_of_picture_header_present_flag data element is a flag used for indicating whether data elements in group_of_picture_header are valid or invalid. The time_code data element is a time code showing the length of time measured from the beginning of the first picture of the GOP. The closed_gop data element is a flag used for indicating whether or not it is possible to carry out an independent playback operation of a picture in one GOP from another GOP. The broken_link data element is a flag used for indicating whether or not the B picture at the beginning of the GOP can not be reproduced with a high degree of accuracy because of reasons such as editing.

Subsequently, data elements representing a picture header of the picture layer used in the previous encoding processes are described as a history stream in the user area of the picture layer of a bit stream generated in the encoding process carried out at the last stage.

The data elements related to a picture header (picture_header) are picture_start_code, temporal_reference, picture_coding_type, vbv_delay, full_pel_forward_vector, forward_f_code, full_pel_backward_vector and backward_f_code as shown in FIGS. 18 and 19.

The data elements listed above are described concretely as follows. The picture_start_code data element is the start synchronization code of the picture layer. The temporal_reference data element is a number used for indicating a display order of the picture. This number is reset at the beginning of the GOP. The picture_coding_type data element is data used for indicating the type of the picture. The vbv_delay data element is data showing an initial state of a virtual buffer at a random access. The full_pel_forward_vector data element is a flag used for indicating whether the precision of the forward motion vector is expressed in terms of pixel units or half-pixel units. The forward_f_code data element is data representing a forward-motion-vector search range. The full_pel_backward_vector data element is a flag used for indicating whether the precision of the backward motion vector is expressed in terms of pixel units or half-pixel units. The backward_f_code data element is data representing a backward-motion-vector search range.

Subsequently, data elements representing a picture-coding extension of the picture layer used in the previous encoding processes are described as a history stream in the user area of the picture layer of a bit stream generated in the encoding process carried out at the last stage.

The data elements related to the picture-coding extension (picture_coding_extension) are extension_start_code, extension_start_code_identifier, f_code [0][0], f_code [0][1], f_code [1][0], f_code [1][1], intra_dc_precision, picture_structure, top_field_first, frame_pred_frame_dct, concealment_motion_vectors, q_scale_type, intra_vlc_format, alternate_scan, repeat_first_field, chroma_420_type, progressive_frame, composite_display_flag, v_axis, field_sequence, sub_carrier, burst_amplitude and sub_carrier_phase as shown in FIG. 19.

The data elements listed above are described as follows. The extension_start_code data element is a start code used for indicating the start of extension data of the picture layer. The extension_start_code_identifier data element is a code used for indicating which extension data is transmitted. The f_code [0][0] data element is data representing a horizontal motion-vector search range in the forward direction. The f_code [0][1] data element is data representing a vertical motion-vector search range in the forward direction. The f_code [1][0] data element is data representing a horizontal motion-vector search range in the backward direction. The f_code [1][1] data element is data representing a vertical motion-vector search range in the backward direction.

The intra_dc_precision data element is data representing the precision of DC coefficients. The picture_structure data element is data used for indicating whether the data structure is a frame structure or a field structure. In the case of the field structure, the picture_structure data element also indicates whether the field structure is the high-order field or the low-order field. The top_field_first data element is data used for indicating whether the first field of a frame structure is the high-order field or the low-order field. The frame_pre-d_frame_dct data element is data used for indicating that the prediction of frame-mode DCT is carried out only in the frame-DCT mode in the case of a frame structure. The concealment_motion_vectors data element is data used for indicating that the intra-macroblock includes a motion vector for concealing a transmission error.

The q_scale_type data element is data used for indicating whether to use a linear quantization scale or a non-linear quantization scale. The intra_vlc_format data element is data used for indicating whether or not another 2-dimensional VLC is used in the intra-macroblock. The alternate_scan data element is data representing selection to use a zigzag scan or an alternate scan. The repeat_first_field data element is data used in the case of a 2:3 pull-down. The chroma_420_type data element is data equal to the value of the next progressive_frame data element in the case of a 4:2:0 signal format or 0 otherwise. The progressive_frame data element is data used for indicating whether or not this picture has been obtained from sequential scanning. The composite_display_flag data element is a flag used for indicating whether or not the source signal is a composite signal.

The v_axis, field_sequence, sub_carrier, burst_amplitude and sub_carrier_phase data elements are data used in the case of a PAL source signal.

Subsequently, a quantization-matrix extension used in the previous encoding processes is described as a history stream in the user area of the picture layer of the bit stream generated in the encoding process carried out at the last stage.

Data elements related to the quantization-matrix extension (quant_matrix_extension) are extension_start_code, extension_start_code_identifier, quant_matrix_extension_present_flag, load_intra_quantizer_matrix, intra_quantizer_matrix [64], load_non_intra_quantizer_matrix, non_intra_quantizer_matrix [64], load_chroma_intra_quantizer_matrix, chroma_intra_quantizer_matrix [64], load_chroma_non_intra_quantizer_ matrix and chroma_non_intra_quantizer_matrix [64] as shown in FIG. 20.

The data elements listed above are described as follows. The extension_start_code data element is a start code used for indicating the start of the quantization-matrix extension. The extension_start_code_identifier data element is a code used for indicating which extension data is transmitted. The quant_matrix_extension_present_flag data element is a flag used for indicating whether data elements of the quantization-matrix extension are valid or invalid. The load_intra_quantizer_matrix data element is data used for indicating whether or not quantization-matrix data for an intra-macroblock exists. The intra_quantizer_matrix data element is data representing values of a quantization-matrix for an intra-macroblock.

The load_non_intra_quantizer_matrix data element is data used for indicating whether or not quantization-matrix data for a non-intra-macroblock exists. The non_intra_quantizer_matrix data element is data representing values of a quantization-matrix for a non-intra-macroblock. The load_chroma_intra_quantizer_matrix data element is data used for indicating whether or not quantization-matrix data for a color-difference intra-macroblock exists. The chroma_intra_quantizer_matrix data element is data representing values of a quantization-matrix for a color-difference intra-macroblock. The load_chroma_non_intra_quantizer_matrix data element is data used for indicating whether or not quantization-matrix data for a color-difference non-intra-macroblock exists. The chroma_non_intra_quantizer_matrix data element is data representing values of a quantization-matrix for a color-difference non-intra-macroblock.

Subsequently, a copyright extension used in the previous encoding processes is described as a history stream in the user area of the picture layer of the bit stream generated in the encoding process carried out at the last stage.

Data elements related to the copyright extension (copyright_extension) are extension_start_code, extension_start_code_identifier, copyright_extension_present_flag, copyright_flag, copyright_identifier, original_or_copy, copyright_number_1, copy_right_number_2 and copyright_number_3 as shown in FIG. 20.

The data elements listed above are described as follows. The extension_start_code data element is a start code used for indicating the start of the copyright extension. The extension_start_code_identifier data element is a code used for indicating which extension data is transmitted. The copyright_extension_present_flag data element is a flag used for indicating whether data elements of the copyright extension are valid or invalid. The copyright_flag data element is a flag used for indicating whether or not a copyright has been given to encoded video data in a range up to the next copyright extension or the end of the sequence.

The copyright_identifier data element is data used for identifying an institution cataloging the copyright specified by the ISO/IEC JTC/SC29. The original_or_copy data element is a flag used for indicating whether data of the bit stream is original or copied data. The copyright_number_1 data element indicates bits 44 to 63 of a copyright number. The copyright_number_2 data element indicates bits 22 to 43 of the copyright number. The copyright_number_3 data element indicates bits 0 to 21 of the copyright number.

Subsequently, a picture-display extension (picture_display_extension) used in the previous encoding processes is described as a history stream in the user area of the picture layer of the bit stream generated in the encoding process carried out at the last stage.

Data elements representing the picture-display extension (picture_display_extension) are extension_start_code, extension_start_code_identifier, picture_display_extension_present_flag, frame_centre_horizontal_offset_1, frame_centre_vertical_offset_1, frame_centre_horizontal_offset_2, frame_centre_vertical_offset_2, frame_centre_horizontal_offset_3 and frame_centre_vertical_offset_3 as shown in FIG. 21.

The data elements listed above are described as follows. The extension_start_code data element is a start code used for indicating the start of the picture-display extension. The extension_start_code_identifier data element is a code used for indicating which extension data is transmitted. The picture_display_extension_present_flag data element is a flag used for indicating whether data elements of the picture-display extension are valid or invalid. The frame_centre_horizontal_offset data element is an offset of the display area in the horizontal direction and the frame_centre_vertical_offset data element is an offset of the display area in the vertical direction. Up to three offset values of horizontal and vertical offsets can be defined respectively.

User data is described as a history stream after the history information representing the picture-display extension already explained in the user area of the picture layer of the bit stream generated in the encoding process carried out at the last stage as shown in FIG. 21.

Following the user data, information on a macroblock used in the previous encoding processes is described as a history stream as shown in FIGS. 21 to 23.

Information on the macroblock comprises data elements related to the position of the macroblock, data elements related to the mode of the macroblock, data elements related to control of the quantization step, data elements related to motion compensation, data elements related to the pattern of the macroblock and data elements related to the amount of generated code. The data elements related to the position of the macroblock include such as macroblock_address_h, macroblock_address_v, slice_header_present_flag and skipped_macroblock_flag. The data elements related to the mode of the macroblock include such as macroblock_quant, macroblock_motion_forward, macroblock_motion_backward, macroblock_pattern, macroblock_intra, spatial_temporal_weight_code_flag, frame_motion_type and dct_type. The data elements related to control of the quantization step includes such as quantiser_scale_code. The data elements related to motion compensation include PMV [0][0][0], PMV [0][0][1], motion_vertical_field_select [0][0], PMV [0][1][0], PMV [0][1][1], motion_vertical_field_select [0][1], PMV [1][0][0], PMV [1][0][1], motion_vertical_field_select [1][0], PMV [1][1][0], PMV [1][1][1] and motion_vertical_field_select [1][1]. The data elements related to the pattern of the macroblock include such as coded_block_pattern, and the data elements related to the amount of generated code are num_mv_bits, num_coef_bits and num_other_bits or the like.

The data elements related to the macroblock are described in detail as follows.

The macroblock_address_h data element is data defining the present absolute position of the macroblock in horizontal direction. The macroblock_address_v data element is data defining the present absolute position of the macroblock in vertical direction. The slice_header_present_flag data element is a flag used for indicating this macroblock is located at the beginning of a slice layer, and whether or not being accompanied by a slice header. The skipped_macroblock_flag data element is a flag used for indicating whether or not to skip this macroblock in a decoding process.

The macroblock_quant data element is data derived from macroblock_type shown in FIGS. 38 and 39. This data element indicates whether or not quantiser_scale_code appears in the bit stream. The macroblock_motion_forward data element is data derived from the macroblock_type shown in FIGS. 38 and 39 and used in the decoding process. The macroblock_motion_backward data element is data derived from the macroblock_type shown in FIGS. 38 and 39 and used in the decoding process. The macroblock_pattern data element is data derived from the macroblock_type shown in FIGS. 38 and 39 and it indicates whether or not coded_block_pattern appears in the bit stream.

The macroblock_intra data element is data derived from the macroblock_type shown in FIGS. 38 and 39 and used in the decoding process. The spatial_temporal_weight_code_flag data element is a flag derived from the macroblock_type shown in FIGS. 38 and 39 and used for indicating whether or not spatial_temporal_weight_code showing an up-sampling technique of a low-order layer picture with time scalability exists in the bit stream.

The frame_motion_type data element is a 2-bit code used for indicating the prediction type of the macroblock of a frame. A frame_motion_type value of "00" indicates that there are two prediction vectors and the prediction type is a field-based prediction type. A frame_motion_type value of "01" indicates that there is one prediction vector and the prediction type is a field-based prediction type. A frame_motion_type value of "10" indicates that there is one prediction vector and the prediction type is a frame-based prediction type. A frame_motion_type value of "11" indicates that there is one prediction vector and the prediction type is a dual-prime prediction type. The field_motion_type data element is a 2-bit code showing the motion prediction of the macroblock of a field. A field_motion_type value of "01" indicates that there is one prediction vector and the prediction type is a field-based prediction type. A field_motion_type value of "10" indicates that there is two prediction vectors and the prediction type is an 18×8 macroblock-based prediction type. A field_motion_type value of "11" indicates that there is one prediction vector and the prediction type is a dual-prime prediction type. The dct_type data element is data used for indicating whether the DCT is carried out in the frame-DCT mode or the field-DCT mode. The quantiser_scale_code data element indicates the quantization-step size of the macroblock.

Next, data elements related to a motion vector are described. In order to reduce the magnitude of a motion vector required in a decoding process, a particular motion vector is subjected to an encoding process by actually encoding a difference between the particular motion vector and a motion vector decoded earlier. A decoder for decoding a motion vector has to sustain four motion-vector prediction values, each of which comprises horizontal and vertical components. These motion-vector prediction values are represented by PMV [r][s][v]. The subscript [r] is a flag used for indicating whether the motion vector in a macroblock is the first or second vector. To be more specific, an [r] value of "0" indicates the first vector and an [r] value of "1" indicates the second vector. The subscript [s] is a flag used for indicating whether the direction of the motion vector in the macroblock is the forward or backward direction. To be more specific, an [s] value of "0" indicates the forward direction of the motion vector and an [r] value of "1" indicates the backward direction of the motion vector. The subscript [v] is a flag used for indicating whether the component of the motion vector in the macroblock is a component in the horizontal or vertical direction. To be more specific, a [v] value of "0" indicates the horizontal component of the motion vector and a [v] value of "1" indicates the vertical component of the motion vector.

Thus, PMV [0][0][0] is data representing the horizontal component, the forward motion vector of the first vector. PMV [0][0][1] is data representing the vertical component of the forward motion vector of the first vector. PMV [0][1][0] is data representing the horizontal component of the backward motion vector of the first vector. PMV [0][1][1] is data representing the vertical component of the backward motion vector of the first vector. PMV [1][0][0] is data representing the horizontal component of the forward motion vector of the second vector. PMV [1][0][1] is data representing the vertical component of the forward motion vector of the second vector. PMV [1][1][0] is data representing the horizontal component of the backward motion vector of the second vector. PMV [1][1][1] is data representing the vertical component of the backward motion vector of the second vector.

Data referred to as motion_vertical_field_select [r][s] is data used for indicating which referenced field of the prediction format is used. To be more specific, a motion_vertical_field_select [r][s]–value of "0" indicates the top referenced field and a motion_vertical_field_select [r][s]–value of "1" indicates the bottom referenced field to be used.

In motion_vertical_field_select [r][s], the subscript [r] is a flag used for indicating whether the motion vector in a macroblock is the first or second vector. To be more specific, an [r] value of "0" indicates the first vector and an [r] value of "1" indicates the second vector. The subscript [s] is a flag used for indicating whether the direction of the motion vector in the macroblock is the forward or backward direction. To be more specific, an [s] value of "0" indicates the forward direction of the motion vector and an [s] value of "1" indicates the backward direction of the motion vector. Thus, motion_vertical_field_select [0][0] indicates the referenced field used in the generation of the forward motion vector of the first vector. motion_vertical_field_select [0][1] indicates the referenced field used in the generation of the backward motion vector of the first vector. motion_vertical_field_select [1][0] indicates the referenced field used in the generation of the forward motion vector of the second vector. motion_vertical_field_select [1][1] indicates the referenced field used in the generation of the backward motion vector of the second vector.

The coded_block_pattern data element is variable-length data used for indicating which DCT block among a plurality of DCT blocks each for storing a DCT coefficient contains a meaningful or non-zero DCT coefficient. The num_mv_bits data element is data representing the amount of code of the motion vector in the macroblock. The num_coef_bits data element is data representing the amount of code of the DCT coefficient in the macroblock. The num_other_bits data element shown in FIG. 46 is data representing the amount of code in the macroblock other than the motion vector and the DCT coefficient.

Next, a syntax for decoding data elements from a history stream with a variable length is explained by referring to FIGS. 24 to 44.

As shown in FIG. 24, the history stream with a variable length comprises data elements defined by a next_start_code ( ) function, a sequence_header ( ) function, a sequence_extension ( ) function, an extension_and_user_data(0) function, a group_of_picture_header ( ) function, an extension_and_user_data(1) function, a picture_header ( ) function, a picture_coding_extension ( ) function, a re_coding_stream_info ( ) function, an extension_and_user_data(2) function and a picture_data ( ) function.

Since the next_start_code ( ) function is a function used for searching a bit stream for a start code, data elements defined by the sequence_header ( ) function and used in the previous encoding processes are described at the beginning of the history stream as shown in FIG. 25.

Data elements defined by the sequence_header ( ) function include sequence_header_code, sequence_header_present_flag, horizontal_size_value, vertical_size_value, aspect_ratio_information, frame_rate_code, bit_rate_value, marker_bit, vbv_buffer_size_value, constrained_parameter_flag, load_intra_quantizer_matrix, intra_quantizer_matrix, load_non_intra_quantizer_matrix and non_intra_quantizer_matrix as shown in FIG. 25.

The data elements listed above are described as follows. The sequence_header_code data element is the start synchronization code of the sequence layer. The sequence_header_present_flag data element is a flag used for indicating whether data in sequence_header is valid or invalid. The horizontal_size_value data element is data comprising the low-order 12 bits of the number of pixels of the picture in the horizontal direction. The vertical_size_value data element is data comprising the low-order 12 bits of the number of pixels of the picture in the vertical direction. The aspect_ratio_information data element is an aspect ratio of pixels of a picture, that is, a ratio of the height to the width of the picture, or the aspect ratio of the display screen. The frame_rate_code data element is data representing the picture display period. The bit_rate_value data element is data comprising the low-order 18 bits of a bit rate for limiting the number of generated bits. The data is rounded up in 400-bsp units.

The marker_bit data element is bit data inserted for preventing start-code emulation. The vbv_buffer_size_value data element is data comprising the low-order 10 bits of a value for determining the size of a virtual buffer (video buffer verifier) used in control of the amount of generated code. The constrained_parameter_flag data element is a flag used for indicating whether or not parameters are under constraint. The load_intra_quantizer_matrix data element is a flag used for indicating whether or not data of an intra-MB quantization matrix exists. The intra_quantizer_matrix data element is the value of the intra-MB quantization matrix. The load_non_intra_quantizer_matrix data element is a flag used for indicating whether or not data of a non-intra-MB quantization matrix exists. The non_intra_quantizer_matrix data element is the value of the non-intra-MB quantization matrix.

Following the data elements defined by the sequence_header ( ) function, data elements defined by the sequence_extension ( ) function are described as a history stream as shown in FIG. 26.

The data elements defined by the sequence_extension ( ) function include extension_start_code, extension_start_code_identifier, sequence_extension_present_flag, profile_and_level_indication, progressive_sequence, chroma_format, horizontal_size_extension, vertical_size_extension, bit_rate_extension, vbv_buffer_size_extension, low_delay, frame_rate_extension_n and frame_rate_extension_d as shown in FIG. 26.

The data elements listed above are described as follows. The extension_start_code data element is a start synchronization code of extension data. The extension_start_code_identifier data element is data used for indicating which extension data is transmitted. The sequence_extension_present_flag data element is a flag used for indicating whether data in the sequence extension is valid or invalid. The profile_and_level_indication data element is data specifying a profile and a level of the video data. The progressive_sequence data element is data showing that the video data has been obtained from sequential scanning. The chroma_format data element is data specifying the color-difference format of the video data. The horizontal_size_extension data element is data to be added to horizontal_size_value of the sequence header as the two high-order bits. The vertical_size_extension data element is data to be added to vertical_size_value of the sequence header as the two high-order bits. The bit_rate_extension data element is data to be added to bit_rate_value of the sequence header as the 12 high-order bits. The vbv_buffer_size_extension data element is data to be added to vbv_buffer_size_value of the sequence header as the 8 high-order bits.

The low_delay data element is data used for indicating that a B picture is not included. The frame_rate_extension_n data element is data used for obtaining a frame rate in conjunction with frame_rate_code of the sequence header. The frame_rate_extension_d data element is data used for obtaining a frame rate in conjunction with frame_rate_code of the sequence header.

Following the data elements defined by the sequence_extension ( ) function, data elements defined by the extension_and_user_data(0) function are described as a history stream as shown in FIG. 27. For i with a value other than 1, the extension_and_user_data (i) function describes only data elements defined by a user_data ( ) function as a history stream instead of describing data elements defined by the extension_data ( ) function. Thus, the extension_and_user_data(0) function describes only data elements defined by the user_data ( ) function as a history stream.

The user_data ( ) function describes user data as a history stream on the basis of a syntax like one shown in FIG. 28.

Following the data elements defined by the extension_and_user_data(0) function, data elements defined by the group_of_picture_header ( ) function shown in FIG. 29 and data elements defined by the extension_and_user_data(1) function are described as a history stream. It should be noted, however, that the data elements defined by the group_of_picture_header ( ) function and data elements defined by the extension_and_user_data(1) function are described only if group_start_code representing the start code of the GOP layer is described in the history stream.

As shown in FIG. 29, the data elements defined by the group_of_picture_header ( ) function are group_start_code, group_of_picture_header_present_flag, time_code, closed_gop and broken_link.

The data elements listed above are described as follows. The group_start_code data element is the start synchronization code of the GOP layer. The group_of_picture_header_present_flag data element is a flag used for indicating whether data elements in group_of_picture_header are valid or invalid. The time_code data element is a time code showing the length of time measured from the beginning of the first picture of the GOP. The closed_gop data element is a flag used for indicating whether or not it is possible to carry out an independent playback operation of a picture in the GOP from another GOP. The broken_link data element is a flag used for indicating that the B picture at the beginning of the GOP can not be reproduced with a high degree of accuracy because of reasons such as editing.

Much like the extension_and_user_data(0) function, the extension_and_user_data(1) function describes only data elements defined by the user_data ( ) function as a history stream.

If group_start_code representing the start code of the GOP layer is not described in the history stream, the data elements defined by the group_of_picture_header ( ) function and data elements defined by the extension_and_user_data(1) function are also not described in the history stream. In this case, data elements defined by the picture_header ( ) function are described after the data elements defined by the extension_and_user_data(0) function as a history stream.

The data elements defined by the picture_header ( ) function are picture_start_code, temporal_reference, picture_coding_type, vbv_delay, full_pel_forward_vector, forward_f_code, full_pel_backward_vector, backward_f_code, extra_bit_picture and extra_information_picture as shown in FIG. 30.

The data elements listed above are described concretely as follows. The picture_start_code data element is the start synchronization code of the picture layer. The temporal_reference data element is a number used for indicating a display order of the picture. This number is reset at the beginning of the GOP. The picture_coding_type data element is data used for indicating the type of the picture. The vbv_delay data element is data showing an initial state of a virtual buffer at a random access. The full_pel_forward_vector data element is a flag used for indicating whether the precision of the forward motion vector is expressed in terms of integral pixel units or half-pixel units. The forward_f_code data element is data representing a forward-motion-vector search range. The full_pel_backward_vector data element is a flag used for indicating whether the precision of the backward motion vector is expressed in terms of integral pixel units or half-pixel units. The backward_f_code data element is data representing a backward-motion-vector search range. The extra_bit_picture data element is a flag used for indicating whether or not following additional information exists. To be more specific, extra_bit_picture having a value of "0" indicates that no following additional information exists while extra_bit_picture having a value of "1" indicates that following additional information exists. The extra_information_picture data element is information reserved by specifications.

Following the data elements defined by the picture_headr ( ) function, data elements defined by the picture_coding_extension ( ) function shown in FIG. 31 are described as a history stream.

The data elements defined by the picture_coding_extension ( ) function are extension_start_code, extension_start_code_identifier, f_code [0][0], f_code [0][1], f_code [1][0], f_code [1]intra_dc_precision, picture_structure, top_field_first, frame_predictive_frame_dct, concealment_motion_vectors, q_scale_type, intra_vlc_format, alternate_scan, repeat_first_field, chroma_420_type, progressive_frame, composite_display_flag, v_axis, field_sequence, sub_carrier, burst_amplitude and sub_carrier_phase as shown in FIG. 31.

The data elements listed above are described as follows. The extension_start_code data element is a start code used for indicating the start of extension data of the picture layer. The extension_start_code_identifier data element is a code used for indicating which extension data is transmitted. The f_code[0][0] data element is data representing a horizontal motion-vector search range in the forward direction. The f_code[0][1] data element is data representing a vertical motion-vector search range in the forward direction. The f_code[1][0] data element is data representing a horizontal motion-vector search range in the backward direction. The f_code[1][1] data element is data representing a vertical motion-vector search range in the backward direction. The intra_dc_precision data element is data representing the precision of DC coefficients.

The picture_structure data element is data used for indicating whether the data structure is a frame structure or a field structure. In addition, in the case of the field structure, the picture_structure data element also indicates whether the field structure is the high-order field or the low-order field. The top_field_first data element is data used for indicating whether the first field of a frame structure is the high-order field or the low-order field. The frame_predictive_frame_dct data element is data used for indicating that the prediction of frame-mode DCT is carried out only in the frame mode in the case of a frame structure. The concealment_motion_vectors data element is data used for indicating that the intra-macroblock includes a motion vector for concealing a transmission error. The q_scale_type data element is data used for indicating whether to use a linear quantization scale or a non-linear quantization scale. The intra_vlc_format data element is data used for indicating whether or not another 2-dimensional VLC is used in the intra-macroblock.

The alternate_scan data element is data representing selection to use a zigzag scan or an alternate scan. The repeat_first_field data element is data used in the case of a 2:3 pull-down. The chroma_420_type data element is data equal to the value of the next progressive_frame data element in the case of a 4:2:0 signal format or 0 otherwise. The progressive_frame data element is data used for indicating whether or not this picture has been obtained from sequential scanning. The composite_display_flag data element is data used for indicating whether or not the source signal is a composite signal. The v_axis, field_sequence, sub_carrier, burst_amplitude and sub_carrier_phase data elements are data used in the case of a PAL source signal.

Following the data elements defined by the picture_coding_extension ( ) function, data elements defined by the re_coding_stream_info ( ) function are described as a history stream. The re_coding_stream_info ( ) function is used mainly for describing a combination of pieces of history information. Details of the re_coding_stream_info ( ) function will be described later by referring to FIG. 48.

Following the data elements defined by the re_coding_stream_info ( ) function, data elements defined by the extension_and_user_data(2) function shown in FIG. 27 are described as a history stream. It should be noted, however, that data elements defined by the extension_data ( ) function are described by the extension_and_user_data(2) function only if extension_start_code representing the start code of the extension exists in the bit stream. In addition, data elements defined by the user_data ( ) function are described by the extension_and_user_data(2) function after the data elements defined by the extension_data ( ) function only if user_data_start_code representing the start code of the user data exists in the bit stream as shown in as shown in FIG. 27. That is to say, if neither the start code of the extension nor the start code of the user data exists in the bit stream, data elements defined by the extension_data ( ) function and data elements defined by the user_data ( ) function are not described in the bit stream.

The extension_data ( ) function is a function used for describing a data element representing extension_start_code and data elements defined by a quant_matrix_extension ( ) function, a copyright_extension ( ) function and a picture_display_extension ( ) function as a history stream in the bit stream as shown in FIG. 32.

Data elements defined by the quant_matrix_extension ( ) function are extension_start_code, extension_start_code_identifier, quant_matrix_extension_present_flag, load_intra_quantizer_matrix, intra_quantizer_matrix[64], load_non_intra_quantizer_matrix, non_intra_quantizer_matrix [64], load_chroma_intra_quantizer_matrix, chroma_intra_quantizer_matrix[64], load_chroma_non_intra_quantizer_matrix and chroma_non_intra_quantizer_matrix[64] as shown in FIG. 33.

The data elements listed above are described as follows. The extension_start_code data element is a start code used for indicating the start of the quantization-matrix extension. The extension_start_code_identifier data element is a code used for indicating which extension data is transmitted. The quant_matrix_extension_present_flag data element is a flag used for indicating whether data elements of the quantization-matrix extension are valid or invalid. The load_intra_quantizer_matrix data element is data used for indicating whether or not quantization-matrix data for an intra-macroblock exists. The intra_quantizer_matrix data element is data representing values of a quantization-matrix for an intra-macroblock.

The load_non_intra_quantizer_matrix data element is data used for indicating whether or not quantization-matrix data for a non-intra-macroblock exists. The non_intra_quantizer_matrix data element is data representing values of a quantization-matrix for a non-intra-macroblock. The load_chroma_intra_quantizer_matrix data element is data used for indicating whether or not quantization-matrix data for a color-difference intra-macroblock exists. The chroma_intra_quantizer_matrix data element is data representing values of a quantization-matrix for a color-difference intra-macroblock. The load_chroma_non_intra_quantizer_matrix data element is data used for indicating whether or not quantization-matrix data for a color-difference non-intra-macroblock exists. The chroma_non_intra_quantizer_matrix data element is data representing values of a quantization-matrix for a color-difference non-intra-macroblock.

The data elements defined by the copyright_extension ( ) function are extension_start_code, extension_start_code_identifier, copyright_extension_present_flag, copyright_flag, copyright_identifier, original_or_copy, copyright_number_1, copy_right_number_2 and copyright_number_3 as shown in FIG. 34.

The data elements listed above are described as follows. The extension_start_code data element is a start code used for indicating the start of the copyright extension. The extension_start_code_identifier data element is a code used for indicating which extension data is transmitted. The copyright_extension_present_flag data element is a flag used for indicating whether data elements of the copyright extension are valid or invalid.

The copyright_flag data element is a flag used for indicating whether or not a copyright has been given to encoded video data in a range up to the next copyright extension or the end of the sequence. The copyright_identifier data element is data used for identifying an institution cataloging the copyright specified by the ISO/IEC JTC/SC29. The original_or_copy data element is a flag used for indicating whether data of the bit stream is original or copied data. The copyright_number_1 data element indicates bits 44 to 63 of a copyright number. The copyright_number_2 data element indicates bits 22 to 43 of the copyright number. The copyright_number_3 data element indicates bits 0 to 21 of the copyright number.

The data elements defined by the picture_display_extension ( ) function are extension_start_code_identifier, frame_center_horizontal_offset and frame_center_vertical_offset as shown in FIG. 35.

The data elements listed above are described as follows. The extension_start_code_identifier data element is a code used for indicating which extension data is transmitted. The frame_center_horizontal_offset data element is an offset of the display area in the horizontal direction. The number of such horizontal offsets can be defined by number_of_frame_center_offsets. The frame_center_vertical_offset data element is an offset of the display area in the vertical direction. The number of such vertical offsets can be defined by number_of_frame_center_offsets.

As shown in the variable-length history stream of FIG. 24, data elements defined by a picture_data ( ) function are described as a history stream after the data elements defined by the extension_and_user(2) function. It should be noted, however, that the picture_data ( ) function exists if red_bw_flag has a value other than 1 or red_bw_indicator has a value not exceeding 2. The red_bw_flag and the red_bw_indicator are described in the re_coding_stream_info ( ) function and will be described later by referring to FIGS. 48 and 49.

As shown in FIG. 36, the data elements defined by a picture_data ( ) function are data elements defined by a slice ( ) function. It should be noted that at least one of the data elements defined by the slice ( ) function are described in the bit stream.

As shown in FIG. 37, the slice ( ) function is a function used for describing data elements such as slice_start_code, slice_quantiser_scale_code, intra_slice_flag, intra_slice, reserved_bits, extra_bit_slice, extra_information_slice and extra_bit_slice and data elements defined by a macroblock ( ) function as a history stream.

The data elements listed above are described as follows. The slice_start_code data element is a start code used for indicating the data elements defined by the slice ( ) function. The slice_quantiser_scale_code data element is the size of the quantization step defined for a macroblock existing in the slice layer. However, quantiser_scale_code set for macroblocks is preferably used, when quantiser_scale_code has been set.

The intra_slice_flag data segment is a flag used for indicating whether or not intra_slice and reserved_bits exist in the bit stream. The intra_slice data element is a flag used for indicating whether or not a non-intra-macroblock exists in the slice layer. To be more specific, if any one of macroblocks in the slice layer is a non-intra-macroblock, the intra_slice flag has a value of "0". If all macroblocks in the slice layer are non-intra-macroblocks, on the other hand, the intra-slice flag has a value of "1". The reserved_bits data element is 7-bit data having a value of "0". The extra_bit_slice data element is a flag used for indicating whether or not the extra_information_slice data element, that is, information added as a history stream, exists. To be more specific, if the next extra_information_slice data element exists, the extra_bit_slice flag has a value of "1". If the next extra_information_slice data element does not exist, on the other hand, the extra_bit_slice flag has a value of "0".

Following the data element defined by the slice ( ) function, data elements defined by a macroblock ( ) function are described as a history stream.

As shown in FIG. 38, the macroblock ( ) function are a function used for defining data elements such as macroblock_escape, macroblock_address_increment, macroblock_quantiser_scale_code and marker_bit as well as data elements defined by a macroblock_modes ( ) function, a motion_vectors(s) function and a coded_block_pattern function.

The data elements listed above are described as follows. The macroblock_escape data element is a string of bits with a fixed length used for indicating whether or not a difference in the horizontal direction between a referenced macroblock and a preceding macroblock is at least 34 or greater. If the difference in the horizontal direction between a referenced macroblock and a preceding macroblock is at least 34 or greater, 33 is added to the value of the macroblock_address_increment data element. The macroblock_address_increment data element is the difference in the horizontal direction between a referenced macroblock and a preceding macroblock. If one macroblock_escape data element exists before the macroblock_address_increment data element, a value obtained as a result of the addition of 33 to the value of the macroblock_address_increment data element represents the actual difference in the horizontal direction between a referenced macroblock and a preceding macroblock.

The macroblock_quantiser_scale_code data element is the size of the quantization step set in each macroblock and exists only if the value of macroblock_quant is 1. The slice_quantiser_scale_code data element representing the size of the quantization step of a slice layer is also set in each slice layer. However, macroblock_scale_code set for a macroblock takes precedence of slice_quantiser_scale_code.

Following the macroblock_address_increment data element, data elements defined by the macroblock_modes ( ) function are described. As shown in FIG. 39, the macroblock_modes ( ) function is a function used for describing data elements such as macroblock_type, frame_motion_type, field_motion_type and dct_type as a history stream.

The data elements listed above are described as follows. The macroblock_type data element is data representing the encoding type of the macroblock. Its details will be described by referring to FIGS. 42 to 44.

If the macroblock_motion_forward flag or the macroblock_motion_backward flag has a value of "1", the picture is transferred in the frame-prediction mode and, in addition, frame_pred_frame_dct has a value of "0", a data element representing frame_motion_type is described after a data element representing macroblock_type. It should be noted that frame_pred_frame_dct is a flag used for indicating whether or not frame_motion_type exists in the bit stream.

The frame_motion_type data element is a 2-bit code showing the prediction type of the macroblock of the frame. A frame_motion_type value of "00" indicates that there are two prediction vectors and the prediction type is a field-based prediction type. A frame_motion_type value of "01" indicates that there is one prediction vector and the prediction type is a field-based prediction type. A frame_motion_type value of "10" indicates that there is one prediction vector and the prediction type is a frame-based prediction type. A frame_motion_type value of "11" indicates that there is one prediction vector and the prediction type is a dual-prime prediction type.

If a condition describing frame_motion_type is not satisfied, a data element representing field_motion_type is described after a data element representing macroblock_type.

The field_motion_type data element is a 2-bit code showing the motion prediction of the macroblock of a field. A field_motion_type value of "01" indicates that there is one prediction vector and the prediction type is a field-based prediction type. A field_motion_type value of "10" indicates that there is two prediction vectors and the prediction type is a 18×8 macroblock-based prediction type. A field_motion_type value of "11" indicates that there is one prediction vector and the prediction type is a dual-prime prediction type.

If the picture is transferred in the frame prediction mode, frame_pred_frame_dct indicates that frame_motion_type exists in the bit stream and frame_pred_frame_dct also indicates that dct_type exists in the bit stream, a data element representing dct_type is described after a data element representing macroblock_type. It should be noted that the dct_type data element is data used for indicating whether the DCT is carried out in the frame-DCT mode or the field-DCT mode.

As shown in FIG. 38, if the referenced macroblock is either a forward-prediction macroblock or an intra-macroblock completing conceal processing, a data element defined by a motion_vectors(0) function is described. If the referenced macroblock is a backward-prediction macroblock, a data element defined by a motion_vectors(1) function is described. It should be noted that the motion_vectors(0) function is a function used for describing a data element related to a first motion vector and the motion_vectors(1) function is a function used for describing a data element related to a second motion vector.

As shown in FIG. 40, the motion_vectors(s) function is a function used for describing a data element related to a motion vector.

If there is one motion vector and the dual-prime prediction mode is not used, data elements defined by motion_vertical_field_select[0][s] and motion_vector[0][s] are described.

The motion_vertical_field_select[r][s] is a flag used for indicating that the first vector, be it a forward-prediction or backward-prediction vector, is a vector made by referencing the bottom field or the top field. The subscript[r] indicates the first or second vector whereas the subscript[s] indicates a forward-prediction or backward-prediction vector.

As shown in FIG. 41, the motion_vector(r, s) function is a function used for describing a data array related to motion_code[r][s][t], a data array related to motion_residual[r][s][t] and data representing dmvector[t].

The motion_code[r][s][t] is data with a variable length used for representing the magnitude of a motion vector in terms of a value in the range −16 to +16. motion_residual[r][s][t] is data with a variable length used for representing a residual of a motion vector. Thus, by using the values of motion_code[r][s][t] and motion_residual[r][s][t], a detailed motion vector can be described. The dmvector[t] is data used for scaling an existing motion vector with a time distance in order to generate a motion vector in one of the top and bottom fields (for example, the top field) in the dual-prime prediction mode and used for correction in the vertical direction in order to reflect a shift in the vertical direction between lines of the top and bottom fields. The subscript[r] indicates the first or second vector whereas the subscript[s] indicates a forward-prediction or backward-prediction vector. The subscript[t] indicates that the motion vector is a component in the vertical or horizontal direction.

First of all, the motion_vector(r, s) function describes a data array to represent motion_code[r][s][0] in the horizontal direction as a history stream as shown in FIG. 41. The number of bits of both motion_residual[0][s][t] and motion_residual[1][s][t] is represented by f_code[s][t]. Thus, a value of f_code[s][t] other than "1" indicates that motion_residual[r][s][t] exists in the bit stream. The fact that motion_residual[r][s][0], a horizontal-direction component, is not "1" and motion_code[r][s][0], a horizontal-direction component, is not "0" indicates t h a t a data element representing motion_residual[r][s][0] is included in the bit stream and the horizontal-direction component of the motion vector exists. In this case, a data element representing motion_residual[r][s][0], a horizontal component, is thus described.

Subsequently, a data array to represent motion_code[r][s][1] is described in the vertical direction as a history stream. Likewise, the number of bits of both motion_residual[0][s][t] and motion_residual[1][s][t] is represented by f_code[s][t]. Thus, a value of f_code[s][t] other than "1" indicates that motion_residual[r][s][t] exists in the bit stream. The fact that motion_residual[r][s][1], a vertical-direction component, is not "1" and motion_code[r][s][1], a vertical-direction component, is not "0" indicates that a data element representing motion_residual[r][s][1] is included in the bit stream and the vertical-direction component of the motion vector exists. In this case, a data element representing motion_residual[r][s][1], a vertical component, is thus described.

Next, macroblock_type is described by referring to FIGS. 42 to 44. The macroblock_type data element is data with a variable length generated from flags such as macroblock_quant, dct_type_flag, macroblock_motion_forward and macroblock_motion_backward as shown in FIGS. 42 to 44. The macroblock_quant flag is a flag used for indicating whether or not macroblock_quantiser_scale_code for setting the size of the quantization step for the macroblock is set. If macroblock_quantiser_scale_code exists in the bit stream, the macroblock_quant flag has a value of "1".

A flag referred to as dct_type_flag is a flag used for indicating whether or not dct_type showing that the referenced macroblock has been encoded in the frame-DCT mode or the field-DCT mode exists. In other words, dct_type_flag is a flag used for indicating whether or not the referenced macroblock experienced DCT. If dct_type exists in the bit stream, dct_type_flag has a value of "1". The macroblock_motion_forward is a flag showing whether or not the referenced macroblock has undergone forward prediction. If the referenced macroblock has undergone forward prediction, the macroblock_motion_forward flag has a value of "1". On the other hand, macroblock_motion_backward is a flag showing whether or not the referenced macroblock has undergone backward prediction. If the referenced macroblock has undergone backward prediction, the macroblock_motion_backward flag has a value of "1".

It should be noted that, in the variable-length format, the history information can be eliminated in order to reduce the transfer rate of transmitted bits.

For example, in order to transfer macroblock_type and motion_vectors ( ), but not to transfer quantiser_scale_code, slice_quantiser_scale_code is set at "00000" in order to reduce the bit rate.

In addition, in order to transfer only macroblock_type but not to transfer motion_vectors ( ), quantiser_scale_code and dct_type, "not_coded" is used as macroblock_type in order to reduce the bit rate.

Furthermore, in order to transfer only picture_coding_type but not to transfer all information following slice ( ), picture_data ( ) having no slice_start_code is used in order to reduce the bit rate.

As described above, in order to prevent 23 consecutive bits of 0 from appearing in user_data, a "1" bit is inserted for every 22 bits. It should be noted that, however, a "1" bit can also be inserted for each number of bits smaller than 22. In addition, instead of insertion of a "1" bit by counting the number of consecutive 0 bits, a "1" bit can also be inserted by examining Byte_allign.

In addition, in the MPEG, generation of 23 consecutive bits of 0 is prohibited. In actuality, however, only a sequence of such 23 bits starting from the beginning of a byte is a problem. That is to say, a sequence of such 23 bits not starting from the beginning of a byte is not a problem. Thus, a "1" bit may be inserted for each typically 24 bits at a position other than the LSB.

Furthermore, while the history information is made in a format close to a video elementary stream as described above, the history information can also be made in a format close to a packetized elementary stream or a transport stream. In addition, even though user_data of the Elementary Stream is placed in front of picture_data according to the above description, user_data can be placed at another location as well.

The transponding system shown in FIG. 4 outputs encoding parameters of 4 generations as history information to the succeeding stage. In actuality, however, the history information is not all required. The required history information varies from application to application. In addition, each actual transmission line and each recording medium or each transmission medium has a capacity limit. Even if history information is compressed, transmission of all the history information is a big load to be borne by a transmission means having a limited transmission capacity. In consequence, the bit rate of the picture bit stream must be unavoidably suppressed, inadvertently losing the effectiveness of the transmission of the history information.

Figure 45:
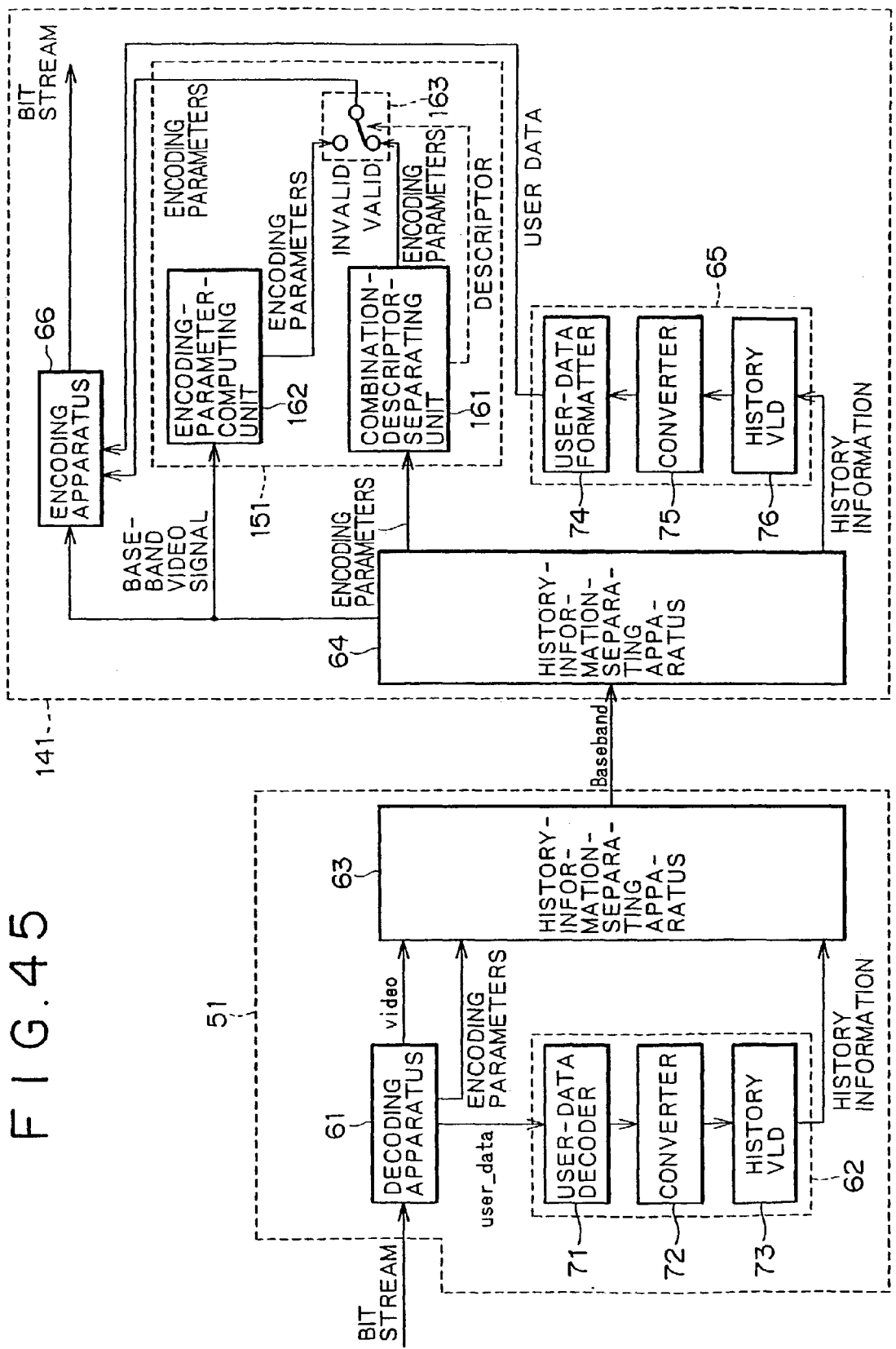
FIG. 45 is a block diagram showing a further configuration of the transcoding system.

In order to solve this problem, a descriptor describing a combination of items transmitted as history information is also transmitted to the succeeding stage by including the descriptor in the history information. Instead of transmitting all history information, information to be transmitted is varied from application to application for a variety of applications. FIG. 45 is a diagram showing a typical configuration of a transcoding system in which information to be transmitted is varied from application to application for a variety of applications.

Components of the transcoding system shown in FIG. 45, which are identical with those employed in the transcoding system shown in FIG. 4, are denoted by the same reference numerals as the latter and their explanation is not repeated. In the typical configuration shown in FIG. 45, an encoding-parameter-selecting circuit 151 is provided between a history-information-separating apparatus 64 and an encoding apparatus 66 as well as between a history-encoding apparatus 65 and the encoding apparatus 66.

The encoding-parameter-selecting circuit 151 comprises a combination-descriptor-separating unit 161, an encoding-parameter-computing unit 162 and a switch 163. The encoding-parameter-computing unit 162 computes encoding parameters from a base-band video signal output by the history-information-separating apparatus 64. The combination-descriptor-separating unit 161 separates encoding parameters and descriptors based on information on encoding parameters that are determined to be most optimum for an encoding process carried out by the video-encoding system 141 including the encoding-parameter-selecting circuit 151. The encoding parameters are output by encoding-parameter-computing unit 162 on the basis of the base-band video signal output by the history-information-separating apparatus 64. An example of optimum encoding parameters is encoding parameters of the second generation. An example of the descriptors is red_bw_flag and red_bw_indicator, which will be described later by referring to FIG. 49. The switch 163 selects either the encoding parameters separated by the combination-descriptor-separating unit 161 or the encoding parameters computed by the encoding-parameter-computing unit 162 in accordance with the descriptors separated by the combination-descriptor-separating unit 161, and supplies the selected parameters to the encoding apparatus 66. The rest of the configuration is the same as that shown in FIG. 4.

A combination of items transmitted as history information is explained as follows. History information can be classified into information for each picture and information for each macroblock. Information for a slice can be obtained by gathering pieces of information for macroblocks included in the slice. By the same token, information for a GOP can be obtained by gathering pieces of information for pictures included in the GOP.

Since information for a picture, that is, information described in a V Blanking area shown in FIG. 7, is transmitted only once for each frame, the bit rate for the transmission of the information is not that high. On the other hand, since information for a macroblock, that is, information described in an H-blanking area shown in FIG. 7, needs to be transmitted a large number of times for each frame, information for each macroblock occupies a large portion of history information. Assume for example a video system in which the number of scanning lines in 1 frame is 525, the field rate is 60 fields per second and the number of pixels per frame is 720×480. In this case, information for a macroblock needs to be transmitted 1,350 (=(720/16)×(480/16)) times for each frame. Accordingly, information for macroblocks occupies a large portion of history information. In order to solve this problem, while transmitted history information always includes at least information for each picture, information for each macroblock is transmitted selectively corresponding to the application. In this way, the amount of transmitted information can be suppressed.

Information to be transmitted as history information for each macroblock includes num_coef_bits, num_mv_bits, num_other_bits, q_scale_code, q_scale_type, motion_type, mv_vert_field_sel[ ],mv[ ][ ][ ], mb_mfwd, mb_mbwd, mb_pattern, coded_block_pattern, mb_intra, slice_start, dct_ type, mb_quant and skipped_mb. These are expressed by using elements of macroblock rate information.

The above pieces of information are described as follows. The num_coef_bits information is the size of codes in the macroblock required for expressing DCT coefficients. The num_mv_bits information is the size of a code in the macroblock required for expressing a motion vector. The num_other_bits information is the size of codes in the macroblock other than those represented by num_coef_bits and num_mv_bits.

The q_scale_code information is q_scale_code applied to the macroblock. The motion_type information is the type of a motion vector applied to the macroblock. The mv_vert_ field_sel[ ][ ] information is a field select of a motion vector applied to the macroblock.

The mv[ ][ ][ ] information is a motion vector applied to the macroblock. The mb_mfwd information is a flag indicating that the prediction mode of the macroblock is the forward-direction prediction mode. The mb_mbwd information is a flag indicating that the prediction mode of the macroblock is the backward-direction prediction mode. The mb_pattern information is a flag indicating the presence/absence of a non-zero DCT coefficient of the macroblock.

The coded_block_pattern information is a flag indicating the presence/absence of a non-zero DCT coefficient of the macroblock for each DCT block. The mb_intra information is a flag indicating whether or not the macroblock is an intra_macro macroblock. The slice_start information is a flag indicating whether or not the macroblock is located at the beginning of a slice. The dct_type information is a flag indicating whether the macroblock is a field_dct or frame_dct macroblock.

The mb_quant information is a flag indicating whether or not the transmitted macroblock includes quantiser_scale_ code. The skipped_mb information is a flag indicating whether or not the macroblock is a skipped macroblock.

The items described above are not always all needed. Instead, the needed items are determined in accordance with the application. For example, the num_coef_bits and slice_ start items are needed in an application with a transparent requirement to restore a bit stream, which is to be re-encoded, to a form as close to the original bit stream as possible. In other words, in an application changing the bit rate, these items are not required. In addition, applications with very strict restrictions on the transmission line include applications that need to know only the encoding type of each picture. In such a condition, combinations each comprising items for transmitting history information are conceivable. FIG. 46 is a diagram showing such typical combinations.

For each of the combinations shown in FIG. 46, a value of 2 indicates that an item associated with the value is included in the combination and can be used whereas a value of 0 means that the item is not included in the combination. A value of 1 implies that the item is included in the combination as auxiliary information or simply for a syntactical reason. However, the item has nothing to do with the information of the original bit stream. Thus, the item itself is meaningless. For example, a value of 1 is assigned to the slice_start item in combinations 3 and 4 indicates that the macroblock is located at the beginning of a slice in the transmission of history information. However, the location of the slice is not necessarily the same as that in the original bit stream. If the location of the slice is changed, this item does not have any meaning as history information.

By including or excluding some of (num_coef_bits, num_ mv_bits, num_other_bits), (q_scale_code, q_scale_type), (motion_type, mv_vert_field_sel[ ][ ], mv[ ][ ][ ], (mb_mfwd, mb_mbwd), (mb_pattern), (coded_block_pattern), (mb_intra), (slice_start), (dct_type), (mb_quant) and (skipped_mb) items as shown in the example of FIG. 46 in 5 combinations, namely, combinations 1 to 5, are obtained.

Combination 1 is a combination intended for rebuilding a completely transparent bit stream. With this combination, it is possible to implement transcoding with high precision due to the use of information on the number of generated codes. Combination 2 is also a combination intended for rebuilding a completely transparent bit stream. Even though combination 3 cannot be used for rebuilding a completely transparent bit stream, combination 3 is a combination intended for rebuilding a bit stream almost transparent to the sense of sight. From the transparency point of view, combination 4 is inferior to combination 3. Nevertheless, combination 4 is a combination that can be used for rebuilding a bit stream with no problem appearing to the sense of sight. From the transparency point of view, combination 5 is inferior to combination 4. However, combination 5 is a combination that can be used for imperfect rebuilding of a bit stream with little history information.

The lower the number assigned to any of the above combinations, the better the function of the combination but the larger the capacity required for transmission of the history information. It is thus necessary to select a combination to be transferred by considering the assumed application and the transmission capacity useable for the history information.

The following description explains the operation of the transcoding system shown in FIG. 45 by referring to a flowchart shown in FIG. 47.

The flowchart shown in FIG. 47 begins with a step S1 at which the decoding apparatus 61 employed in the video-decoding system 51 decodes an input bit stream and extracts encoding parameters of the fourth generation, which are used for encoding the bit stream. The decoding apparatus 61 supplies the encoding parameters of the fourth generation and the decoded video data to the history-information-multiplexing apparatus 63. At the next step S2, the decoding apparatus 61 extracts user_data from the input bit stream and supplies it to the history-decoding apparatus 62. At the next step S3, the history-decoding apparatus 62 extracts information on a combination (or descriptors) from user_data and uses the information for extracting encoding parameters of the second and third generations received as history information. The history-decoding apparatus 62 then supplies the encoding parameters to the history-information-multiplexing apparatus 63.

At the next step S4, the history-information-multiplexing apparatus 63 multiplexes the encoding parameters of the fourth, second and third generations in the base-band video data received from the decoding apparatus 61 in accordance with the formats shown in FIGS. 7 and 11, and supplies a result of the multiplexing to the history-information-separating apparatus 64. The current encoding parameters of the fourth generation were extracted at the step S1 by the decoding apparatus 61 whereas the past encoding parameters of the second and third generations were extracted at the step S3 by the history-decoding apparatus 62.

At the next step S5, the history-information-separating apparatus 64 extracts the encoding parameters from the base-band video data received from the history-information-multiplexing apparatus 63 and selects encoding parameters most optimum for the current encoding process. An example of the encoding parameters most optimum for the current encoding process is the encoding parameters of the second generation. The history-information-separating apparatus 64 then supplies the most optimum encoding parameters and the descriptors to the combination-descriptor-separating unit 161. The history-information-separating apparatus 64 supplies encoding parameters other than the encoding parameters determined to be most optimum this time to the history-encoding apparatus 65. If the encoding parameters of the second generation are determined to be most optimum, for example, the history-information-separating apparatus 64 supplies the encoding parameters of the first, third and fourth generations to the history-encoding apparatus 65.

At the next step S6, the history-encoding apparatus 65 writes the encoding parameters received from the history-information-separating apparatus 64 in user_data and supplies this user_data or converted_history_stream ( ) to the encoding apparatus 66.

At the next step S7, the combination-descriptor-separating unit 161 separates the encoding parameters of the second generation and the descriptors from the data received from the history-information-separating apparatus 64, supplying the parameters to one contact point of the switch 163. On the other hand, the encoding-parameter-computing unit 162 computes encoding parameters from the base-band video data received from the history-information-separating apparatus 64 and supplies the computed parameters to another contact point of the switch 163.

At the next step S8, the switch 163 selects either the encoding parameters received from the combination-descriptor-separating unit 161 or the encoding parameters received from the encoding-parameter-computing unit 162 in accordance with the descriptors received from the combination-descriptor-separating unit 161, and supplies the selected parameters to the encoding apparatus 66. To put it in detail, the switch 163 selects the encoding parameters received from the combination-descriptor-separating unit 161 if the parameters are valid. If the encoding parameters received from the combination-descriptor-separating unit 161 are invalid, on the other hand, the switch 163 selects the encoding parameters received from the encoding-parameter-computing unit 162, which computed the parameters as a result of processing of the base-band video data. The encoding parameters are selected in accordance with the capacity of the transmission media.

At the next step S9, the encoding apparatus 66 encodes the base-band video data received from the history-information-separating apparatus 105 on the basis of the encoding parameters received from the switch 163.

At the next step S10, the encoding apparatus 66 multiplexes user_data received from the history-encoding apparatus 65 in the encoded bit stream and outputs a result of the multiplexing before terminating the processing.

In this way, even if the combination of encoding parameters obtained as history information varies, transcoding can be carried out without a problem.

As described above, history information is transmitted as history_stream ( ), a kind of the user_data function of the video stream, as shown in FIG. 15. Speaking accurately, history information is transmitted as converted_history_stream ( ). The syntax of history_stream ( ) is shown in FIG. 24. The red_bw_flag and red_bw_indicator descriptors, which show a combination of history-information items, and items not supported in an MPEG stream are transmitted as the re_coding_stream_info ( ) function shown in FIG. 24. The items not supported in an MPEG stream are num_other_bits, num_mv_bits and num_coef_bits.

As shown in FIG. 48, the re_coding_stream_info ( ) function comprises data elements such as user_data_start_code, re_coding_stream_info_ID, red_bw_flag, red_bw_indicator, marker_bit, num_other_bits, num_mv_bits and num_coef_bits.

The above data elements are described as follows. The user_data_start_code data element is a start code indicating the beginning of user_data. The re_coding_stream_info_ID data item is a 16-bit integer used for identifying the re_coding_stream_info ( ) function. To put it concretely, the value of the re_coding_stream_info_ID data item is "1001 0001 1110 1100" (or 0x91ec).

The red_bw_flag data element is a 1-bit flag. When all items of the history information are transmitted, the flag is reset to 0. If the flag is set at 1, the red_bw_indicator data element following the flag is examined to select one of the 5 combinations shown in FIG. 46. In this way, it is possible to determine what items have been transmitted.

The red_bw_indicator data element is a 2-bit integer indicating the combinations of elements as shown in FIG. 49.

To be more specific, the 5 combinations shown in FIG. 46 are indicated as follows. Combination 1 is indicated by the value of the red_bw_flag data element reset to 0. On the other hand, combinations 2 to 5 are indicated by the value of the red_bw_flag data element set at 1. Combinations 2, 3, 4 and 5 are indicated by the value of the red_bw_indicator data element set at 0, 1, 2 and 3 respectively.

Thus, the red_bw_indicator data element indicates one of combinations 2 to 5 only if the red_bw_flag data element is set at 1.

In addition, in the case of combination 1 shown in FIG. 49 as indicated by the red_bw_flag data element reset to 0, the marker_bit, num_other_bits, num_mv_bits and num_coef_bits data elements are described for each macroblock. These 4 data elements are not described for combinations 2 to 5 indicated by the red_bw_flag data element set at 1.

As shown in FIG. 36, the picture_data ( ) function comprises one or more slice ( ) functions. In the case of combination 5, however, the picture_data ( ) function and syntax elements below this picture_data ( ) function are not transmitted. In this case, the history information is intended for information to be transmitted for each picture such as picture_type.

In the case of combinations 1 to 4, the slice ( ) function shown in FIG. 37 exists. In this case, however, information on the position of a slice determined by the slice ( ) function and information on the position of a slice of the original bit stream are dependent on the combination of history-information items. In addition, in the case of combination 1 or 2, it is necessary to have the same information on the position of a slice determined by the slice ( ) function as information on the position of a slice of the original bit stream.

Syntax elements of the macroblock ( ) function shown in FIG. 38 are dependent on a combination of history-information items. Syntax elements referred to as macroblock_escape and macroblock_address_increment as well as a macroblock_modes ( ) function always exist. However, the validity of the macroblock_escape and macroblock_address_ increment syntax elements is determined by the combination. If the combination of history-information items is combination 1 or 2, it is necessary to transmit the same information as skipped_mb of the original bit stream.

In the case of combination 4, the motion_vector ( ) function does not exist. In the case of combinations 1 to 3, on the other hand, macroblock_type of the macroblock_modes ( ) function determines the existence of the motion_vector ( ) function. In the case of combination 3 or 4, the coded_block_pattern ( ) function does not exist. In the case of combination 1 or 2, on the other hand, the macroblock_type of the macroblock_modes ( ) function determines the existence of the coded_block_pattern ( ) function.

Syntax elements of the macroblock_modes ( ) function shown in FIG. 39 are dependent on a combination of history-information items. A syntax element referred to as macroblock_type always exists. In the case of combination 4, frame_motion_type, field_motion type and dct_type syntax elements do not exist.

The combination of history-information items determines the information validity of parameters obtained from the macroblock_type syntax element.

If the combination of history-information items is combination 1 or 2, macroblock_quant must be the same as that of the original bit stream. If the combination of history-information items is combination 3 or 4, on the other hand, macroblock_quant indicates the existence of quantiser_scale_code in the macroblock ( ) function and does not have to be the same as that of the original bit stream.

If the combination of history-information items is combinations 1 to 3, macroblock_motion_forward and macroblock_motion_backward must be the same as those of the original bit stream. If the combination of history-information items is combination 4 or 5, on the other hand, macroblock_motion_forward and macroblock_motion_backward do not have to be the same as those of the original bit stream.

If the combination of history-information items is combination 1 or 2, macroblock_pattern must be the same as that of the original bit stream. If the combination of history-information items is combination 3, macroblock_pattern is used for indicating the existence of dct_type. If the combination of history-information items is combination 4, the relations for combinations 1 to 3 do not hold true.

If the combination of history-information items is any one of combinations 1 to 3, maroblock_intra must be the same as that of the original bit stream. If the combination of history-information items is combination 4, on the other hand, maroblock_intra does not have to be the same as that of the original bit stream.

The history_stream function shown in FIG. 24 has a syntax for history information with a variable length. In the case of syntaxes for fixed lengths shown in FIGS. 17 to 23, however, as portions of fixed-length history information for indicating which transmitted items are valid, descriptors, namely, red_bw_flag and red_bw_indicator, are superposed on a base-band picture prior to transmission. As a result, by examining the descriptors, is possible to determine that the contents of an existing field are invalid.

Thus, as re_coding_stream_information, user_data_start_code, re_coding_stream_info_ID, red_bw_flag, red_bw_indicator and marker_bit are provided as shown in FIG. 21. Their meanings have been explained by referring to FIG. 48.

By transmitting history information as a combination of encoding parameters dependent on the application as described above, history information, which is dependent on the application and has a proper amount of data, can be transmitted.

In transmission of history information as code with a variable length as described above, the re_coding_stream_info ( ) function is composed in a format shown in FIG. 48 and transmitted as a part of the history_stream ( ) function as shown in FIG. 24. If history information is transmitted as code with a fixed length, on the other hand, the re_coding_stream_infomation ( ) function is transmitted as a part of the history_stream ( ) function as shown in FIG. 21. In the example shown in FIG. 21, as re_coding_stream_information, user_data_start_code, re_coding_stream_info_ID, red_bw_flag and red_bw_indicator are transmitted.

In addition, a format of a Re_Coding information Bus macroblock like one shown in FIG. 50 is prescribed to transmit history information in a base-band signal output by the history-information-multiplexing apparatus 63 employed in the transcoding system shown in FIG. 45. This macroblock consists of 256 (=16×16) bits. 32 bits on the third and fourth rows from the top of the macroblock shown in FIG. 50 are picrate_element comprising picturerate elements shown in FIGS. 51 to 53. On the second row from the top of the picture-rate elements shown in FIG. 51, red_bw_flag with a length of 1 bit is prescribed. On the third row from the top of the picture-rate elements shown in FIG. 51, red_bw_indicator with a length of 3 bits is prescribed. That is to say, the red_bw_flag and red_bw_indicator flags are transmitted as picrate_element shown in FIG. 50.

Other data shown in FIG. 50 is explained as follows. SRIB_sync_code is a code used for indicating that data on the first line of the macroblock is aligned by packing the data to the left end of the line. To put it concretely, the code is set at "11111". For a picture_structure value of 11 indicating a frame picture structure, fr_fl_SRIB is set at 1 to indicate that the Re_Coding information Bus macroblock is transmitted, exceeding 16 lines. For a picture_structure value indicating a structure other than the frame picture structure, on the other hand, fr_fl_SRIB is reset to 0 to indicate that the Re_Coding information Bus macroblock is transmitted, exceeding 16 lines. With this mechanism, the Re_Coding information Bus macroblock is locked spacewise and timewise to pixels corresponding to a decoded video frame or a decoded video field.

SRIB_top_field_first is set at the same value as top_field_first held in the original bit stream and used for representing time alignment of Re_Coding Information Bus of a related video in conjunction with repeat_first_field. SRIB_repeat_first_field is set at the same value as repeat_first_field held in the original bit stream. Contents of the Re_Coding information Bus macroblock of the first field need to be repeated as indicated by this flag.

422_420_chroma indicates whether the original bit stream is either a 4:2:2 stream or a 4:2:0 stream. To be more specific, a 422_420_chroma value reset to 0 indicates that the original bit stream is a 4:2:0 stream. In this case, the 422_420_chroma value indicates that up-sampling of a chrominance signal is carried out to output a 4:2:2 video. The value of 0 indicates that a process to filter the chrominance signal is not carried out.

The rolling_SRIB_mb_ref data item indicates 16-bit modulo 65,521. The value of rolling_SRIB_mb_ref is incremented for each macroblock. This value must vary continuously over frames in the structure of frame pictures. If not, this value must vary continuously over fields. The rolling_SRIB_mb_ref data item is set at a predetermined value between 0 and 65,520. By doing so, embedding a unique descriptor of a Re_Coding Information Bus macroblock in a recorder system is permitted.

Meanings of other data of the Re_Coding Information Bus macroblock have been described above, making it unnecessary to repeat the explanation.

As shown in FIG. 54, 256-bit data of Re_Coding Information Bus macroblock shown in FIG. 50 is distributed in bit units among LSBs of the chrominance data, namely, Cb[0][0], Cr[0][0], Cb[1][0] and Cr[1][0]. By the format shown in FIG. 54, 4 bits of the data can thus be transmitted. Accordingly, in order to transmit the 256 bits of the data shown in FIG. 50, it is necessary to transmit 64 (=256/4) pieces of data each having the format shown in FIG. 54.

In the transcoding system provided by the present invention for reducing the amount of cumulative amount of picture-quality deterioration caused by decoding and encoding processes carried out as described above, encoding parameters generated in previous encoding processes are recorded in V Blanking and H-blanking areas in accordance with a frequency of use of the information. Thus, the information can be fetched with ease when the information is required. In addition, pieces of hardware can be selected in accordance with desired information or pieces of hardware can be eliminated if they are not required.

In addition, in the transcoding system provided by the present invention, a synchronization code referred to as start_code is always written at the beginning of a packet by the video-decoding system. Thus, the video-encoding system is capable of restoring a lost input packet with ease.

In the above description, the present invention is exemplified by a case in which compressed encoding parameters are transmitted. It should be noted, however, that the present invention can also be applied to a case wherein encoding parameters are transmitted without being compressed.

It is also worth noting that programs to be executed by a computer for carrying out pieces of processing described above can be presented to the user through network presentation media such as the Internet or a digital satellite to be recorded into the user's recording medium and presented by using recording media such as a magnetic disc, an optical disc, a magneto-optical disc and a semiconductor memory to be presented to the user.

In addition, steps composing each of the programs presented through the media as described in this specification can of course be pieces of processing to be carried sequentially one after another out along the time axis in accordance with a pre-prescribed order. It should be noted, however, that the steps do not have to be pieces of processing to be carried out sequentially along the time axis. Instead, they may include pieces of processing to be performed individually and concurrently.

It is also worth noting that, in this specification, the technical term "system" implies the entire apparatus comprising a plurality of sub-apparatuses and units.

What is claimed is:

1. An information processing apparatus for decoding an input encoded stream, said apparatus comprising:
   extracting means for extracting auxiliary data from said input encoded stream;
   separation means for splitting said auxiliary data extracted by said extraction means into first and second auxiliary data;
   decoding means for decoding said input stream; and
   insertion means for inserting said first auxiliary data and said second auxiliary data into a first position and a second position of a signal decoded by said decoding means respectively.

2. The information processing apparatus according to claim 1, wherein said auxiliary data includes encoding parameters.

3. The information processing apparatus according to claim 1, wherein said first position is a vertical-blanking area of said signal decoded by said decoding means.

4. The information processing apparatus according to claim 1, further comprising a synchronization code adding means for adding a synchronization code to a head of a packet of said signal decoded by said decoding means.

5. An information processing apparatus for decoding an input encoded stream, said apparatus comprising:
   an extractor for extracting auxiliary data from said input encoded stream;
   a separator for splitting said auxiliary data extracted by said extractor into first and second auxiliary data;
   a decoder for decoding said input encoded stream; and
   an inserter for inserting said first auxiliary data and said second auxiliary data into a first position and a second position of a signal decoded by said decoder respectively.

6. The information processing apparatus according to claim 5, wherein said auxiliary data includes encoding parameters.

7. The information processing apparatus according to claim 5, wherein said first position is a vertical-blanking area of said signal decoded by said decoder.

8. The information processing apparatus according to claim 5, further comprising a synchronization code adder for adding a synchronization code to a head of a packet of said signal decoded by said decoder.

9. An information processing method for decoding an input encoded stream comprising the steps of:
   extracting auxiliary data from said input encoded stream;
   splitting said auxiliary data extracted by said extraction step into first and second auxiliary data;
   decoding said input encoded stream; and inserting said first auxiliary data and said second auxiliary data into a first position and a second position of a signal decoded at said decoding step respectively.

10. A computer-readable recording medium on which is stored a computer controllable program comprising a set of instructions to control a computer to perform the steps of:
    extracting auxiliary data from an input encoded stream;
    splitting said auxiliary data extracted by said extraction step into first and second auxiliary data;
    decoding said input encoded stream; and
    inserting said first auxiliary data and said second auxiliary data into a first position and a second position of a signal decoded at said decoding step respectively.

11. A decoding apparatus for decoding an encoded source stream, said decoding apparatus comprising:
    decoding means for decoding said encoded source stream in order to generate a base-band signal by using encoded parameters included in said encoded source stream;
    first insertion means for inserting much required ones among said encoding parameters into a first portion of said base-band signal; and
    second insertion means for inserting little required ones among said encoding parameters into a second portion of said base-band signal.

12. A decoding apparatus for decoding an encoded source stream, said decoding apparatus comprising:
    a decoder which decodes said encoded source stream in order to generate a base-band signal by using encoded parameters included in said encoded source stream; and a first inserter which inserts much required ones among said encoding parameters into a first portion of said base-band signal; and
a second inserter which inserts little required ones among said encoding parameters into a second portion of said base-band signal.

13. A decoding method for decoding an encoded source stream, said decoding method comprising the steps of:
decoding said encoded source stream in order to generate a base-band signal by using encoded parameters included in said encoded source stream;
inserting much required ones among said encoding parameters into a first portion of said base-band signal; and
inserting little required ones among said encoding parameters into a second portion of said base-band signal.

14. A computer-readable recording medium on which is stored a computer controllable program comprising a set of instructions to control a computer to perform the steps of:
decoding said encoded source stream in order to generate a base-band signal by using encoded parameters included in said encoded source stream;
inserting much required ones among said encoding parameters into a first portion of said base-band signal; and
inserting little required ones among said encoding parameters into a second portion of said base-band signal.

15. A decoding apparatus for decoding an encoded source stream, said decoding apparatus comprising:
decoding means for decoding said encoded source stream in order to generate a base-band signal by using encoded parameters included in said encoded source stream;
first insertion means for inserting at least one encoding parameter for a higher layer of encoding into a first portion of said base-band signal; and
second insertion means for inserting at least one encoding parameter for a lower layer of encoding into a second portion of said base-band signal.

16. A decoding apparatus for decoding an encoded source stream, said decoding apparatus comprising:
a decoder which decodes said encoded source stream in order to generate a base-band signal by using encoded parameters included in said encoded stream; and
a first inserter which inserts at least one encoding parameter for a higher layer of encoding into a first portion of said base-band signal; and
a second inserter which inserts at least one encoding parameter for a lower layer of encoding into a second portion of said base-band signal.

17. A decoding method for decoding an encoded source stream, said decoding method comprising the steps of:
decoding said encoded source stream in order to generate a base-band signal by using encoded parameters included in said encoded source stream;
inserting at least one encoding parameter for a higher layer of encoding into a first portion of said base-band signal; and
inserting at least one encoding parameter for a lower layer of encoding into a second portion of said base-band signal.

18. A computer-readable recording medium on which is stored a computer controllable program comprising a set of instructions to control a computer to perform the steps of:
decoding said encoded source stream in order to generate a base-band signal by using encoded parameters included in said encoded source stream;
inserting at least one encoding parameter for a higher layer of encoding into a first portion of said base-band signal; and
inserting at least one encoding parameter for a lower layer of encoding into a second portion of said base-band signal.

19. A decoding apparatus for decoding an encoded source stream, said decoding apparatus comprising:
decoding means for decoding said encoded source stream in order to generate a base- band signal by using encoded parameters included in said encoded source stream;
first insertion means for inserting general ones among said encoding parameters into a first portion of said base-band signal; and
second insertion means for inserting detailed ones among said encoding parameters into a second portion of said base-band signal.

20. A decoding apparatus for decoding an encoded source stream, said decoding apparatus comprising:
a decoder which decodes said encoded source stream in order to generate a base-band signal by using encoded parameters included in said encoded source stream;
a first inserter which inserts general ones among said encoding parameters into a first portion of said base-band signal; and
a second inserter which inserts detailed ones among said encoding parameters into a second portion of said base-band signal.

21. A decoding method for decoding an encoded source stream, said decoding method comprising the steps of:
decoding said encoded source stream in order to generate a base-band signal by using encoded parameters included in said encoded source stream;
inserting general ones among said encoding parameters into a first portion of said base- band signal; and
inserting detailed ones among said encoding parameters into a second portion of said base-band signal.

22. A computer-readable recording medium on which is stored a computer controllable program comprising a set of instructions to control a computer to perform the steps of:
decoding said encoded source stream in order to generate a base-band signal by using encoded parameters included in said encoded source stream;
inserting general ones among said encoding parameters into a first portion of said base-band signal; and
inserting detailed ones among said encoding parameters into a second portion of said base-band signal.

23. An encoding apparatus for encoding a base-band signal, said apparatus comprising:
extracting means for extracting much required encoding parameters from a first portion of said base-band signal and little required encoding parameters from a second portion of said base-band signal; and
re-encoding means for re-encoding said base-band signal by referring to at least one of said much required parameters and said little required encoding parameters.

24. An encoding apparatus for encoding a base-band signal, said apparatus comprising:
an extractor which extracts much required encoding parameters from a first portion of said base-band signal and little required encoding parameters from a second portion of said base- band signal; and
a re-encoder which re-encodes said base-band signal by referring to at least one of said much required parameters and said little required encoding parameters.

25. An encoding method for encoding a base-band signal, said method comprising the steps of:

extracting much required encoding parameters from a first portion of said base-band signal and little required encoding parameters from a second portion of said base-band signal; and re-encoding said base-band signal by referring to at least one of said much required parameters and said little required encoding parameters.

26. A computer-readable recording medium on which is stored a computer controllable program comprising a set of instructions to control a computer to perform the steps of:

extracting much required encoding parameters from a first portion of said base-band signal and little required encoding parameters from a second portion of said base-band signal; and re-encoding said base-band signal by referring to at least one of said much required parameters and said little required encoding parameters.

* * * * *